US008249044B2

(12) United States Patent
Onodera et al.

(10) Patent No.: US 8,249,044 B2
(45) Date of Patent: Aug. 21, 2012

(54) NOTIFICATION INFORMATION GENERATING APPARATUS, COMMUNICATION APPARATUS, NOTIFICATION INFORMATION GENERATING METHOD AND PROGRAM

(75) Inventors: Takashi Onodera, Yotsukaido (JP); Toshizo Nogami, Chiba (JP); Naoki Okamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 279 days.

(21) Appl. No.: 12/282,144

(22) PCT Filed: Mar. 6, 2007

(86) PCT No.: PCT/JP2007/054332
§ 371 (c)(1),
(2), (4) Date: Oct. 3, 2008

(87) PCT Pub. No.: WO2007/102506
PCT Pub. Date: Sep. 13, 2007

(65) Prior Publication Data
US 2009/0052342 A1    Feb. 26, 2009

(30) Foreign Application Priority Data

Mar. 6, 2006  (JP) .................................. 2006-058934
Mar. 6, 2006  (JP) .................................. 2006-058935
Mar. 6, 2006  (JP) .................................. 2006-058936
Apr. 5, 2006  (JP) .................................. 2006-104310

(51) Int. Cl.
*H04J 1/00*        (2006.01)
(52) U.S. Cl. ......................... 370/343; 370/480; 455/135
(58) Field of Classification Search .................. 370/227, 370/252, 345; 455/423, 454.2
See application file for complete search history.

(56) References Cited

U.S. PATENT DOCUMENTS 7,280,837 B2 * 10/2007 Guan et al. .................. 455/452.2
7,688,798 B2 *  3/2010 Dottling et al. .............. 370/345
7,724,665 B2 *  5/2010 Tanaka ........................ 370/235
(Continued)

FOREIGN PATENT DOCUMENTS
JP       04-200032 A     7/1992
(Continued)

OTHER PUBLICATIONS

Yamamura et al., "A Study on Adaptive Modulated High Mobility OFDM Radio Transmission System", Technical Report of IEICE RCS99-146, Nov. 1999, pp. 33-40.

(Continued)

*Primary Examiner* — Donald Mills
*Assistant Examiner* — Henry Baron
(74) *Attorney, Agent, or Firm* — Birch, Stewart, Kolasch & Birch, LLP

(57)   ABSTRACT

To generate notification information for improving accuracy of channel quality information reconstructed based on a difference in notifying using the difference in channel quality information between channels. A notification information generating apparatus 400 has a notification information table 401 that stores a plurality of difference-value candidate values each indicating a difference between two pieces of channel quality information as candidate values for the notification information, a reconstructing section 403 that generates a reconstruction value using the notification information generated based on the channel quality information of a first channel, and a selecting section 402 which receives the channel quality information of a second channel differing from the first channel, selects a single candidate value from the candidate values for the notification information based on the channel quality information of the second channel and the reconstruction value, and generates the notification information based on the selected candidate value.

15 Claims, 51 Drawing Sheets

U.S. PATENT DOCUMENTS

| | | |
|---|---|---|
| 2001/0024427 A1 | 9/2001 | Suzuki |
| 2002/0123349 A1 | 9/2002 | Miyoshi et al. |
| 2003/0087644 A1 | 5/2003 | Miyoshi et al. |
| 2005/0053036 A1 | 3/2005 | Takeda |
| 2005/0201295 A1 | 9/2005 | Kim et al. |
| 2006/0121930 A1 | 6/2006 | Miyoshi et al. |
| 2006/0209703 A1* | 9/2006 | Baker et al. ............. 370/252 |
| 2008/0045231 A1* | 2/2008 | Kuroda et al. ............ 455/452.1 |
| 2008/0261545 A1 | 10/2008 | Miyoshi et al. |
| 2009/0060082 A1 | 3/2009 | Yuda et al. |
| 2009/0161611 A1 | 6/2009 | Kuroda |
| 2010/0195707 A1 | 8/2010 | Duan et al. |

FOREIGN PATENT DOCUMENTS

| | | |
|---|---|---|
| JP | 2001-238269 A | 8/2001 |
| JP | 2003-218789 A | 7/2003 |
| JP | 2004-236266 A | 8/2004 |
| JP | 2005-045504 A | 2/2005 |
| JP | 2005-159577 A | 6/2005 |
| JP | 2007-514753 A | 6/2007 |
| JP | 2007-529160 A | 10/2007 |
| WO | WO 2005/088870 A1 | 9/2005 |
| WO | WO 2006/118123 A1 | 11/2006 |
| WO | WO 2007/015305 A1 | 2/2007 |
| WO | WO 2007/046261 A1 | 4/2007 |

OTHER PUBLICATIONS

Kishiyama et al., "Experimental Evaluations of Adaptive Modulation and Channel Coding in Forward Link for VSF-OFCDM Broadband Wireless Access", Technical report of IEICE RCS2003-25, May 2003, pp. 7-14.

"Medium Access Control (MAC) Standard for cdma2000 Spread Spectrum Systems Release D", ARIB STD-T64-C. S0003-C v2.0, Association of Radio Industries and Businesses, Aug. 2004, p. 2-145-2-147.

Yoshiki et al., "OFDM Based Adaptive Modulation Systems with a Multilevel Transmit Power Control for High Bit Rate Transmission", The transactions of the Institute of Electronics, Information and Communication Engineers, B vol. J84-B, No. 7, Jul. 2001, p. 1141-1150.

Maehara et al., "On AFDM/TDD Transmission Scheme with Subcarrier Adaptive Modulation", Proceedings of the IEICE General Conference, B-5-100, Mar. 2001, p. 498.

Motoyoshi., "A Study on CSI Feedback Bandwidth Reduction Method for FDD-based OFDM Systems", Proceedings of the Society Conference of IEICE, B-5-28, Sep. 2005, p. 428.

"Uplink CQI channel for OFDMA PHY", IEEE802.16d-04/84r1, (US), IEEE, Apr. 28, 2004.

"Medium Access Control (MAC) Standard for cdma2000 Spread Spectrum Systems, Release D" Association of radio Industries and Businesses, ARIB STD-T64-C.S00003-D v2.0, p. 2-159-2-161, copyright 2004.

Physical Channels and Multiplexing in Evolved UTRA Downlink, NTT DoCoMo, 3GP TSG RAN WG1 Ad Hoc on LTE R1-050590, Jun. 21, 2005, pp. 1-24.

"Band-AMC Operation in Normal DL/UL-MAP"Jiho Jang, et al., IEEE 802.16 Broadband Wireless Access Working Group, Jan. 26, 2005.

* cited by examiner

| SUBCARRIER BLOCK NUMBER | SELECTED MODULATION PARAMETER | NOTIFICATION INFORMATION | RECONSTRUCTED MODULATION PARAMETER |
|---|---|---|---|
| 1 | 11 | 11 | 11 |
| 2 | 12 | $X_2$ | 11 |
| 3 | 11 | $X_2$ | 11 |
| 4 | 9 | $X_1$ | 9 |
| 5 | 6 | $X_1$ | 7 |
| 6 | 0 | $Y_1$ | 0 |
| 7 | 7 | $X_2$ | 7 |
| 8 | 10 | $X_3$ | 9 |
| 9 | 12 | $X_3$ | 11 |
| 10 | 13 | $X_3$ | 13 |
| 11 | 13 | $X_2$ | 13 |
| 12 | 12 | $X_1$ | 11 |
| 13 | 3 | $Y_1$ | 0 |
| 14 | 11 | $X_2$ | 11 |
| 15 | 12 | $X_2$ | 11 |
| 16 | 13 | $X_3$ | 13 |

NOTIFICATION INFORMATION: $X_1=-2$, $X_2=0$, $X_3=+2$, $Y_1=0$

FIG. 7

| SUBCARRIER BLOCK NUMBER | SELECTED MODULATION PARAMETER | NOTIFICATION INFORMATION | RECONSTRUCTED MODULATION PARAMETER |
|---|---|---|---|
| 1 | 11 | 11 | 11 |
| 2 | 12 | $X_2$ | 11 |
| 3 | 11 | $X_2$ | 11 |
| 4 | 9 | $X_1$ | 9 |
| 5 | 4 | $Y_1$ | 4 |
| 6 | 6 | $X_3$ | 6 |
| 7 | 6 | $X_2$ | 6 |
| 8 | 5 | $Y_1$ | 4 |
| 9 | 7 | $X_3$ | 6 |
| 10 | 8 | $X_3$ | 8 |
| 11 | 9 | $X_2$ | 8 |
| 12 | 8 | $X_2$ | 8 |
| 13 | 10 | $X_3$ | 10 |
| 14 | 11 | $X_2$ | 10 |
| 15 | 12 | $X_3$ | 12 |
| 16 | 12 | $X_2$ | 12 |

NOTIFICATION INFORMATION: $X_1=-2$, $X_2=0$, $X_3=+2$, $Y_1=4$

FIG. 9

| SUBCARRIER BLOCK NUMBER | SELECTED MODULATION PARAMETER | NOTIFICATION INFORMATION | RECONSTRUCTED MODULATION PARAMETER |
|---|---|---|---|
| 1 (STARTING POINT) | 6 | 6 | 6 |
| 2 | 5 | $X_1$ | 4 |
| 3 | 4 | $X_2$ | 4 |
| 4 | 2 | $X_1$ | 2 |
| 5 | 4 | $X_3$ | 4 |
| 6 (STARTING POINT) | 6 | 6 | 6 |
| 7 | 7 | $X_2$ | 6 |
| 8 | 8 | $X_3$ | 8 |
| 9 | 8 | $X_2$ | 8 |
| 10 | 10 | $X_3$ | 10 |
| 11 (STARTING POINT) | 11 | 11 | 11 |
| 12 | 12 | $X_2$ | 11 |
| 13 | 12 | $X_2$ | 11 |
| 14 | 11 | $X_2$ | 11 |
| 15 | 8 | $X_1$ | 9 |
| 16 (STARTING POINT) | 6 | 6 | 6 |

NOTIFICATION INFORMATION: $X_1=-2$, $X_2=0$, $X_3=+2$, $Y_1=0$

FIG. 17

| SUBCARRIER BLOCK NUMBER | SELECTED MODULATION PARAMETER | NOTIFICATION INFORMATION | RECONSTRUCTED MODULATION PARAMETER |
|---|---|---|---|
| 1 (STARTING POINT) | 6 | 6 | 6 |
| 2 | 5 | $X_1$ | 4 |
| 3 | 4 | $X_2$ | 4 |
| 4 | 2 | $X_1$ | 2 |
| 5 | 4 | $X_1$ | 4 |
| 6 (STARTING POINT) | 6 | 6 | 6 |
| 7 | 7 | $X_2$ | 6 |
| 8 | 8 | $X_3$ | 8 |
| 9 | 8 | $X_2$ | 9 |
| 10 | 10 | $X_1$ | 9 |
| 11 (STARTING POINT) | 11 | 11 | 11 |
| 12 | 12 | $X_2$ | 11 |
| 13 | 12 | $X_2$ | 11 |
| 14 | 11 | $X_3$ | 10 |
| 15 | 8 | $X_3$ | 8 |
| 16 (STARTING POINT) | 6 | 6 | 6 |

NOTIFICATION INFORMATION: $X_1 = -2$, $X_2 = 0$, $X_3 = +2$, $Y_1 = 0$

FIG. 19

| SUBCARRIER BLOCK NUMBER | SELECTED MODULATION PARAMETER | NOTIFICATION INFORMATION | RECONSTRUCTED MODULATION PARAMETER |
|---|---|---|---|
| 1 (STARTING POINT) | 6 | 6 | 6 |
| 2 | 5 | $X_1$ | 4 |
| 3 | 4 | $X_2$ | 4 |
| 4 | 0 | $Y_1$ | 0 |
| 5 | 4 | $X_1$ | 4 |
| 6 (STARTING POINT) | 6 | 6 | 6 |
| 7 | 7 | $X_2$ | 6 |
| 8 | 8 | $X_3$ | 8 |
| 9 | 8 | $X_1$ | 7 |
| 10 | 10 | $X_1$ | 9 |
| 11 (STARTING POINT) | 11 | 11 | 11 |
| 12 | 11 | $X_2$ | 11 |
| 13 | 9 | $X_1$ | 9 |
| 14 | 7 | $X_1$ | 7 |
| 15 | 1 | $Y_1$ | 0 |
| 16 (STARTING POINT) | 4 | 4 | 4 |

NOTIFICATION INFORMATION: $X_1=-2$, $X_2=0$, $X_3=+2$, $Y_1=0$

FIG. 24

| SUBCARRIER BLOCK NUMBER | SELECTED MODULATION PARAMETER | NOTIFICATION INFORMATION | RECONSTRUCTED MODULATION PARAMETER |
|---|---|---|---|
| 1 | 11 | 11 | 11 |
| 2 | 12 | $X_3$ | 12 |
| 3 | 11 | $X_1$ | 11 |
| 4 | 9 | $Y_1$ | 8 |
| 5 | 6 | $Y_1$ | 5 |
| 6 | 0 | $Y_1$ | 2 |
| 7 | 7 | $X_3$ | 3 |
| 8 | 10 | $Y_1$ | 6 |
| 9 | 12 | $Y_1$ | 9 |
| 10 | 13 | $Y_1$ | 12 |
| 11 | 13 | $X_3$ | 13 |
| 12 | 12 | $X_1$ | 12 |
| 13 | 3 | $Y_1$ | 9 |
| 14 | 11 | $X_3$ | 10 |
| 15 | 12 | $X_3$ | 11 |
| 16 | 13 | $X_3$ | 12 |

NOTIFICATION INFORMATION: $X_1=-1$, $X_2=0$, $X_3=+1$, $Y_1=3$

FIG. 30

| SUBCARRIER BLOCK NUMBER | SELECTED MODULATION PARAMETER | NOTIFICATION INFORMATION | RECONSTRUCTED MODULATION PARAMETER |
| --- | --- | --- | --- |
| 1 | 11 | 11 | 11 |
| 2 | 12 | $X_3$ | 12 |
| 3 | 11 | $X_1$ | 11 |
| 4 | 9 | $Y_1$ | 8 |
| 5 | 6 | $Y_1$ | 5 |
| 6 | 0 | $Y_1$ | 2 |
| 7 | 7 | $Y_1$ | 5 |
| 8 | 10 | $Y_1$ | 8 |
| 9 | 12 | $Y_1$ | 11 |
| 10 | 13 | $X_3$ | 12 |
| 11 | 13 | $X_3$ | 13 |
| 12 | 12 | $X_1$ | 12 |
| 13 | 3 | $Y_1$ | 9 |
| 14 | 11 | $X_3$ | 10 |
| 15 | 12 | $X_3$ | 11 |
| 16 | 13 | $X_3$ | 12 |

NOTIFICATION INFORMATION: $X_1=-1$, $X_2=0$, $X_3=+1$, $Y_1=3$

FIG. 32

| k | $Q_k$ | $Q^d_{k-1}$ | $\Delta Q^d_k$ DETERMINED IN S102 | $\Delta Q^d_k$ DETERMINED IN S115 |
|---|---|---|---|---|
| 1 | 5 | — | 5 | — |
| 2 | 3 | 5 | — | −2 |
| 3 | 0 | 3 | — | −2 |
| 4 | 3 | 1 | — | +1 |
| 5 | 5 | 2 | — | +1 |
| 6 | 6 | 3 | — | +1 |
| 7 | 7 | 4 | — | +1 |
| 8 | 7 | 5 | — | +1 |
| 9 | 7 | 6 | — | +1 |
| 10 | 5 | 7 | — | −2 |
| ... | ... | ... | ... | ... |

FIG. 39

| MCS LEVEL | CNR VALUE |
|---|---|
| MCS1 | -2.5 |
| MCS2 | -0.5 |
| MCS3 | 0.5 |
| MCS4 | 2.5 |
| MCS5 | 3.5 |
| ⋮ | ⋮ |
| MCS16 | 18 |

FIG. 47

| SIGN | WEIGHT |
|---|---|
| POSITIVE | 1 |
| NEGATIVE | 2 |

FIG. 48

NOTIFICATION INFORMATION GENERATING APPARATUS, COMMUNICATION APPARATUS, NOTIFICATION INFORMATION GENERATING METHOD AND PROGRAM

TECHNICAL FIELD

The present invention relates to techniques for generating notification information to notify a communicating party of information related to propagation path conditions in a communication scheme to perform communication using a plurality of subcarriers.

BACKGROUND ART

In order to improve efficiency (system total throughput and transmission rate) of communication in the communication system, adaptive modulation schemes have been studied to determine a modulation scheme, channel coding rate, error correcting coding scheme, spreading factor, the number of code multiplexes, transmit power, a combination thereof or the like (hereinafter, referred to as a modulation parameter) corresponding to a reception state (see Non-patent Documents 1 and 2).

In the communication system adopting the adaptive modulation scheme, it is necessary to notify a communicating party apparatus of propagation path conditions as described below or a modulation parameter selected corresponding to the propagation path conditions as information obtained from the reception state. The propagation path conditions include:
"SNR: Signal to Noise power Ratio";
"SIR: Signal to Interference power Ratio";
"SINR: Signal to Interference plus Noise power Ratio";
"CNR: Carrier to Noise power Ratio";
"CIR: Carrier to Interference power Ratio";
"CINR: Carrier to Interference plus Noise power Ratio";
"DUR: Desired signal to Undesired signal power Ratio";
"Ratio of average reception energy per symbol to noise power density ($E_s/N_o$)";
"Ratio of average reception energy per bit to noise power density ($E_b/N_o$)";
"Ratio of average reception energy per symbol to interference power density ($E_s/I_o$);" and
"Ratio of average reception energy per bit to interference power density ($E_b/I_o$)".

For example, in a system comprised of a base station apparatus and terminal apparatuses adopting Frequency Division Duplex (hereinafter, abbreviated as "FDD") in communications (hereinafter, referred to as downlink) from the base station apparatus to terminal apparatuses and communications (hereinafter, referred to as uplink) from the terminal apparatuses to base station apparatus, when the adaptive modulation scheme is applied on downlink, it is possible to configure systems as described below.

(1) The terminal apparatus estimates propagation path conditions from a reception signal on downlink, and notifies the base station apparatus of the estimated propagation path conditions as the uplink notification information. The base station apparatus selects a modulation parameter for data to the terminal apparatus on downlink based on the notification information to perform adaptive modulation, and prior to transmission of the data subjected to adaptive modulation, notifies the terminal apparatus of the selected modulation parameter as the downlink notification information.

(2) The terminal apparatus estimates propagation path conditions from a reception signal on downlink, selects a modulation parameter for transmission data to the terminal apparatus on downlink based on the propagation path conditions, and notifies the base station apparatus of the selected modulation parameter as the uplink notification information. The base station apparatus performs adaptive modulation on the data to the terminal apparatus on downlink based on the modulation parameter, and prior to transmission of the data subjected to adaptive modulation, notifies the terminal apparatus of the selected modulation parameter as the downlink notification information.

In addition, in the description of the invention, notification information that is simply described indicates either or both of the uplink notification information and the downlink notification information.

Such a system has been proposed that CIR obtained from a latest downlink reception signal is compared with the total sum of previous notification information, and that binary information indicating a decrease or increase is notified as the uplink notification information (see Non-patent Document 3).

FIG. 53 is a block diagram showing an example of a configuration of a notification information generating apparatus 900 that generates conventional notification information.

A determining section 901 receives a CIR measurement value measured from a reception signal, and outputs the CIR measurement value as notification information without modification in initial notification, while outputting the CIR measurement value to an accumulator 902. Further, the determining section 901 receives a storage value stored in the accumulator 902, compares the CIR measurement value with the storage value except the initial notification, and outputs notification information of "UP" when the CIR measurement value is larger, while outputting a value (addition result) obtained by adding 0.5 dB to the storage value to the accumulator 902, outputs notification information of "DOWN" when the CIR measurement value is smaller, while outputting a value (addition result) obtained by adding −0.5 dB to the storage value to the accumulator 902, or outputs the CIR measurement value when the CIR measurement value is equal to the storage value.

The accumulator 902 stores the CIR measurement value or the addition result input from the determining section 901, and outputs the stored storage value to the determining section 901.

For example, in a multicarrier communication system for transmitting information using a plurality of subcarriers, such a subcarrier adaptive modulation scheme has been studied that adaptive modulation is performed for each subcarrier or for each block comprised of a plurality of subcarriers to further improve efficiency of communication (see Non-patent Documents 4 and 5).

In such a subcarrier adaptive modulation scheme in the multicarrier communication system, it is necessary to notify a communicating party apparatus of information obtained from the reception state on a subcarrier basis or on a subcarrier block basis.

In the multicarrier communication system, such a scheme has further been proposed that for CSI (Channel State Information) that is information obtained from the reception state, a plurality of subcarriers is grouped, new CSI is obtained by subtracting an average value of CSI of the group from original CSI, the group is further divided into a plurality of subgroups, the average value is calculated similarly for each subgroup and subtracted from original CSI, such operation is repeated in subgroups of a plurality of hierarchies, and that an average value obtained in each hierarchy is updated in a different period for each hierarchy and notified (see Non-patent Document 6).

Further, in the case of performing adaptive modulation in a system of Orthogonal Frequency Division Multiplexing Access (hereinafter, abbreviated as OFDMA) that is a multiple access system originated from Orthogonal Frequency Division Multiplexing (hereinafter, abbreviated as OFDM) that is one of multicarrier communication systems, such a scheme has been proposed that for a selected band (group of subcarriers), CQI (Channel Quality Indicator) that is uplink notification information is notified using a difference value from the last notification (see Non-patent Document 7).

Non-patent Document 1: "A Study on Adaptive Modulated High Mobility OFDM Radio Transmission System", Takako Yamamura et al. Technical report of IEICE RCS99-146, November, 1999, p. 33-40

Non-patent Document 2: "Experimental Evaluations of Adaptive Modulation and Channel Coding in Forward Link for VSF-OFCDM Broadband Wireless Access", Yoshihisa Kishiyama et al. Technical report of IEICE RCS2003-25, May, 2003, p. 7-14

Non-patent Document 3: "Medium Access Control (MAC) Standard for cdma2000 Spread Spectrum Systems Release D", ARIB STD-T64-C.S0003-D v1.0, Association of Radio Industries and Businesses, September, 2005, p. 2-145-2-147

Non-patent Document 4: "OFDM Based Adaptive Modulation Systems with a Multilevel Transmit Power Control for High Bit Rate Transmission", Tomoaki Yoshiki et al. The transactions of the Institute of Electronics, Information and Communication Engineers, B Vol. J84-B, No. 7, July, 2001, Non-patent Document 5: "On OFDM/TDD Transmission Scheme with Subcarrier Adaptive Modulation", Fumiaki Maehara et al. Proceedings of the IEICE General Conference, B-5-100, March, 2001, P. 498

Non-patent Document 6: "A Study on CSI Feedback Bandwidth Reduction Method for FDD-based OFDM Systems", Katsuyuki Motoyoshi, Proceedings of the Society Conference of IEICE, B-5-28, September, 2005, p. 428

Non-patent Document 7: "Uplink CQI channel for OFDMA PHY", IEEE802.16d-04/84rl, (US), IEEE, Apr. 28, 2004

DISCLOSURE OF INVENTION

Problems to be Solved by the Invention

In the multicarrier communication system to carry information on a plurality of subcarrier to perform communication, when adaptive modulation is performed for each subcarrier block comprised of at least one subcarrier, it is necessary to notify the information obtained from the reception state on a subcarrier block basis. However, in the case of notifying the information obtained from the reception state without modification, as the notification information is needed the information with the number of bits of (the number of bits required to represent the information obtained from the reception state) multiplied by (the number of subcarrier blocks). For example, in the case of a system where the number of bits required to represent the information obtained from the reception state is "8" and the number of subcarrier blocks is "768", 6144 bits are needed as one notification information.

The notification information with such a high number of bits is significant overhead for data communication, and has the problem of decreasing system throughput. Further, when the notification information is notified using a control channel used in exchange of control information between communication apparatuses, such a problem arises that the limited band of the control channel is further limited. Moreover, the time required for transmission and reception becomes long, and there has been the problem of resulting in increases in power consumption.

In Non-patent Document 3, an increase or decrease of the level is determined only according to levels of the measurement value and storage value, and when the notification information has a plurality of bits, more detailed comparison is required as well as comparison between the measurement value and storage value.

In Non-patent Document 6, in the OFDM system, such a scheme has been proposed that subcarriers are grouped hierarchically, a difference between the average value of CSI in the group and original CSI is repeatedly obtained over each hierarchy, and that the average value of CSI obtained in each hierarchy is updated in a different period for each hierarchy and notified. In this scheme, since the information amount of the notification information varies greatly every time, the problem arises that the configuration of the control channel for transmitting the control information is complicated in general systems for transmitting the notification information as part of the control information.

Further, as compared with compression using the difference of speech data and the like, reductions in information amount of the control information in the communication system have high requirements for error tolerance, the design requires consideration of error correcting coding gain in the modulation parameter indicated by the notification information, and it is thereby difficult to apply the compression technique using the difference of speech data and the like without modification.

The present invention is carried out in view of such circumstances, and it is an object of the invention to provide a notification information generating apparatus and method for generating notification information to improve accuracy of channel quality information reconstructed based on a difference in the case of notifying the channel quality information obtained from a reception state of each channel to a communicating party using the difference of the channel quality information between a plurality of channels.

Means for Solving the Problem (1-1-3) To attain the above-mentioned object, the present invention provides the following means. In other words, a notification information generating apparatus according to the invention is a notification information generating apparatus that generates notification information based on channel quality information obtained from a reception state of each channel in a communication scheme for performing communication using a plurality of channels, and is characterized by selecting a single candidate value from candidate values for the notification information including at least one difference-value candidate value indicating a difference between two pieces of channel quality information and at least one non-difference value candidate value indicating channel quality information and generating the notification information based on the selected candidate value.

Thus, a difference value between two pieces of channel quality information is calculated, the notification information is generated by approximating the difference value by one of the difference-value candidate value and the non-difference value candidate value and is notified to a communicating party, and it is thereby possible to reduce the information amount of the notification information, while improving accuracy of the channel quality information reconstructed based on the notification information. By using the non-difference value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(2-1-4) A notification information generating apparatus according to the invention is a notification information generating apparatus that generates notification information based on channel quality information obtained from a reception state of each channel in a communication scheme for performing communication using a plurality of channels, and is characterized by having a notification information table that stores a plurality of difference-value candidate values each indicating a difference between two pieces of channel quality information and a plurality of non-difference value candidate values each indicating channel quality information as candidate values for the notification information, a reconstructing section that generates a reconstruction value using the notification information generated based on the channel quality information of a first channel, and a selecting section which receives the channel quality information of a second channel differing from the first channel, selects a single candidate value from the candidate values for the notification information based on the channel quality information of the second channel and the reconstruction value, and generates the notification information based on the selected candidate value.

Thus, the difference-value candidate value or the non-difference value candidate value is selected based on the reconstruction value of the first channel and the channel quality information of the second channel, the notification information is generated based on the selected candidate value and is notified to a communicating party, and the information amount of the notification information is thereby reduced, while improving accuracy of the channel quality information reconstructed based on the notification information. By using the non-difference value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(3-1-5) Further, in the notification information generating apparatus according to the invention, the selecting section is characterized by selecting a candidate value based on a difference value between the channel quality information of the second channel and the reconstruction value, and the channel quality information of the second channel.

Thus, the selecting section selects a candidate value based on the calculated difference value and the channel quality information of the second channel, and is thereby capable of suitably selecting either the difference-value candidate value or the non-difference value candidate value.

(4-1-6) In the notification information generating apparatus according to the invention, features are that the reconstructing section generates a reconstruction value of the first channel obtained by reconstructing the channel quality information of the first channel, and that the selecting section calculates a difference value between the channel quality information of the second channel and the reconstruction value of the first channel, and based on the calculated difference value, selects a single candidate value from the candidate values for the notification information.

Thus, by calculating a difference value between a provisional reconstruction value of the second channel and the channel quality information of the second channel, and generating the notification information obtained by approximating the difference value by either the difference-value candidate value or the non-difference value candidate value to notify the communicating party, it is possible to reduce the information amount of the notification information, while improving accuracy of the channel quality information reconstructed based on the notification information.

(5-1-7) In the notification information generating apparatus according to the invention, the selecting section is characterized by selecting a single candidate value based on a value obtained by adding the reconstruction value of the first channel and the difference-value candidate value, the non-difference value candidate value, and the channel quality information of the second channel to generate the notification information.

Thus, the selecting section selects a single candidate value based on a value obtained by adding the reconstructed channel quality information of the first channel and the difference-value candidate value, the non-difference value candidate value, and the channel quality information of the second channel, and it is thereby possible to generate more suitable notification information, and to improve accuracy of the reconstructed channel quality information.

(6-1-8) In the notification information generating apparatus according to the invention, features are that the reconstructing section generates a plurality of provisional reconstruction values of the second channel including the non-difference value candidate value, and the value obtained by adding the difference-value candidate value to the reconstruction value obtained by reconstructing the channel quality information of the first channel, and that the selecting section selects a single candidate value from the candidate values for notification information based on a difference value between the channel quality information of the second channel and each of the plurality of reconstruction values of the second channel.

Thus, by calculating a difference value between a provisional reconstruction value of the second channel and the channel quality information of the second channel, and generating the notification information obtained by approximating the difference value by either the difference-value candidate value or the non-difference value candidate value to notify the communicating party, it is possible to reduce the information amount of the notification information, while improving accuracy of the channel quality information reconstructed based on the notification information.

(7-1-9) In the notification information generating apparatus according to the invention, the selecting section is characterized by receiving the channel quality information of a plurality of channels, determining a candidate value for the notification information based on the received plurality of channel quality information, and updating the notification information table based on the determined candidate value for the notification information.

Thus, by determining the non-difference value candidate value based on the plurality of channel quality information, and updating the notification information table, it is possible to determine a suitable notification information candidate value to generate the notification information while adapting to the propagation path conditions with flexibility, and to improve accuracy of the reconstructed channel quality information.

(8-1-10) In the notification information generating apparatus according to the invention, features are that the selecting section holds information of a starting-point channel as a starting point in calculating the difference value, and when the second channel is a starting point in calculating the difference value, outputs one of the channel quality information of the second channel and predetermined channel quality information as the notification information, and that the reconstructing section receives a plurality of notification information generated in the selecting section as the notification information of each channel, and calculates a cumulative value by sequentially adding the notification information of each channel to the notification information of the starting-point channel to generate a reconstruction value.

Thus, by using the notified channel quality information or predetermined channel quality information as the information of the starting-point channel, it is possible to improve accuracy of the reconstructed channel quality information. The predetermined channel quality information may be one of non-difference value candidate values, or may use an average value of a plurality of channel quality information.

(9-1-11) In the notification information generating apparatus according to the invention, features are that the selecting section holds information of a plurality of starting-point channels each as a starting point in calculating the difference value, and when the second channel is one of the starting-point channels in calculating the difference value, outputs one of the channel quality information of the second channel and predetermined channel quality information as the notification information, and that the reconstructing section receives a plurality of notification information generated in the selecting section as the notification information of each channel, and calculates a cumulative value by sequentially adding the notification information of each channel to the notification information of one of the plurality of starting-point channels to generate a reconstruction value.

Thus, by using the notified channel quality information or predetermined channel quality information as the information of the starting-point channel, it is possible to improve accuracy of the reconstructed channel quality information. The predetermined channel quality information may be one of non-difference value candidate values, or may use an average value of a plurality of channel quality information. Further, by providing a plurality of starting-point channels, it is possible to improve accuracy of the reconstruction value.

(10-1-12) In the notification information generating apparatus according to the invention, the reconstructing section is characterized by calculating a cumulative value by sequentially adding the notification information of each channel from a starting-point channel near a target channel to generate the reconstruction value to the target channel, and thereby generating the reconstruction value.

Thus, it is possible to generate the notification information and reconstruction value using the starting-point channel nearer the target channel. It is thereby possible to improve accuracy of the notification information and the reconstruction value.

(11-1-13) In the notification information generating apparatus according to the invention, the reconstructing section is characterized by determining a channel to add the notification information to the cumulative value in generating the reconstruction value of each channel, based on positions of the plurality of starting-point channels and a position of a channel such that the non-difference value candidate value is selected as the notification information.

Thus, for channels existing between two starting-point channels, it is possible to select the notification information to add to the cumulative value, based on the positions of starting-point channels and the position of a channel such that the non-difference value candidate value is selected as the notification information. By this means, the reconstruction value can be generated while reducing the effect of a channel having high difference values from the other channels such as a channel such that the non-difference value candidate value is selected. It is thereby possible to improve accuracy of the notification information and the reconstruction value.

(12-1-14) In the notification information generating apparatus according to the invention, it is a feature that at least one of the number of the plurality of starting-point channels and an arrangement interval is determined based on at least one of a channel interval of the plurality of channels, delay dispersion value of the propagation path obtained from the reception state, Doppler frequency, and a variation width in the channel quality information between channels.

Thus, by suitably controlling the number of channels as a starting point (to notify complete channel quality information) and the interval corresponding to the variation in the frequency direction, it is possible to generate the notification information and reconstruction value with high accuracy and high efficiency.

(13-1-15) In the notification information generating apparatus according to the invention, the notification information table is characterized by storing candidate values for the notification information determined based on at least one of the number of the plurality of starting-point channels and the arrangement interval.

Thus, by varying the candidate value for the notification information corresponding to changes in the number of starting-point channels and the arrangement interval to store in the notification information table, it is possible to generate the notification information and reconstruction value with higher accuracy. By this means, it is possible to generate the notification information and reconstruction value with high accuracy and high efficiency.

(14-1-16) In the notification information generating apparatus according to the invention, the notification information table is characterized by increasing the number of candidate values for the notification information to store, based on either the relationship inversely proportional to the number of the plurality of starting-point channels or the relationship proportional to the arrangement interval of the plurality of starting-point channels.

Thus, by increasing the number of bits of the candidate value as the number of starting-point channels decreases or the arrangement interval of the starting-point channels increases, or inversely, by decreasing the number of bits of the candidate value as the number of starting-point channels increases or the arrangement interval of the starting-point channels decreases, it is possible to perform control so as to keep the total number of bits required to transmit the notification information at a (almost) constant value. Further, since the possibility of increasing the variation width (fluctuation of the channel quality information) between starting-point channels is higher as the arrangement interval of the starting-point channels increases, it is also made possible to maintain the accuracy by using the higher number of bits to increase the number of candidate values.

(15-1-17) In the notification information generating apparatus according to the invention, the reconstructing section is characterized by replacing the cumulative value with the notification information of an arbitrary channel when the notification information of the arbitrary channel is a non-difference value candidate value to generate a reconstruction value of the arbitrary channel.

Thus, in calculating the cumulative value to reconstruct the channel quality information, when the notification information is a non-difference value candidate value, by assigning the notification information (non-difference value candidate value) to the cumulative value to replace, it is possible to improve accuracy of the reconstructed channel quality information.

(16-1-18) In the notification information generating apparatus according to the invention, the reconstructing section is characterized by generating a reconstruction value of an arbitrary channel without adding the notification information of the arbitrary value to the cumulative value when the notification information of the arbitrary channel is the non-difference value candidate value.

Thus, in calculating the cumulative value to reconstruct the channel quality information, when the notification information is a non-difference value candidate value, by not adding the notification information (non-difference value candidate value) to the cumulative value, it is possible to improve accuracy of the reconstructed channel quality information.

(17-1-19) In the notification information generating apparatus according to the invention, features are that the selecting section generates the notification information with n bits, and that the notification information table has a storage area for storing n bits to store $2^n$ candidate-value numbers identifying candidate values for the notification information and the candidate values for the notification information associated respectively with the $2^n$ candidate-value numbers.

Thus, by generating the notification information with n bits using the candidate-value number, the information amount of the notification information can be suppressed. By this means, it is possible to suppress the control information amount transmitted and received between communication apparatuses.

(18-1-20) In the notification information generating apparatus according to the invention, it is a feature that the non-difference value candidate value includes information indicative of a channel on which transmission is not performed.

Thus, as the non-difference value candidate value, such information is included that indicates a carrier hole that is not transmitted on the channel, and it is thereby possible to notify the communicating party of the existence of the carrier hole.

(19-1-21) In the notification information generating apparatus according to the invention, it is a feature that the non-difference value candidate value includes information indicating the channel quality information notified on a channel with poor propagation path conditions among the plurality of channels.

Thus, as the non-difference value candidate value, by including information indicating poor propagation path conditions of the channel, it is possible to notify the communicating party that the propagation path conditions are poor. Further, even when a channel exists that has extremely poor propagation path conditions as compared with the other channels among the plurality of channels, the propagation path conditions can be notified with more accuracy.

(20-1-22) In the notification information generating apparatus according to the invention, it is a feature that the non-difference value candidate value includes information indicating the channel quality information calculated by performing statistics on the channel quality information of the plurality of channels.

Thus, by determining a non-difference value candidate value based on the information obtained by performing statistics on the plurality of channel quality information, it is possible to appropriately notify the information indicating propagation path conditions.

(21-1-27) A communication apparatus according to the invention is a communication apparatus that performs communication using a plurality of channels, and is characterized by having the notification information generating apparatus as described in any one of above-mentioned items (1-1-3) to (20-1-22), and a transmitting section that transmits the notification information generated in the notification information generating apparatus to the communicating party.

Thus, a difference value between two pieces of channel quality information is calculated, the notification information is generated by approximating the difference value by either the difference-value candidate value or the non-difference value candidate value and is notified to a communicating party, and it is thereby possible to reduce the information amount of the notification information, while improving accuracy of the channel quality information reconstructed based on the notification information. By this means, it is also possible to suppress the notification information amount that the transmitting section (radio transmission section) transmits.

(22-1-28) A notification information generating method according to the invention is a notification information generating method for generating notification information based on channel quality information obtained from a reception state of each channel in a communication scheme for performing communication using a plurality of channels, and is characterized by selecting a single candidate value from candidate values for the notification information including at least one difference-value candidate value indicating a difference between two pieces of channel quality information and at least one non-difference value candidate value indicating channel quality information and generating the notification information based on the selected candidate value.

Thus, a difference value between two pieces of channel quality information is calculated, the notification information is generated by approximating the difference value by either the difference-value candidate value or the non-difference value candidate value and is notified to a communicating party, and it is thereby possible to reduce the information amount of the notification information, while improving accuracy of the channel quality information reconstructed based on the notification information. By using the non-difference value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(23-1-29) A notification information generating method according to the invention is a notification information generating method for generating notification information based on channel quality information obtained from a reception state of each channel in a communication scheme for performing communication using a plurality of channels, and is characterized by having the steps of storing in a notification information table a plurality of difference-value candidate values each indicating a difference between two pieces of channel quality information and non-difference value candidate values each indicating channel quality information as candidate values for the notification information, of generating a reconstruction value using the notification information generated based on the channel quality information of a first channel, and of receiving the channel quality information of a second channel differing from the first channel, selecting a single candidate from the candidate values for the notification information based on the channel quality information of the second channel and the reconstruction value, and generating the notification information based on the selected candidate value.

Thus, by using the non-difference value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(24-1-30) A program to make a computer execute procedures for generating notification information according to the invention is a program to make a computer execute procedures for generating notification information based on channel quality information obtained from a reception state of each channel in a communication scheme for performing communication using a plurality of channels, and is to make a computer execute the procedures of storing in a notification information table a plurality of difference-value candidate values each indicating a difference between two pieces of channel quality information and non-difference value candidate values each indicating channel quality information as candidate values for the notification information, of generating a reconstruction value using the notification information generated based on the channel quality information of a first channel, and of receiving the channel quality information of a second channel differing from the first channel, selecting a single candidate from the candidate values for the notification information based on the channel quality information of the second channel and the reconstruction value, and generating the notification information based on the selected candidate value.

Thus, by using the non-difference value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(25-2-1) Further, a notification information generating apparatus according to the invention is a notification information generating apparatus that generates notification information based on channel quality information obtained from a reception state of each channel in a communication scheme for performing communication using a plurality of channels, and is characterized by having a selecting section which selects a single candidate value from candidate values for the notification information including at least one difference-value candidate value indicating a difference between two pieces of channel quality information using a sign and at least one absolute-value candidate value indicating an absolute value of a difference between two pieces of channel quality information, and generates the notification information based on the selected candidate value.

Thus, the notification information is generated by approximating the difference value by one of the difference-value candidate value and the absolute-value candidate value and is notified to a communicating party, and it is thereby possible to reduce the information amount of the notification information, while improving accuracy of the channel quality information reconstructed based on the notification information. By using the absolute-value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(26-2-2) Further, in the notification information generating apparatus according to the invention, features are that the apparatus further has a notification information table that stores a plurality of difference-value candidate values and a plurality of absolute-value candidate values as candidate values for the notification information, and a reconstructing section that generates a reconstruction value using the notification information generated based on the channel quality information of a first channel, and that the selecting section receives the channel quality information of a second channel differing from the first channel, selects a single candidate value from the candidate values for the notification information based on the channel quality information of the second channel and the reconstruction value, and generates the notification information based on the selected candidate value.

Thus, the difference-value candidate value or the absolute-value candidate value is selected based on the reconstruction value of the first channel and the channel quality information of the second channel, the notification information is generated based on the selected candidate value and is notified to a communicating party, and the information amount of the notification information is thereby reduced, while improving accuracy of the channel quality information reconstructed based on the notification information. By using the absolute-value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(27-2-3) Further, in the notification information generating apparatus according to the invention, features are that the reconstructing section generates a reconstruction value of the first channel obtained by reconstructing the channel quality information of the first channel, and that the selecting section calculates a difference value between the channel quality information of the second channel and the reconstruction value of the first channel, and based on the calculated difference value, selects a single candidate value from the candidate values for the notification information.

Thus, the selecting section selects a candidate value based on the calculated difference value and the channel quality information of the second channel, and is thereby capable of suitably selecting either the difference-value candidate value or the absolute-value candidate value.

(28-2-4) In the notification information generating apparatus according to the invention, features are that the reconstructing section generates a plurality of provisional reconstruction values of the second channel obtained by adding the candidate values for the notification information to the reconstruction value obtained by reconstructing the channel quality information of the first channel, and that the selecting section selects a single candidate value from the candidate values for the notification information based on a plurality of difference values between the channel quality information of the second channel and each of the plurality of reconstruction values of the second channel.

Thus, by calculating a difference value between a provisional reconstruction value of the second channel and the channel quality information of the second channel, and generating the notification information obtained by approximating the difference value by either the difference-value candidate value or the absolute-value candidate value to notify the communicating party, it is possible to reduce the information amount of the notification information, while improving accuracy of the channel quality information reconstructed based on the notification information.

(29-2-5) In the notification information generating apparatus according to the invention, the selecting section is characterized by receiving the channel quality information of a plurality of channels, determining a candidate value for the notification information based on the received plurality of channel quality information, and updating the notification information table based on the determined candidate value for the notification information.

Thus, by determining the absolute-value candidate value based on the plurality of channel quality information, and updating the notification information table, it is possible to determine a suitable notification information candidate value to generate the notification information while adapting to the propagation path conditions with flexibility, and to improve accuracy of the reconstructed channel quality information.

(30-2-6) In the notification information generating apparatus according to the invention, features are that the selecting section receives information of a channel as a starting point in calculating the difference value, and when the second channel is a starting point in calculating the difference value, outputs one of the channel quality information of the second channel and predetermined channel quality information as the notification information, and that the reconstructing section receives a plurality of notification information generated in the selecting section as last notification information of each channel, and calculates a cumulative value by sequentially adding the last notification information of each channel to the last notification information of the channel as the starting point to generate a reconstruction value.

Thus, by using the notified channel quality information or predetermined channel quality information as the information of the channel as a starting point, it is possible to improve accuracy of the reconstructed channel quality information. The predetermined channel quality information may be one of absolute-value candidate values, or may use an average value of a plurality of channel quality information.

(31-2-7) In the notification information generating apparatus according to the invention, it is a feature that when the notification information of an arbitrary channel is an absolute-value candidate value, the reconstructing section determines a sign of the absolute-value candidate value based on the notification information of a channel before the arbitrary channel, and calculates the cumulative value using a value of the absolute-value candidate value in accordance with the determined sign.

Thus, in calculating a cumulative value to reconstruct the channel quality information, when the notification information is an absolute-value candidate value, it is possible to determine a sign of the absolute-value candidate value based on a sign of the previous channel.

(32-2-8) In the notification information generating apparatus according to the invention, the reconstructing section is characterized by calculating the cumulative value using the sign of the notification information of the channel before the arbitrary channel as the sign of the absolute-value candidate value.

Thus, in calculating a cumulative value to reconstruct the channel quality information, when the notification information is an absolute-value candidate value, it is possible to use a sign of the previous channel as a sign of the absolute-value candidate value.

(33-2-9) In the notification information generating apparatus according to the invention, it is a feature that when the notification information of an arbitrary channel is an absolute-value candidate value, the reconstructing section determines a sign of the absolute-value candidate value based on the calculated cumulative value to calculate the cumulative value.

Thus, in calculating a cumulative value to reconstruct the channel quality information, when the notification information is an absolute-value candidate value, it is possible to determine the sign based on the calculated cumulative value.

(34-2-10) In the notification information generating apparatus according to the invention, the reconstructing section is characterized by determining the sign of the absolute-value candidate value to be a positive sign when the cumulative value is less than a predetermined value, or to be a sign of the notification information of a channel before the arbitrary channel when the cumulative value is the predetermined value or more.

Thus, in calculating a cumulative value to reconstruct the channel quality information, when the notification information is an absolute-value candidate value, it is possible to determine the sign by comparing the calculated cumulative value with a predetermined value.

(35-2-15) In the notification information generating apparatus according to the invention, features are that the reconstructing section determines a sign of an absolute-value candidate value based on at least one of the notification information of the first channel and a reconstruction value of the first channel, and outputs candidate values for the notification information including a value of the determined absolute-value candidate value and the difference-value candidate value to the selecting section, and that the selecting section compares the notification information candidate value output from the reconstructing section with the difference value to select a candidate value.

Thus, the reconstructing section determines the sign of the absolute-value candidate value, and the selecting section is thereby capable of suitably selecting the difference-value candidate value and the absolute-value candidate value based on the difference value.

(36-2-18) A communication apparatus according to the invention is a communication apparatus that performs communication using a plurality of channels, and is characterized by having the notification information generating apparatus as described in any one of above-mentioned items (25-2-1) to (35-2-15), and a transmitting section that transmits the notification information generated in the notification information generating apparatus to the communicating party.

Thus, by generating the notification information by approximating the difference value by either the difference-value candidate value or the absolute-value candidate value to notify a communicating party, it is possible to reduce the information amount of the notification information, while improving accuracy of the channel quality information reconstructed based on the notification information. By using the absolute-value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(37-2-19) A notification information generating method according to the invention is a notification information generating method for generating notification information based on channel quality information obtained from a reception state of each channel in a communication scheme for performing communication using a plurality of channels, and is characterized by selecting a single candidate value from candidate values for the notification information including at least one difference-value candidate value indicating a difference between two pieces of channel quality information using a sign and at least one absolute-value candidate value indicating an absolute value of a difference between two pieces of channel quality information, and generating the notification information based on the selected candidate value.

Thus, by using the absolute-value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(38-2-20) A program to make a computer execute procedures for generating notification information according to the invention is a program to make a computer execute procedures for generating notification information based on channel quality information obtained from a reception state of each channel in a communication scheme for performing communication using a plurality of channels, and is to make a computer execute the procedures of selecting a single candidate value from candidate values for the notification information including at least one difference-value candidate value indicating a difference between two pieces of channel quality information using a sign and at least one absolute-value candidate value indicating an absolute value of a difference between two pieces of channel quality information, and generating the notification information based on the selected candidate value.

Thus, by using the absolute-value candidate value as the notification information, it is made possible to notify the information (such as information in the case where the difference value exceeds the difference-value candidate value, and the like) that cannot be notified by the difference-value candidate value, and the accuracy of the reconstructed quality information can be improved.

(39-3-1) Further, a notification information generating apparatus according to the invention is a notification information generating apparatus that generates notification information based on channel quality information obtained from a reception state of each channel in a communication scheme for performing communication using a plurality of channels, and is characterized by having a reconstructing section which holds notification information generated based on channel quality information of a first channel as last notification information, reconstructs channel quality information based on the held last notification information, and outputs the reconstructed channel quality information as the reconstructed channel quality information of the first channel, and a calculating section which receives as its input channel quality information of a second channel differing from the first channel, calculates a difference value between the input channel quality information of the second channel and the reconstructed channel quality information of the first channel, further calculates an index value based on a difference between the calculated difference value and a value to notify a communicating party as the notification information, and generates the notification information so as to decrease the calculated index value, where the reconstructing section stores the notification information generated in the calculating section as the last notification information.

Thus, according to the notification information generating apparatus according to the invention, it is possible to generate the notification information to notify the channel quality information of a plurality of channels using the difference value. The notification information is a value determined by the calculating section as a value to be notified as the notification information based on the difference value. The difference value is calculated based on the input channel quality information and the channel quality information reconstructed based on the last notification information, the notification information is generated to decrease the index value based on the difference between the calculated difference value and a value to notify the communicating party, and it is thereby possible to improve accuracy in reconstructing the channel quality information.

(40-3-2) Further, in the notification information generating apparatus according to the invention, features are that the apparatus further has a differential information table that stores a plurality of candidate values that are candidates for the difference value calculated in the calculating section as differential information, and that the calculating section calculates a plurality of index values based on a difference between the calculated difference value and each of the plurality of candidate values, selects a single candidate value based on the plurality of calculated index values, and generates the notification information based on the selected candidate value.

Thus, the notification information amount can be reduced by generating the notification information using candidate values for the difference value, while enabling generation of the notification information for improving accuracy in reconstructing the channel quality information by calculating the difference value based on the input channel quality information and the channel quality information reconstructed based on the last notification information.

(41-3-3) In the notification information generating apparatus according to the invention, it is a feature that when the difference value is calculated using the second channel as a starting point, the calculating section sets one of the channel quality information of the second channel and predetermined quality information on the notification information to output.

Thus, by setting the channel quality information as a starting point, the notification information can be generated using the difference value from the channel quality information of the channel as the starting point. By this means, it is possible to reduce the notification information amount, and to generate the notification information for improving accuracy of the reconstructed channel quality information.

(42-3-4) In the notification information generating apparatus according to the invention, the calculating section is characterized by adding each of the plurality of candidate values to the reconstructed channel quality information of the first channel to generate a plurality of provisional channel quality information of the second channel, calculating a second index value based on a difference between the input channel quality information of the second channel and each of the generated provisional channel quality information of the second channel, and selecting a candidate value used in the provisional channel quality information of the second channel with the calculated second index value being small.

Thus, the provisional channel quality information is generated based on the channel quality information reconstructed based on the notification information, and based on the difference between the input channel quality information and the provisional channel quality information, it is possible to calculate an index value calculated based on a difference between the difference value and the candidate value. By selecting a candidate value that decreases the index value, it is possible to generate the notification information for improving accuracy of the reconstructed channel quality information.

(43-3-5) In the notification information generating apparatus according to the invention, the calculating section is characterized by receiving as its input the channel quality information of a plurality of different channels including at least the channel quality information of the second channel and the channel quality information of a third channel differing from the first and second channels, adding each of the plurality of candidate values to the reconstructed channel quality information of the first channel to generate a plurality of provisional channel quality information of the second channel, calculating a second index value based on a difference between the input channel quality information of the second channel and each of the generated provisional channel quality information of the second channel, adding each of the plurality of candidate values to each of the provisional channel quality information of the second channel to generate a plurality of provisional channel quality information of the third channel, calculating a third index value based on a difference between the input channel quality information of the third channel and each of the generated provisional channel quality information of the third channel, thus repeating generating provisional channel quality information on each of the input plurality of different channels, calculating a plurality of index values including at least the second index value and the third index value, and selecting a candidate value used in the provisional channel quality information of the second channel with the sum of calculated index values being small.

Thus, by generating the provisional channel quality information obtained by reconstructing the channel quality information of a channel after the channel, it is possible to generate the notification information for improving accuracy of the reconstructed channel quality information.

(44-3-6) In the notification information generating apparatus according to the invention, it is a feature that the calculating section holds a plurality of predetermined quality information, receives channel quality information of a plurality of channels including a channel used as a starting point, calculates a difference between the difference value and the selected candidate value on each of the plurality of channels to add whenever setting each of the plurality of the predetermined quality information on the notification information of the channel used as a starting point, and selects the predetermined quality information that decreases the added difference to set on the notification information of the channel used as a starting point.

Thus, by preparing a plurality of values of quality information as a starting point and setting so as to decrease the index value, it is possible to generate the notification information for improving accuracy of the reconstructed channel quality information.

(45-3-7) In the notification information generating apparatus according to the invention, the calculating section is characterized by calculating the square of a difference between the difference value and each of the plurality of candidate values to calculate an index value.

Thus, by using the square error as an index, it is possible to select a candidate value for improving accuracy of the reconstructed channel quality information.

(46-3-8) In the notification information generating apparatus according to the invention, it is a feature that the calculating section calculates an absolute value of a difference between the difference value and each of the plurality of candidate values as an index value.

Thus, by using an absolute value of a difference between the difference value and the candidate value as an index value, it is possible to select a candidate value for improving accuracy of the reconstructed channel quality information.

(47-3-9) In the notification information generating apparatus according to the invention, the calculating section is characterized by multiplying the calculated index value by a predetermined coefficient.

Thus, by weighting the index value, it is possible to improve quality of a signal to be processed (subjected to demodulation and decoding) based on the channel quality information that is the control information.

(48-3-10) In the notification information generating apparatus according to the invention, it is a feature that the calculating section multiplies the index value by a value corresponding to a sign of a difference between the difference value and each of the plurality of candidate values as a predetermined coefficient.

Thus, by weighting the index value in consideration of the level relationship between the difference value and the candidate value, it is possible to improve quality of a signal to be processed (subjected to demodulation and decoding) based on the channel quality information that is the control information.

(49-3-11) In the notification information generating apparatus according to the invention, the calculating section is characterized by multiplying at least one of the difference value and the candidate value by a predetermined coefficient to calculate an index value.

Thus, by weighting the difference value or the candidate value to calculate an index value, it is possible to improve quality of a signal to be processed (subjected to demodulation and decoding) based on the channel quality information that is the control information.

(50-3-13) A communication apparatus according to the invention is a communication apparatus that performs communication using a plurality of channels, and is characterized by having a propagation path estimating section that estimates propagation path conditions, the notification information generating apparatus as described in any one of above-mentioned items (3-1) to (3-12) which receives channel quality information generated based on the propagation path conditions estimated in the propagation path estimating section, and a transmitting section that transmits the notification information generated in the notification information generating apparatus to a communicating party.

Thus, according to the communication apparatus according to the invention, it is possible to notify the channel quality information of a plurality of channels using the difference value. The difference value is calculated based on the input channel quality information and the channel quality information reconstructed based on the last notification information, and it is thereby possible to improve accuracy in reconstructing the channel quality information.

(51-3-14) A communication apparatus according to the invention is a communication apparatus that performs communication with a communicating party using a plurality of channels, and is characterized by having a receiving section that receives channel quality information obtained from a reception state of each channel from the communicating party, the notification information generating apparatus as described in any one of above-mentioned items (3-1) to (3-12) which receives the received channel quality information and outputs the reconstructed channel quality information and the notification information, an adaptive modulation control section that performs modulation and coding processing on transmission data to be transmitted to the communicating party based on the reconstructed channel quality information, and a transmitting section that transmits the transmission data subjected to the modulation and coding processing and the notification information to the communicating party.

Thus, according to the communication apparatus according to the invention, the channel quality information is received from the communicating party, and based on the received channel quality information, it is possible to generate the notification information and the reconstructed channel quality information. By calculating the difference value based on the input channel quality information and the channel quality information reconstructed based on the last notification information, it is possible to improve accuracy in reconstructing the channel quality information. Further, the communication apparatus is capable of transmitting the transmission data subjected to adaptive modulation control based on the reconstructed channel quality information reconstructed based on the notification information with improved accuracy.

(52-3-15) A notification information generating method according to the invention is a notification information generating method for generating notification information based on channel quality information obtained from a reception state of each channel in a communication scheme for performing communication using a plurality of channels, and is characterized by having the steps of holding notification information generated based on channel quality information of a first channel as last notification information, reconstructing channel quality information based on the held last notification information, and outputting the reconstructed channel quality information as the reconstructed channel quality information of the first channel, of receiving as its input channel quality information of a second channel differing from the first channel, calculating a difference value between the input channel quality information of the second channel and the reconstructed channel quality information of the first channel, further calculating an index value based on a difference between the calculated difference value and a value to notify a communicating party as the notification information, and generating the notification information to decrease the calculated index value, and of storing the generated notification information generated as the last notification information.

Thus, according to the notification information generating method according to the invention, it is possible to generate the notification information to notify the channel quality information of a plurality of channels using the difference value. The notification information is a value determined by the calculating section as a value to be notified as the notification information based on the difference value. The difference value is calculated based on the input channel quality information and the channel quality information reconstructed based on the last notification information, the notification information is generated to decrease the index value based on the difference between the calculated difference value and a value to notify the communicating party, and it is thereby possible to improve accuracy in reconstructing the channel quality information.

(53-3-16) A program for generating notification information according to the invention is a program to make a computer execute procedures for generating notification information based on channel quality information obtained from a reception state of each channel in a communication scheme for performing communication using a plurality of channels, and is to make a computer execute at least the procedures of holding notification information generated based on channel quality information of a first channel as last notification information, reconstructing channel quality information based on the held last notification information, and outputting the reconstructed channel quality information as the reconstructed channel quality information of the first channel, of receiving as its input channel quality information of a second channel differing from the first channel, calculating a difference value between the input channel quality information of the second channel and the reconstructed channel quality information of the first channel, further calculating an index value based on a difference between the calculated difference value and a value to notify a communicating party as the notification information, and generating the notification information to decrease the calculated index value, and of storing the generated notification information generated as the last notification information.

Thus, according to the program for generating notification information according to the invention, it is possible to generate the notification information to notify the channel quality information of a plurality of channels using the difference value. The notification information is a value determined by the calculating section as a value to be notified as the notification information based on the difference value. The difference value is calculated based on the input channel quality information and the channel quality information reconstructed based on the last notification information, the notification information is generated to decrease the index value based on the difference between the calculated difference value and a value to notify the communicating party, and it is thereby possible to improve accuracy in reconstructing the channel quality information.

(54-1-1) To attain the above-mentioned object, the present invention provides the following means. In other words, a notification information generating apparatus according to the invention is a notification information generating apparatus that generates notification information based on channel quality information obtained from a reception state of each channel in a communication scheme for performing communication using a plurality of channels, and is characterized by selecting a single candidate value from a plurality of difference-value candidate values each indicating a difference between two pieces of channel quality information, and generating the notification information based on the selected candidate value.

Thus, a difference value between two pieces of channel quality information is calculated, the notification information is generated by approximating the difference value by one of the difference-value candidate values and is notified to a communicating party, and it is thereby possible to reduce the information amount of the notification information, while improving accuracy of the channel quality information reconstructed based on the notification information.

(55-1-2) A notification information generating apparatus according to the invention is a notification information generating apparatus that generates notification information based on channel quality information obtained from a reception state of each channel in a communication scheme for performing communication using a plurality of channels, and is characterized by having a notification information table that stores a plurality of difference-value candidate values each indicating a difference between two pieces of channel quality information as candidate values for the notification information, a reconstructing section that generates a reconstruction value using the notification information generated based on channel quality information of a first channel, and a selecting section which receives channel quality information of a second channel differing from the first channel, selects a single candidate value from the candidate values for the notification information based on the channel quality information of the second channel and the reconstruction value, and generates the notification information based on the selected candidate value.

Thus, one of the difference-value candidate values is selected based on the reconstruction value of the first channel and the channel quality information of the second channel, the notification information is generated based on the selected candidate value and is notified to a communicating party, and it is thereby possible to reduce the information amount of the notification information, while improving accuracy of the channel quality information reconstructed based on the notification information.

(56) Further, in the notification information generating apparatus according to the invention, it is a feature that when a plurality of starting-point channels exists as a starting point in calculating a difference value, and the second channel is one of the plurality of starting-point channels, the selecting section holds information of the plurality of starting-point channels, and outputs one of the channel quality information of the second channel and predetermined channel information as the notification information, and that the reconstructing section receives a plurality of notification information generated in the selecting section as the notification information of each channel, and calculates a cumulative value obtained by sequentially adding the notification information of each channel to the notification information of one of the plurality of starting-point channels to generate a reconstruction value.

Thus, by using the notified channel quality information or predetermined channel quality information as the information of the starting-point channel, it is possible to improve accuracy of the reconstructed channel quality information. The predetermined channel quality information may be one of non-difference value candidate values, or may use an average value of a plurality of channel quality information. Further, by providing a plurality of starting-point channels, it is possible to improve accuracy of the reconstruction value.

Advantageous Effect of the Invention

According to the present invention, it is possible to generate notification information for improving accuracy of channel quality information reconstructed based on a difference in the case of notifying the channel quality information obtained from a reception state of each channel to a communicating party using the difference of the channel quality information between a plurality of channels to reduce the notification information amount.

BRIEF DESCRIPTION OF DRAWINGS

FIG. 7 is a diagram showing an example of the selected modulation parameter that is an input of the notification information generating apparatus, and generation result of the notification information and reconstructed modulation parameter by the notification information generating apparatus in Embodiment 1;

FIG. 9 shows another example of the selected modulation parameter that is an input of the notification information generating apparatus, and generation result of the notification information and reconstructed modulation parameter by the notification information generating apparatus in Embodiment 1;

FIG. 17 is a diagram showing an example of the selected modulation parameter that is an input of a notification information generating apparatus, and generation result of the notification information and reconstructed modulation parameter by the notification information generating apparatus in Embodiment 6;

FIG. 19 shows another example of the selected modulation parameter that is an input of the notification information generating apparatus, and generation result of the notification information and reconstructed modulation parameter by the notification information generating apparatus in Embodiment 6;

FIG. 24 is a diagram showing still another example of the generation result of the notification information and reconstructed modulation parameter when a plurality of subcarrier blocks is a starting point;

FIG. 30 is a diagram showing an example of the selected modulation parameter that is an input of the notification information generating apparatus, and generation result of the notification information and reconstructed modulation parameter by the notification information generating apparatus in Embodiment 7;

FIG. 32 shows another example of the selected modulation parameter that is an input of the notification information generating apparatus, and generation result of the notification information and reconstructed modulation parameter by the notification information generating apparatus in Embodiment 7;

FIG. 39 is a diagram showing an example of calculation values in the case where the notification information generating apparatus generates the notification information;

FIG. 47 is a diagram showing an example of a table showing weighting values for modulation parameters;

FIG. 48 is a diagram showing another example of the table showing weighting values for modulation parameters;

Figure 1:
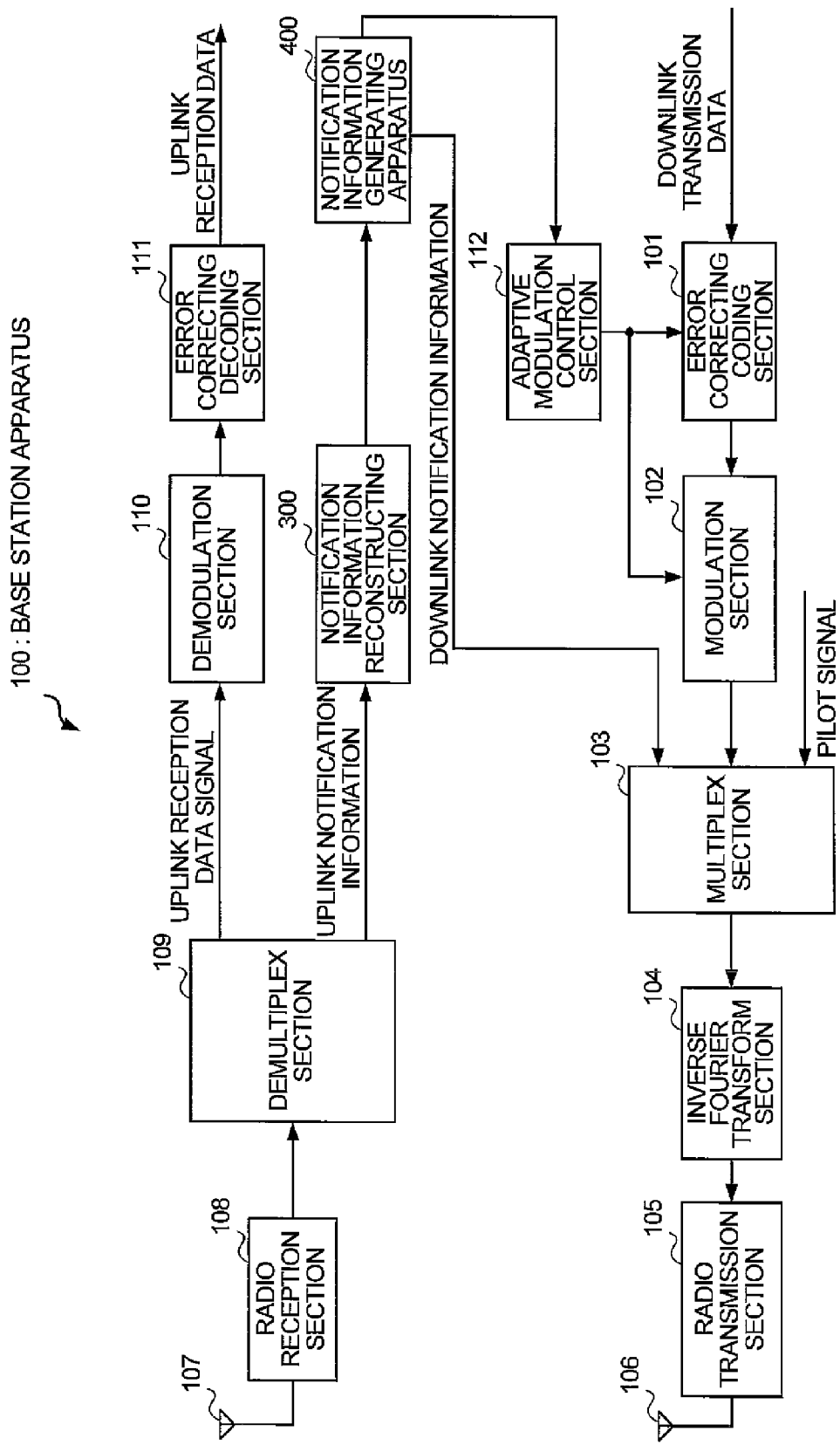
FIG. 1 is a functional block diagram showing a configuration example of a base station apparatus in Embodiments 1 and 7 according to the invention.

DESCRIPTION OF SYMBOLS 100, 190, 291 Base station apparatus
101, 210 Error correcting coding section
102, 211 Modulation section
103, 212 Multiplex section
104 Inverse Fourier transform section
105, 213 Radio transmission section
106, 107, 201, 214 Antenna section
108, 202 Radio reception section
109, 204 Demultiplex section
110, 208 Demodulation section
111, 209 Error correcting decoding section
112 Adaptive modulation control section
200, 290, 292 Terminal apparatus
203 Fourier transform section
205 Propagation path estimating section
191, 206 Modulation parameter selecting section
207 adaptive demodulation control section
300, 390 Notification information reconstructing section
301, 391 Reconstruction calculating section
302, 392 Storing section
400, 480, 490 Notification information generating apparatus
400-3, 480-3, 490-3 Notification information generating apparatus
401, 481, 491 Notification information table
401-3, 481-3, 491-3 Differential information table
402, 482, 492 Selecting section
402-3, 482-3, 492-3 Calculating section
403, 483, 493 Reconstructing section
403-3, 483-3, 493-3 Reconstructing section
484 Comparing section
484-3 Comparing section

BEST MODE FOR CARRYING OUT THE INVENTION

Embodiments of the present invention will be described below with reference to accompanying drawings. Structural elements or corresponding portions having the same configuration or function in the drawings are assigned the same reference numerals to omit descriptions thereof.

In descriptions in each Embodiment as described below, an OFDM system that is a multicarrier communication system is assumed as a communication system, and a channel means a subcarrier block comprised of at least one subcarrier or a unit obtained by dividing the block by a predetermined time length, but the invention is not limited thereto. For example, the present invention is applicable to an MC-CDMA (Multi Carrier-Code Division Multiple Access) using spreading technique. Further, although descriptions are given on the modulation parameter information in a plurality of frequency channels, channels to which the present invention is applicable are not limited to frequency channels, and for example, the invention is applicable in systems for performing communication using a plurality of channels in a frame such as a plurality of channels indicated by eigenmode in SDMA (Space Division Multiple Access), channels as a combination thereof, or the like having the possibility that the reception quality varies with channel. In the description of the invention, a frame is assumed to be a communication unit comprised of a plurality of slots specified by one or more time channels defined by a predetermined time length and one or more frequency channels defined by a predetermined frequency band.

Further, each of the following Embodiments assumes a system which is a communication system adopting FDD comprised of base station apparatuses and terminal apparatuses, while adopting an OFDM adaptive modulation system in communication on downlink, without performing OFDM and adaptive modulation in communication on uplink, but the invention is not limited thereto. The base station apparatus and terminal apparatus may be a base station and mobile station in the OFDM system, respectively. Further, it is assumed that between two communication apparatuses, the side that notifies feedback information is a terminal apparatus, and that the side that performs adaptive modulation/coding and/or scheduling on transmission data based on the notified feedback information to transmit is a base station apparatus. Alternately, a base station apparatus is the side that performs adaptive modulation/coding and/or scheduling on transmission data and that transmits control information about the transmission data together with the transmission data, while the terminal apparatus is the side that receives the data. There may be a case that one communication apparatus has both functions.

The channel quality information is information obtained from a reception state of each channel, and includes the information indicating propagation path conditions, and the information indicating reception quality, and further, may include the information generated based on the propagation path conditions. The channel quality information includes the information indicating the propagation path conditions measured in a communication apparatus that receives the signal, or a parameter of adaptive modulation selected based on the information indicating measured propagation path conditions. The information indicating the propagation path conditions is measured in a communication apparatus that receives a signal. More specifically, such information is information as a criterion for modulation parameter determination in adaptive modulation, and includes CNR, CINR and the like. The modulation parameter (MCS: Modulation and Coding Scheme) includes a modulation scheme, channel coding rate, a combination of the modulation scheme and channel coding rate, and the like. The modulation parameter is selected by a communication apparatus that receives a signal based on the information indicating propagation path conditions measured in the apparatus, or selected by a communication apparatus that transmits a signal based on the information indicating propagation path conditions notified from another communication apparatus that receives the signal.

In each of the following Embodiments, a modulation parameter (information about the modulation parameter) or estimation result of propagation path conditions is described as an example of the channel quality information, but the invention is not limited thereto.

EMBODIMENT 1

Embodiment 1 describes a case of using modulation parameter information as the channel quality information as an example.

Figure 2:
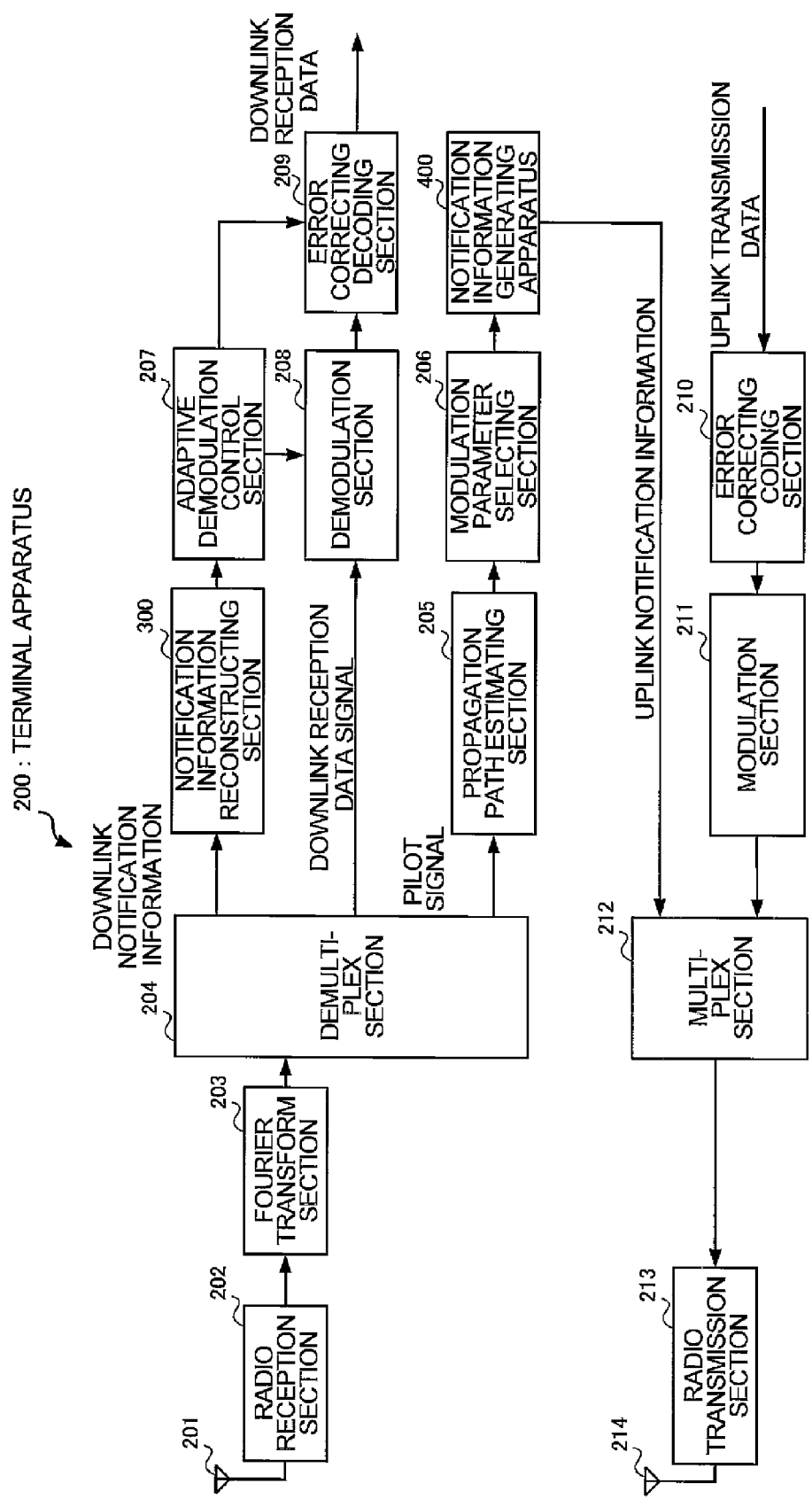
FIG. 2 is a functional block diagram showing a configuration example of a terminal apparatus in Embodiments 1 and 7 according to the invention.

FIG. 1 is a functional block diagram showing a configuration example of a base station apparatus 100 in Embodiment 1 according to the invention. Further, FIG. 2 is a functional block diagram showing a configuration example of a terminal apparatus 200 in Embodiment 1 according to the invention. Embodiment 1 illustrates the case where the base station apparatus 100 notifies the information about a modulation parameter used in adaptive modulation of downlink transmission data as the downlink notification information, and the terminal apparatus 200 notifies the information about a modulation parameter for subsequent downlink transmission data as the uplink notification information.

The base station apparatus 100 has an error correcting coding section 101, modulation section 102, multiplex section 103, inverse Fourier transform section 104, radio transmission (transmitting) section 105, antenna sections 106 and 107, radio reception (receiving) section 108, demultiplex section 109, demodulation section 110, error correcting decoding section 111, notification information reconstructing section 300, notification information generating apparatus 400, and adaptive modulation control section 112.

The terminal apparatus 200 has antenna sections 201 and 214, radio reception (receiving) section 202, Fourier transform section 203, demultiplex section 204, propagation path estimating section 205, modulation parameter selecting section 206, notification information generating apparatus 400, notification information reconstructing section 300, adaptive demodulation control section 207, demodulation section 208, error correcting decoding section 209, error correcting coding section 210, modulation section 211, multiplex section 212 and radio transmission (transmitting) section 213.

Described first are downlink transmission procedures in the base station apparatus as shown in FIG. 1. The error correcting coding section 101 receives downlink transmission data and adaptive modulation control information output from the adaptive modulation control section 112, and based on the input adaptive modulation control information, performs error correcting coding on the downlink transmission data to output a coded data sequence.

The modulation section 102 receives the coded data sequence output from the error correcting coding section 101 and the adaptive modulation control information output from the adaptive modulation control section 112, and based on the input adaptive modulation control information, modulates the coded data sequence to output a modulated symbol sequence.

The multiplex section 103 receives the modulated symbol sequence output from the modulation section 102, downlink notification information generated in the notification information generating apparatus 400 and a pilot signal, and multiplexes the signals to output an OFDM frequency signal. In addition, herein, the pilot signal is a known signal used in estimating propagation path conditions in the terminal apparatus 200. The base station apparatus 100 preferably stores a beforehand generated pilot signal in memory, and inputs the pilot signal stored in the memory to the multiplex section 103. However, the base station apparatus 100 may have another configuration for generating the pilot signal whenever the signal is required without storing the pilot signal in the memory, and the like.

The inverse Fourier transform section 104 receives the OFDM frequency signal output from the multiplex section 103, and performs frequency/time transform (inverse Fourier transform) on the signal to output an OFDM time signal.

The radio transmission section 105 receives the OFDM time signal output from the inverse Fourier transform section 104, adds a guard interval to the signal, performs digital/analog conversion and upconverting to the radio frequency to transform to a radio signal, and transmits the signal via the antenna section 106.

Described next are downlink reception procedures in the terminal apparatus 200 as shown in FIG. 2. The radio reception section 202 receives the downlink radio signal via the antenna section 201, performs downconverting from the radio frequency and analog/digital conversion, and further removes the guard interval to output an OFDM time signal.

The Fourier transform section 203 receives the OFDM time signal output from the radio reception section 202, and performs time/frequency transform (Fourier transform) on the signal to output an OFDM frequency signal.

The demultiplex section 204 receives the OFDM frequency signal output from the Fourier transform section 203, and demultiplexes the input OFDM frequency signal into a downlink reception data signal, downlink notification information and pilot signal to output.

The propagation path estimating section 205 receives the pilot signal output from the demultiplex section 204, performs estimation of propagation path conditions from the input pilot signal, and outputs an estimation result of propagation path conditions.

In addition, in the case of performing propagation path estimation using a downlink reception data signal, instead of a pilot signal, the propagation path estimating section receives a downlink reception data signal, or demodulation result or error correcting decoding result of the downlink reception data signal. In this case, the need is eliminated for the pilot signal multiplexing processing in the multiplex section 103 in the base station apparatus 100 and the demultiplexing processing of the pilot signal in the demultiplex section 204 in the terminal apparatus 200. Further, in the case of performing propagation path estimation using both of the pilot signal and the downlink reception data signal, as well as the pilot signal, the propagation path estimating section receives the downlink reception data signal, or demodulation result or error correcting decoding result of the downlink reception data signal. The present invention is applicable to such configurations.

The modulation parameter selecting section 206 receives the estimation result of propagation path conditions output from the propagation path estimating section 205, selects a subsequent downlink modulation parameter on a subcarrier block basis based on the input estimation result of propagation path conditions, and outputs information (modulation parameter information) about the selected modulation parameter. The modulation parameter selecting section 206 applies the estimation result of propagation path conditions to the beforehand determined correspondence relationship between the modulation parameter and propagation path conditions, and thereby selects a modulation parameter. For example, the section 206 holds modulation parameters and ranges of propagation path conditions corresponding to the parameters as a table, and is capable of determining a modulation parameter to select by comparing the table with the estimation result of propagation path conditions.

The notification information generating apparatus 400 receives the modulation parameter output from the modulation parameter selecting section 206, and based on the input modulation parameter, generates the uplink notification information to output. The processing in the notification information generating apparatus 400 will be described later with reference to FIGS. 3 and 4.

The notification information reconstructing section 300 receives the downlink notification information output from the demultiplex section 204, and reconstructs the information about the modulation parameter from the input downlink notification information to output. In addition, the processing in the notification information reconstructing section 300 will be described later with reference to FIGS. 5 and 6.

The adaptive demodulation control section 207 receives the reconstructed information (modulation parameter information) about the modulation parameter output from the notification information reconstructing section 300, and based on the input information about the modulation parameter, generates the adaptive demodulation control information for controlling the demodulation processing and error correcting decoding processing to output.

The demodulation section 208 receives the downlink reception data signal output from the demultiplex section 204 and the adaptive demodulation control information output from the adaptive demodulation control section 207, and based on the input adaptive demodulation control information, demodulates the downlink reception data signal to output a demodulated data sequence.

The error correcting decoding section 209 receives the demodulated data sequence output from the demodulation section 208 and the adaptive demodulation control information output from the adaptive demodulation control section 207, performs error correcting decoding on the demodulated data sequence based on the input adaptive demodulation control information, and outputs downlink reception data. In addition, as preprocessing of demodulation, such a configuration may be adopted that propagation path compensation processing is performed using the estimation result of propagation path conditions estimated in the propagation path estimating section 205, and that the estimation result of propagation path conditions is referred to in error correcting decoding.

Described next are uplink transmission procedures in the terminal apparatus 200 as shown in FIG. 2. The error correcting coding section 210 receives uplink transmission data, and performs error correcting coding on the data with a predetermined coding rate to output a coded data sequence.

The modulation section 211 receives the coded data sequence output from the error correcting coding section 210, modulates the input coded data sequence with a predetermined modulation scheme, and outputs a modulated symbol sequence.

The multiplex section 212 receives the modulated symbol sequence output from the modulation section 211, and uplink notification information output from the notification information generating apparatus 400, multiplexes the input modulated symbol sequence and the uplink notification information, and outputs a transmission signal.

The radio transmission section 213 receives the transmission signal output from the multiplex section 212, performs digital/analog conversion and upconverting to the radio frequency to transform to a radio signal, and transmits the signal via the antenna section 214.

Described next are uplink reception procedures in the base station apparatus 100 as shown in FIG. 1. The radio reception section 108 receives the uplink radio signal via the antenna section 107, performs downconverting from the radio frequency and analog/digital conversion, and outputs a reception signal.

The demultiplex section 109 receives the reception signal output from the radio reception section 108, and demultiplexes the input reception signal into an uplink reception data signal and uplink notification information to output. In addition, such a configuration may be adopted that a pilot signal is beforehand multiplexed in the multiplex section 212 in the terminal apparatus 200, the pilot signal is demultiplexed in the demultiplex section 109 in the base station apparatus 100, and that propagation path compensation is performed on the uplink reception data signal and uplink notification information using the demultiplexed pilot signal.

The demodulation section 110 receives the uplink reception data signal output from the demultiplex section 109, demodulates the input uplink reception data signal with a predetermined modulation scheme, and outputs a demodulated data sequence.

The error correcting decoding section 111 receives the demodulated data sequence output from the demodulation section 110, performs error correcting decoding on the input demodulated data sequence with a predetermined channel coding rate, and outputs uplink reception data.

The notification information reconstructing section 300 receives the uplink notification information output from the demultiplex section 109, and reconstructs the information about the modulation parameter from the input uplink notification information to output. In addition, the processing in the notification information reconstructing section 300 will be described later with reference to FIG. 5.

The notification information generating apparatus 400 receives the information about the modulation parameter output from the notification information reconstructing section 300, and based on the input information about the modulation parameter, generates the downlink notification information to output, while reconstructing the information about the modulation parameter based on the generated downlink notification information to output.

In addition, it is not necessary that the uplink notification information and the information about a modulation parameter output from the notification information reconstructing section 300 in the base station apparatus 100 is always in agreement with the downlink notification information and information about the modulation parameter output from the notification information generating apparatus 400 in the base station apparatus 100. The base station apparatus 100 may change the modulation parameter. The apparatus 100 may have a structural element that selects (changes) the modulation parameter between the notification information reconstructing section 300 and the notification information generating apparatus 400, which is not shown in FIG. 1. Further, the notification information generating apparatus 400 in the base station apparatus 100 is capable of being achieved by the same functional block configuration as that of the notification information generating apparatus 400 in the terminal apparatus 200 of FIG. 2. The processing in the notification information generating apparatus 400 will be described later with reference to FIG. 3.

The adaptive modulation control section 112 receives the information about the modulation parameter output from the notification information generating apparatus 400, and generates an adaptive modulation control signal to control the modulation processing and error correcting coding processing to output.

In addition, the above-mentioned explanation describes the configuration where the base station apparatus 100 also has the notification information generating apparatus 400, but in the case where the base station apparatus 100 performs modulation and error correcting coding on downlink transmission data using the modulation parameter reconstructed by the notification information reconstructing section 300 without modification, the base station apparatus 100 does not always need to have the notification information generating apparatus 400. In this case, the uplink notification information output from the demultiplex section 109 is input not only to the notification information reconstructing section 300, but also to the multiplex section 103 as the downlink notification information without modification. Further, instead of the information about a modulation parameter output from the notification information generating apparatus 400, the adaptive modulation control section 112 receives the information about a modulation parameter output from the notification information reconstructing section 300.

Figure 3:
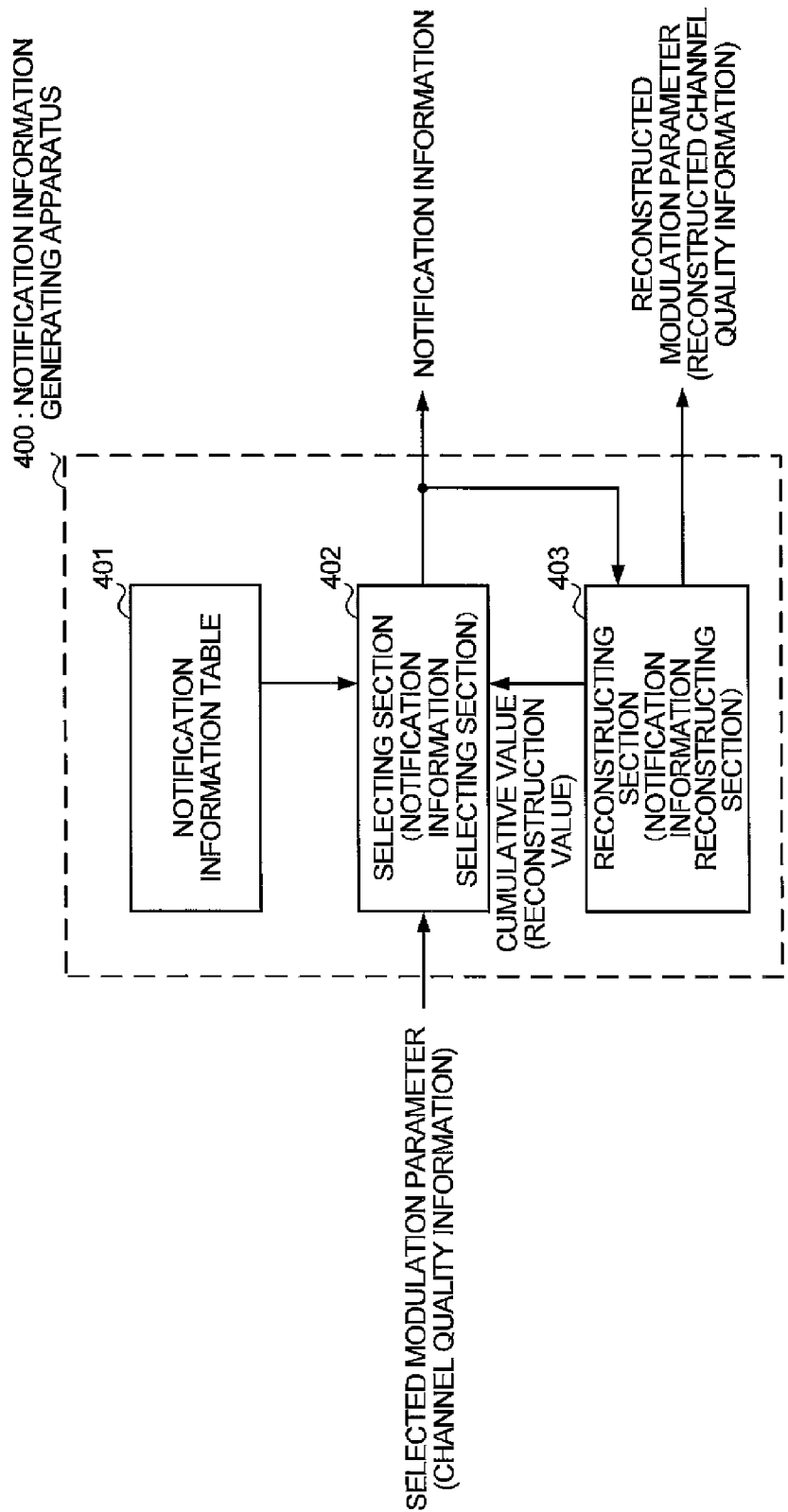
FIG. 3 is a diagram showing an example of a functional block of a notification information generating apparatus in the terminal apparatus in FIG. 2.

FIG. 3 shows an example of a functional block diagram of the notification information generating apparatus 400 in the terminal apparatus 200 in FIG. 2. The notification information generating apparatus 400 has a notification information table 401, selecting section (notification information selecting section) 402, and reconstructing section (notification information reconstructing section) 403.

The notification information table 401 is a storage area for storing candidate values selectable as the notification information. The candidate values include difference-value candidate values each indicating a difference between two pieces of channel quality information, and non-difference value candidate values each indicating the channel quality information. The notification information table 401 holds a table comprised of a plurality of values (difference-value candidate values) $X_k$ (k=1~M, M is a natural number) indicating differences between modulation parameters, and values (non-difference value candidate values) $Y_j$ (j=1~N, N is a natural number) indicating specific modulation parameters that are not the difference (hereinafter, the combination of $X_k$ and $Y_j$ is described as the notification information candidate values), which are selectable as the notification information, and outputs these notification information candidate values. As the non-difference value candidate value, the channel quality information may be used, or reception quality information indicating propagation path conditions may be used. Further, it is possible to use a value indicating predetermined propagation path conditions.

Figure 4:
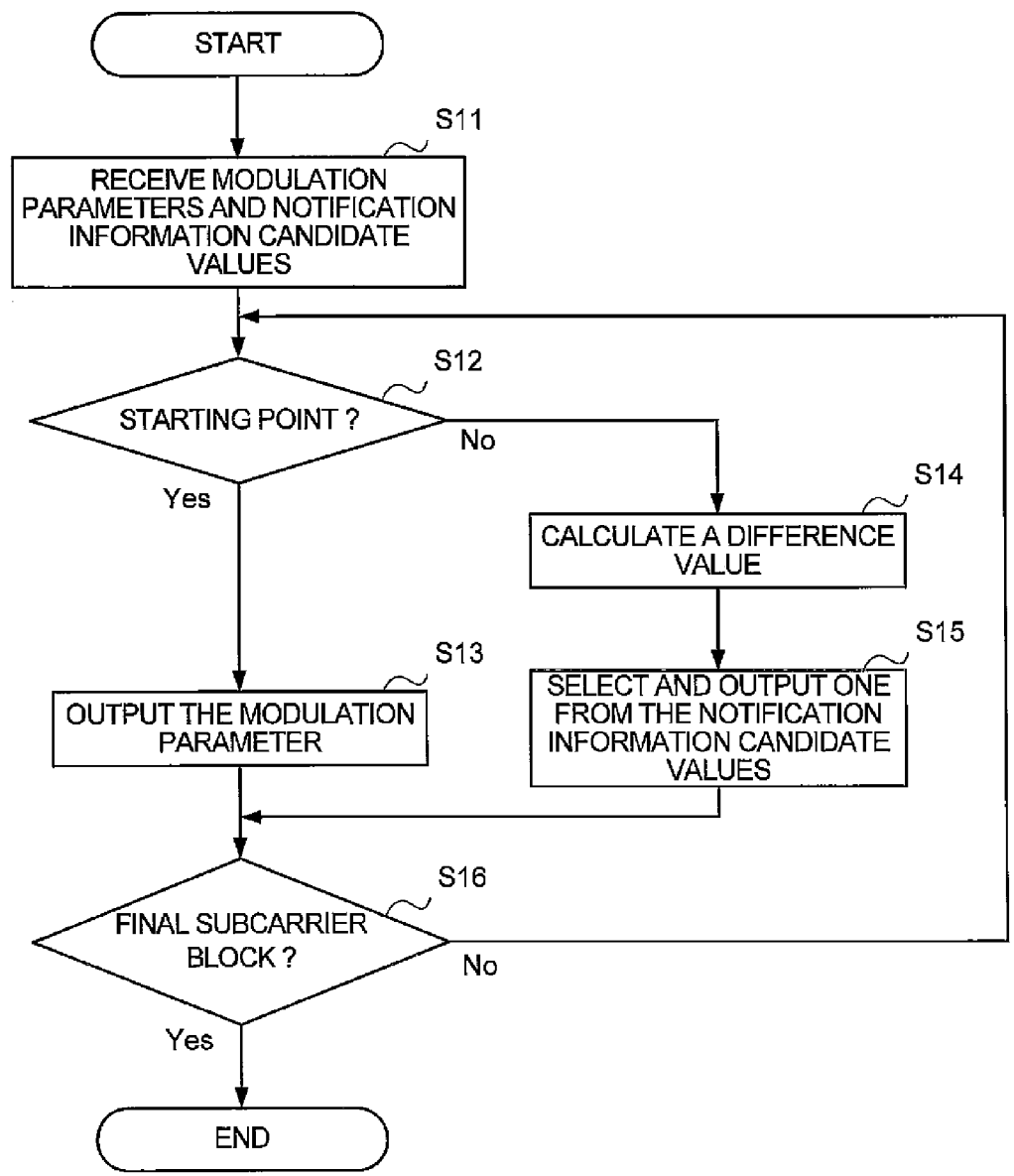
FIG. 4 is a flowchart showing an example of the operation of generating the notification information in Embodiment 1.

The selecting section 402 receives the modulation parameter (an example of the channel quality information) on a subcarrier block basis selected in the modulation parameter selecting section 206 in FIG. 2, notification information candidate values output from the notification information table, and a cumulative value (reconstruction value) output from the reconstructing section 403, and generates the notification information. The selecting section 402 before hand holds information about a processing unit in notification information generation including a subcarrier block number used as a starting point in generating the notification information, and generates the notification information using the subcarrier block to start the processing as a starting point. The selecting section 402 determines whether a subcarrier block is a starting point, generates the notification information sequentially according to the procedures as shown in FIG. 4 described later, and outputs the generated notification information. Further, the generated notification information is output to the reconstructing section 403.

The reconstructing section 403 receives the notification information output from the selecting section 402, reconstructs the modulation parameter based on the input notification information (last notification information), and outputs the reconstructed modulation parameter. For example, the section 403 calculates a cumulative value of held notification information to reconstruct the reconstructed modulation parameter, or reconstructs a non-difference candidate value without modification as the reconstructed modulation parameter. Further, the reconstructing section 403 generates a cumulative value (reconstruction value) based on the held notification information, and outputs the generated cumulative value to the selecting section 402. The cumulative value (reconstruction value) is a value generated by the reconstructing section 403 based on the input notification information (last notification information), and may be a reconstruction value because of including the case of a value of held notification information or a predetermined value, as well as a cumulative value obtained by accumulating a plurality of input notification information. This Embodiment describes the case where the reconstructing section 403 stores a cumulative value (reconstruction value), but the section 403 may store the last notification information itself. Details of the reconstructing section 403 will be described later with reference to FIGS. 5 and 6.

Further, in the notification information generating apparatus 400, it is possible that the selecting section 402 selects a single candidate value from candidate values for the notification information including at least one difference-value candidate value indicating a difference between two pieces of channel quality information and at least one non-difference value candidate value indicating the channel quality information stored in the notification information table 401, and based on the selected candidate value, generates the notification information.

The operation of generating the notification information will be described below with reference to FIG. 4. FIG. 4 is a flowchart showing an example of the operation of generating the notification information in this Embodiment.

The selecting section 402 receives modulation parameters and notification information candidate values. (S11). FIG. 4 shows an example of receiving a plurality of modulation parameters respectively corresponding to a plurality of subcarrier blocks included in a communication unit, and sequentially performing processing on each subcarrier block. The selecting section 402 first determines whether a subcarrier block is a starting point (S12), and for a subcarrier block used as a starting point in generating the notification information (Yes in S12), outputs the modulation parameter for the subcarrier block as the notification information without modification (S13). For a subcarrier block being not used as a starting point (No in S12), the selecting section 402 calculates a difference value between the modulation parameter for the subcarrier block and the cumulative value input from the reconstructing section 403 (S14), and based on the modulation parameter information and the calculated difference value, selects one from the notification information candidate values to output as the notification information (S15).

More specifically, for each subcarrier block being not used as a starting point, the selecting section 402 selects a difference-value candidate value nearest the calculated difference value from among difference-value candidate values $X_k$, calculates an addition result obtained by adding the selected difference-value candidate value and the cumulative value, selects a value nearest the calculated addition result or the modulation parameter of the subcarrier block input from the non-difference value candidate value $Y_j$, and selects the notification information candidate value ($X_k$ or $Y_j$) used in the selected value as the notification information. The selecting section 402 selects the non-difference value candidate value $Y_j$ when the calculated difference value exceeds a predetermined range or the channel quality information exceeds a predetermined range.

The selecting section 402 repeats the processing of step S12 and subsequent steps until the final subcarrier block is detected (S16).

In addition, the reconstructing section 403 in the notification information generating apparatus 400 has the same functional block configuration as that of the notification information reconstructing section 300 for the uplink notification information in the base station apparatus 100 as shown in FIG. 1 and the notification information reconstructing section 300 for the downlink notification information in the terminal apparatus as shown in FIG. 2. In the description of the invention, to simplify the explanation, descriptions are made using different reference numerals and names for the notification information reconstructing section 300 and reconstructing section 403.

Figure 5:
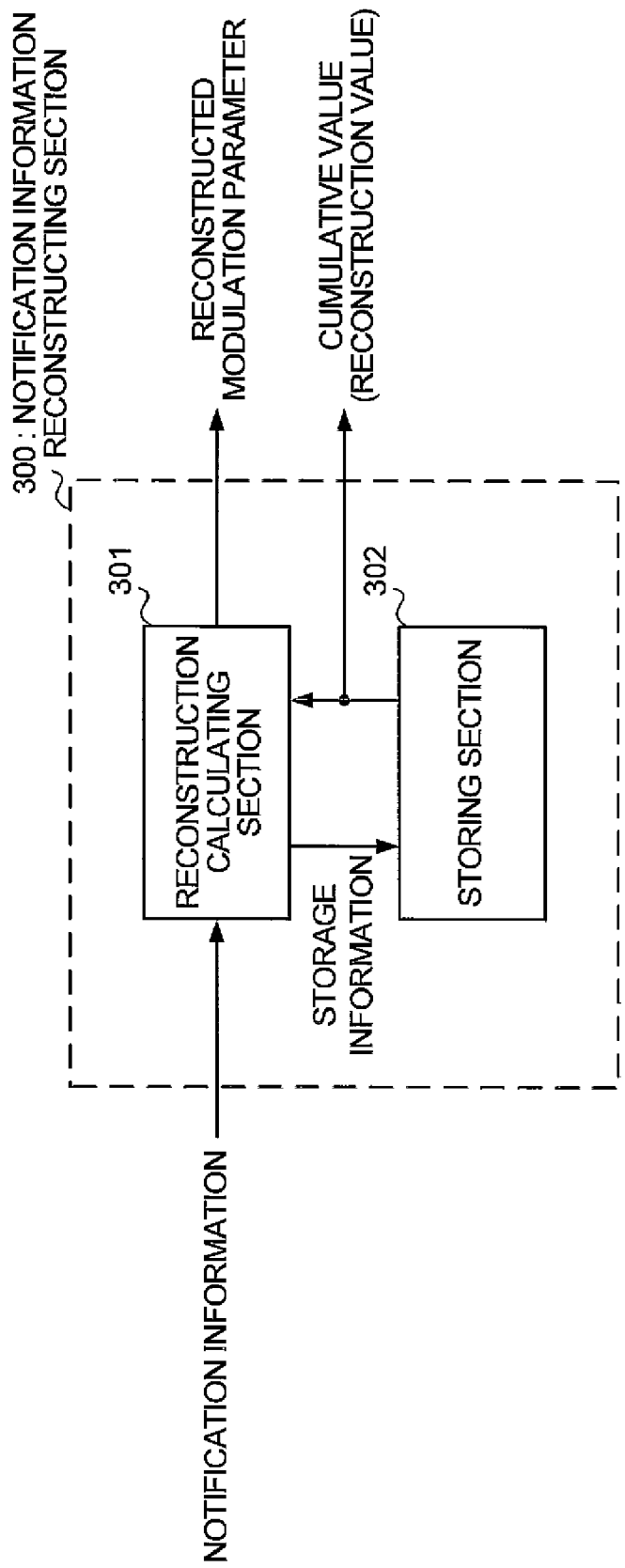
FIG. 5 is a diagram showing an example of a functional block of a notification information reconstructing section 3 of Embodiment 1.

FIG. 5 shows an example of a functional block diagram of the notification information reconstructing section 300 of this Embodiment. The notification information reconstructing section 300 has a reconstruction calculating section 301 and storing section 302. The reconstructing section 403 in FIG. 3 also has the same configuration as that of the notification information reconstructing section 300, and therefore, also has the reconstruction calculating section 301 and storing section 302.

The reconstruction calculating section 301 receives the notification information and the cumulative value output from the storing section 302, reconstructs a modulation parameter (an example of the channel quality information) based on the notification information and the cumulative value, and outputs the reconstructed modulation parameter. Further, the reconstruction calculating section 301 outputs the information to be held in the storing section 302 as the storage information. Furthermore, the reconstruction calculating section 301 beforehand holds information about a processing unit for notification information generation including a subcarrier block number used as a starting point in generating the notification information. The storing section 302 stores the storage information output from the reconstruction calculating section 301, and based on the stored storage information, outputs a cumulative value.

Figure 6:
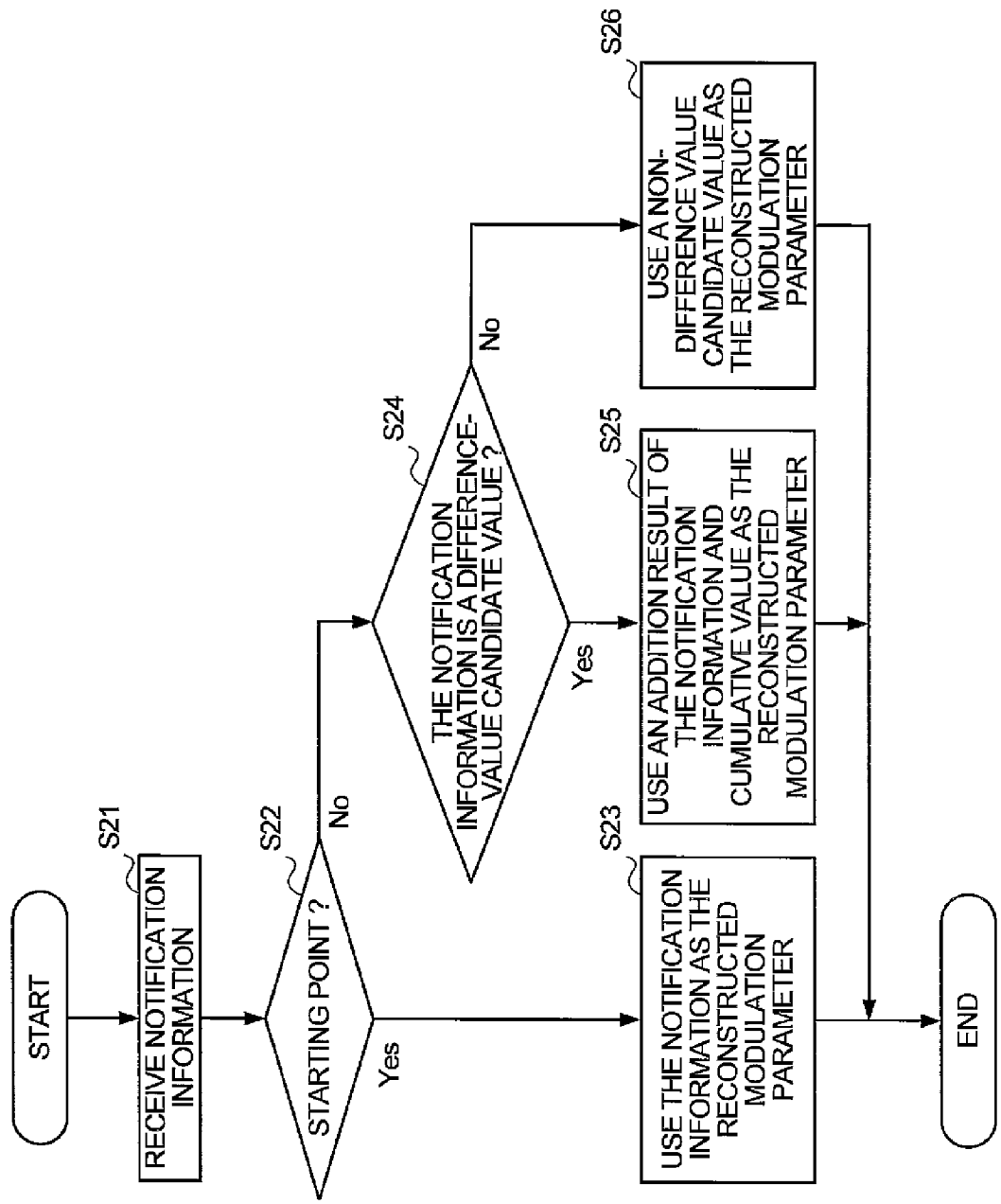
FIG. 6 is a flowchart showing an example of the operation of reconstructing the notification information in Embodiment 1.

Referring to FIG. 6, described next are details of the operation of reconstructing the notification information in the notification information reconstructing section 300. FIG. 6 is a flowchart showing an example of the operation of reconstructing the notification information in this Embodiment.

The reconstruction calculating section 301 receives the notification information (S21), and determines whether the subcarrier block is a starting point (S22). For a subcarrier block used as a starting point in generating the notification information (Yes in S22), the reconstruction calculating section 301 outputs the notification information about the subcarrier block as the reconstructed modulation parameter without modification, while outputting the notification information to the storing section 302 as the storage information (S23). For a subcarrier block being not used as a starting point, when the notification information about the subcarrier block is a difference-value candidate value $X_k$ (Yes in S24), the reconstruction calculating section 301 adds the input notification information and the cumulative value input from the storing section 302, and outputs the addition result as the reconstructed modulation parameter, while outputting the addition result to the storing section 302 as the storage information (S25). When the notification information is not a difference-value candidate value $X_k$ i.e. the notification information is a non-difference value candidate value $Y_j$ (No in S24), the section 301 outputs the notification information as the reconstructed modulation parameter without modification, while outputting the notification information to the storing section 302 as the storage information (S26). Hereinafter, the reconstruction calculating section 301 with this configuration is described as a "first-configuration reconstruction calculating section".

Alternately, as another configuration, it is possible to adopt a configuration that when the notification information is the non-difference value candidate value $Y_j$ (No in S24), the reconstruction calculating section 301 outputs the notification information as the reconstructed modulation parameter without modification, while outputting the cumulative value input from the storage section 302 to the storing section 302 as the storage information without modification. Hereinafter, the reconstruction calculating section 301 with this configuration is described as a "second-configuration reconstruction calculating section". In the case of using the second-configuration reconstruction calculating section, the reconstructing section 403 outputs a cumulative value (reconstruction value) differing from the reconstructed modulation parameter (reconstructed channel quality information).

FIG. 7 shows an example of the selected modulation parameter as the input information of the notification information generating apparatus 400, and generation result of the notification information and reconstructed modulation parameter by the notification information generating apparatus 400 in this Embodiment. The selected modulation parameter is selected by the modulation parameter selecting section 206 and output to the notification information generating apparatus 400.

FIG. 7 shows an example where the base station apparatus 100 and terminal apparatus 200 use MCS (Modulation and channel Coding Scheme) comprised of combinations of a modulation scheme and channel coding rate as a modulation parameter using sixteen subcarrier blocks. MCS defines sixteen kinds (information of four bits) of from "0" to "15". Such an example is shown where the notification information table 401 holds a total of four kinds (information of two bits) of notification information candidate values of $X_1=-2$, $X_2=-0$ and $X_3=+2$ as difference-value candidate values and $Y_1=0$ as a non-difference value candidate value. Herein, $Y_1$ indicates a carrier hole not to perform transmission. $X_k$ indicates one of $X_1=-2$, $X_2=-0$ and $X_3=+2$ (k is 1 to 3). In the example, the reconstruction calculating section 301 uses the second-configuration reconstruction calculating section. Further, in the example, a subcarrier block with subcarrier block number 1 is a starting point in generating the notification information.

In the example of FIG. 7, the selecting section 402 in the generation notification generating apparatus 400 outputs selected modulation parameter "11" as the notification information about the subcarrier block with subcarrier block number 1 without modification. In the notification information on second and subsequent subcarrier blocks, the selecting section 402 obtains a difference value between the cumulative value of the notification information up to a subcarrier block immediately before the subcarrier block and the selected modulation parameter of the subcarrier block, and for example, selects a value nearer a value of the originally selected modulation parameter from between a value of the modulation parameter to be reconstructed in selecting $X_k$ nearest the difference value as the notification information and a value of the modulation parameter to be reconstructed in selecting $Y_1$ as the notification information.

For example, in generating the notification information on a subcarrier block with subcarrier block number 5, the selecting section obtains a difference value "−3" between the cumulative value "9" (11+0+0−2) of the notification information up to the fourth subcarrier block and modulation parameter "6" selected on the fifth subcarrier block, and selects $X_1$ nearer originally selected modulation parameter "6" from between modulation parameter "7" to be reconstructed in selecting $X_1=-2$ that is the difference-value candidate value $X_k$ nearest the difference value as the notification information and modulation parameter "0" to be reconstructed in selecting $Y_1$ as the notification information.

In addition, when the selecting section 402 selects the notification information, the modulation parameter to be reconstructed may be constrained not to exceed the originally selected modulation parameter. Further, when $Y_1$ is selected as the notification information as in the subcarrier block with subcarrier block number 6, in the example of using the second-configuration reconstruction calculating section, the reconstruction calculating section 301 omits the notification information of the sixth subcarrier block from calculation of the cumulative value of the notification information up to a subcarrier block immediately before the subcarrier block in notification information determination in subsequent subcarrier blocks. For example, using the notification information determination of the seventh subcarrier block in FIG. 7 as an example, as the cumulative value of the notification information up to the subcarrier block immediately before the subcarrier block, the reconstruction calculating section 301 uses the total sum of the notification information of the first to fifth subcarrier blocks while omitting the notification information in the sixth subcarrier.

Figure 8:
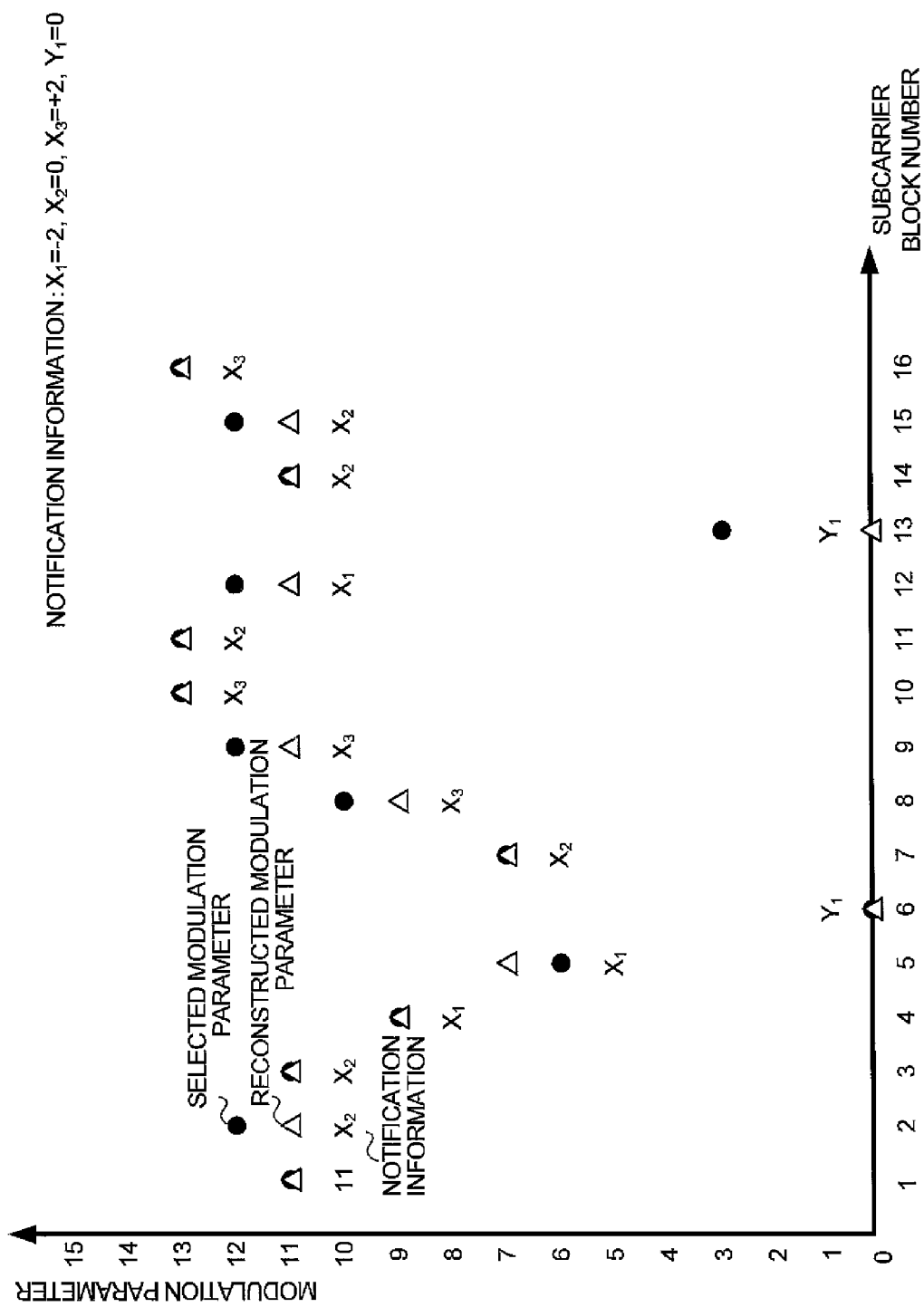
FIG. 8 is a diagram showing a graph plotted with selected modulation parameters, notification information and reconstructed modulation parameters shown in the example of FIG. 7.

FIG. 8 shows a graph plotted with the selected modulation parameters, notification information and reconstructed modulation parameters shown in the example of FIG. 7. The horizontal axis represents the subcarrier block number, and the vertical axis represents the modulation parameter. The black circle indicates a selected modulation parameter of each subcarrier block input to the notification information generating apparatus, and the white triangle indicates a reconstructed modulation parameter.

FIG. 9 shows another example of the selected modulation parameter as the input information of the notification information generating apparatus 400, and generation result of the notification information and reconstructed modulation parameter by the notification information generating apparatus 400 in this Embodiment.

FIG. 9 shows an example where the number of subcarrier blocks is "16", sixteen kinds (information of four bits) are defined as MCS, and in the notification information table 401 are defined a total of four kinds (information of two bits) of notification information candidate values of $X_1=-2$, $X_2=-0$ and $X_3=+2$ as difference-value candidate values and $Y_1=4$ as a non-difference value candidate value. Herein, $Y_1$ is of an example of selecting "4" that is the lowest modulation parameter among selected modulation parameters of sixteen subcarriers. $X_k$ indicates one of $X_1=-2$, $X_2=-0$ and $X_3=+2$ (k is 1 to 3). In the example, the first-configuration reconstruction calculating section is used as the reconstruction calculating section 301. Further, in the example, a subcarrier block with subcarrier block number 1 is a starting point in generating the notification information.

The details of procedures of notification information generation in FIG. 9 are basically the same as in the example in FIG. 7. A different portion is the operation in the first-configuration reconstruction calculating section, and even when $Y_1$ is selected as the notification information, the reconstruction calculating section 301 considers the notification information of the subcarrier block in calculating a cumulative value of the notification information of up to the immediately-before subcarrier block in determining the notification information on subsequent subcarrier blocks, and replaces the calculation result of the cumulative value in the subcarrier block with $Y_1$. For example, using determination of the notification information of the seventh subcarrier block in FIG. 9 as an example, since $Y_1$ is selected in the fifth subcarrier block in calculation of the cumulative value of the notification information up to the subcarrier block immediately before the subcarrier block, the cumulative value is replaced with $Y_1=4$ in the fifth subcarrier block, and the cumulative value is finally obtained by adding the notification information of the sixth subcarrier block to $Y_1$ and is "6" (4+2).

Figure 10:
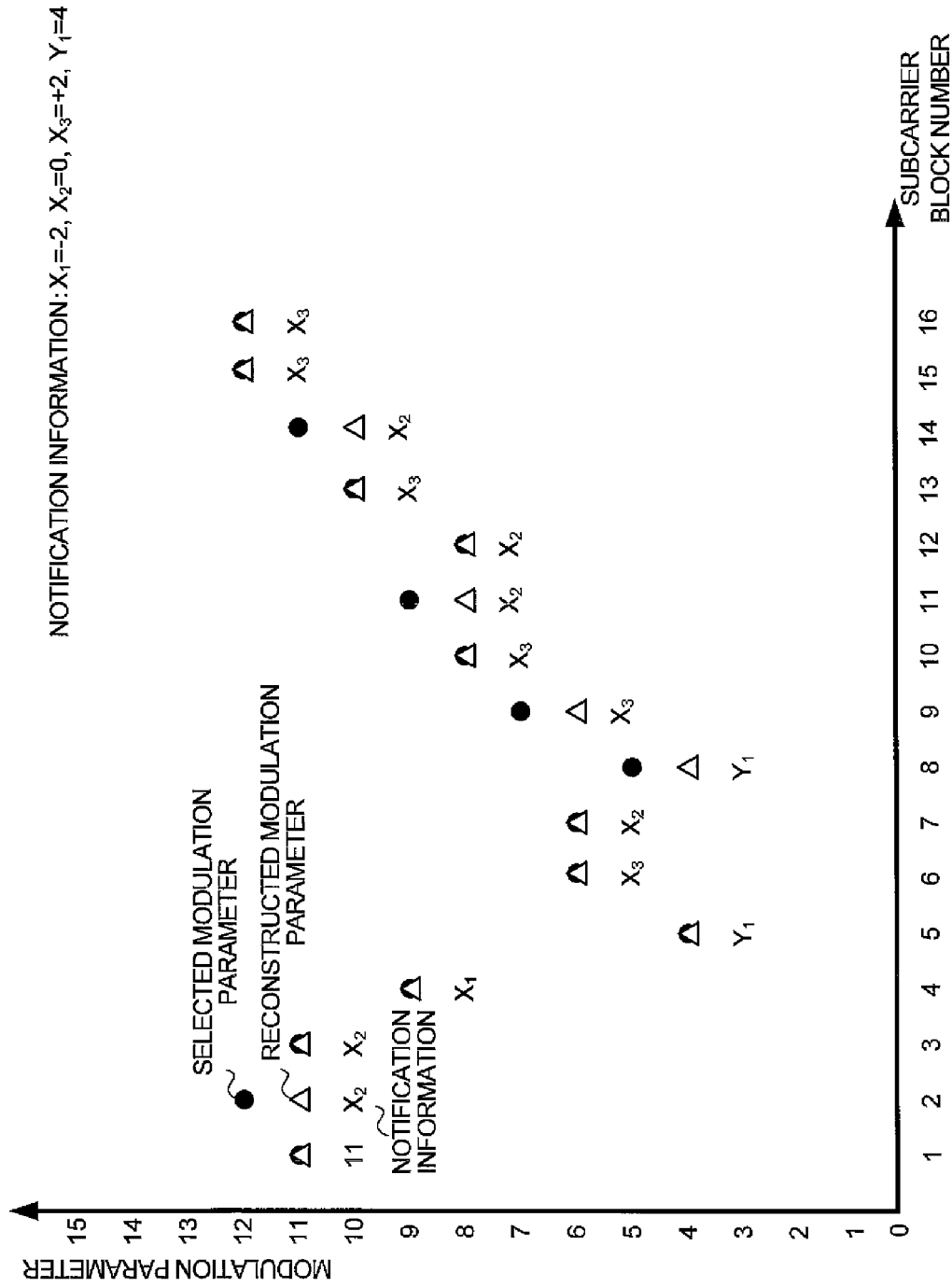
FIG. 10 is a diagram showing a graph plotted with the selected modulation parameters, notification information and reconstructed modulation parameters shown in the example of FIG. 9.

Further, FIG. 10 shows a graph plotted with the selected modulation parameters, notification information and reconstructed modulation parameters shown in the example of FIG. 9. The horizontal axis represents the subcarrier block number, and the vertical axis represents the modulation parameter. The black circle indicates a selected modulation parameter of each subcarrier block input to the notification information generating apparatus, and the white triangle indicates a reconstructed modulation parameter.

In addition, the following methods are used as selection of the processing method in above-mentioned two reconstruction calculating sections 301, and the method of determining values to use as the notification information candidate value, difference-value candidate value $X_k$ (k=1~M, M is a natural number) and non-difference value candidate value $Y_j$ (j=1~N, N is a natural number). In addition, the invention is not limited to the methods.

(1) For a selected modulation parameter in each subcarrier block, generation of the notification information is performed in some combinations of the processing method of the reconstruction calculating section 301 and the notification information candidate value, such notification information is selected that the reconstructed modulation parameter is nearest the selected modulation parameter from among the results, and the used processing method of the reconstruction calculating section 301 and the notification information candidate value is notified together with the generated notification information. It is enough that the used processing method of the reconstruction calculating section 301 and the notification information candidate value are notified to the communicating party as the information about the notification information candidate value at timing at which the notification information candidate value is changed.

(2) A combination of the processing method of the reconstruction calculating section 301 and the notification information candidate value is selected from the variation width of selected modulation parameters between subcarrier blocks, the variation speed (variation pitch in the frequency direction), change amount between values before and after the minimum value of the selected modulation parameter, and the like, and the used processing method of the reconstruction calculating section 301 and the notification information candidate value are notified together with the generated notification information. For example, there is a method for increasing the maximum value of $X_k$ in proportion to the variation width of the selected modulation parameter between subcarrier blocks and the variation speed while increasing the interval of each $X_k$, setting a threshold in the change amount between values before and after the minimum value of the selected modulation parameter, and when the change amount is less than the threshold, selecting the first configuration as the processing method of the reconstruction calculating section, while selecting the second configuration when the change amount is the threshold or more.

Further, in the examples as shown in FIGS. 7 and 9, the case is described of using one non-difference value candidate value $Y_j$ that is a value which is not a difference and indicates a specific modulation parameter, but a plurality of such values may be prepared. For example, there is a method of using two values of a minimum value (carrier hole) and center value of the modulation parameter as notification information candidate values of $Y_1$ and $Y_2$.

Thus, according to this Embodiment, when a difference of the modulation parameter is notified to the communicating party as the channel quality information, by notifying the notification information with either the difference-value candidate value indicating the difference of the modulation parameter or the non-difference value candidate value selected, it is possible to improve accuracy of the reconstructed channel quality information.

EMBODIMENT 2

Embodiment 2 describes the case of using an estimation result of propagation path conditions as the channel quality information as an example.

Figure 11:
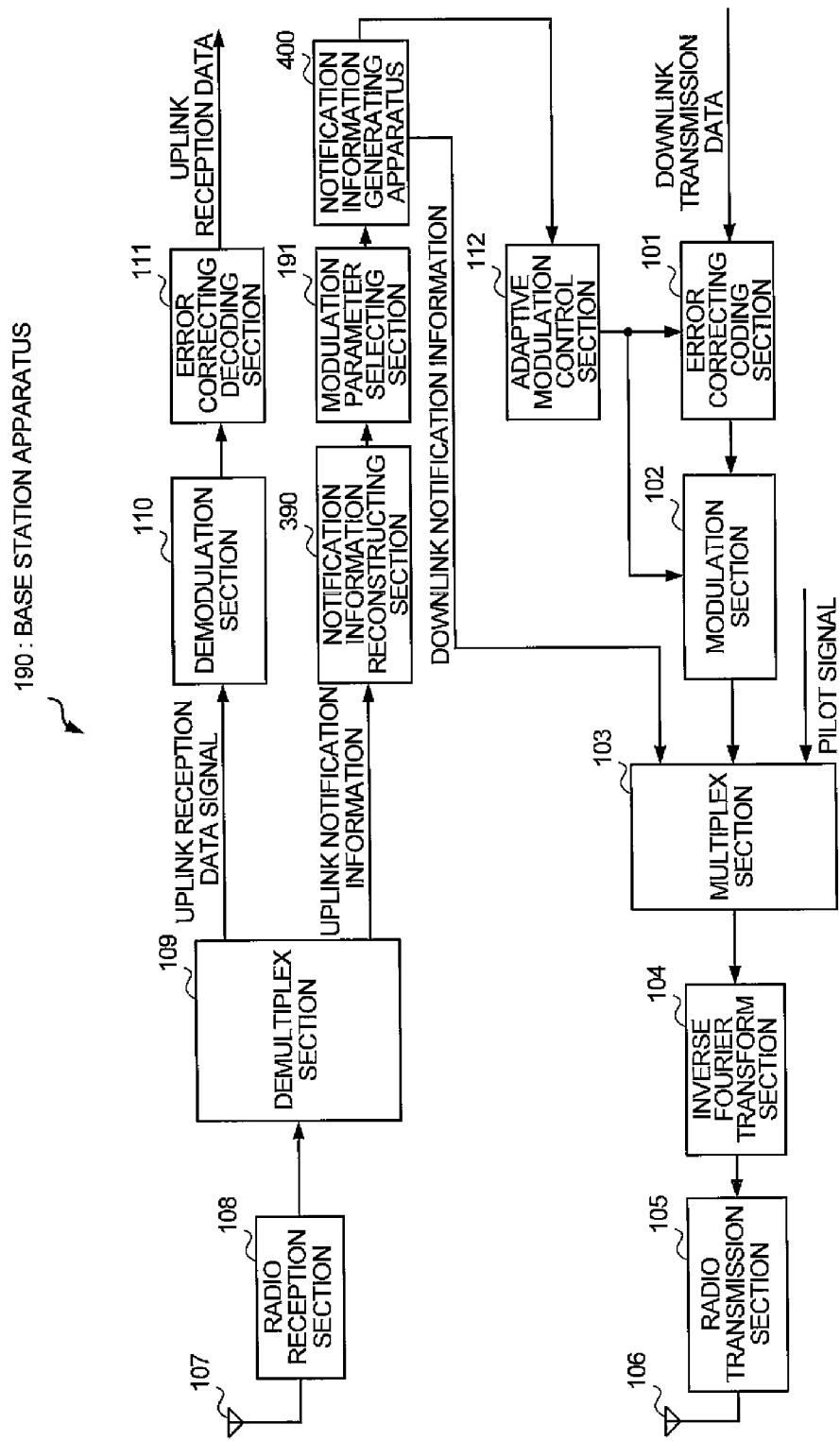
FIG. 11 is a functional block diagram showing a configuration example of a base station apparatus in Embodiments 2 and 8 according to the invention.
Figure 12:
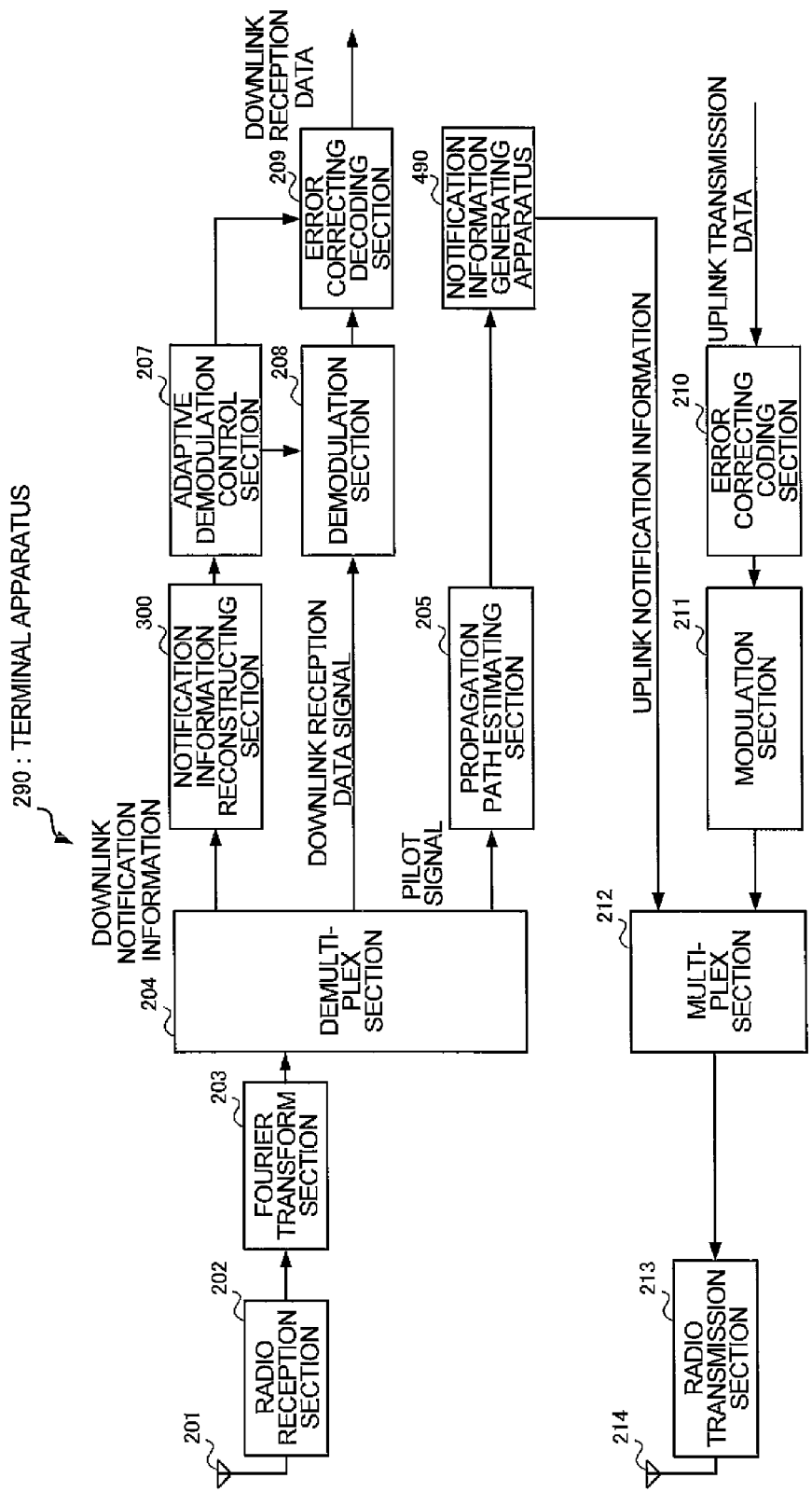
FIG. 12 is a functional block diagram showing a configuration example of a terminal apparatus in Embodiments 2 and 8 according to the invention.

FIG. 11 is a functional block diagram showing a configuration example of a base station apparatus 190 in Embodiment 2 according to the invention. Further, FIG. 12 is a functional block diagram showing a configuration example of a terminal apparatus 290 in Embodiment 2 according to the invention. Embodiment 2 illustrates a case where the information about a modulation parameter used in adaptive modulation of downlink transmission data is notified as the downlink notification information, and propagation path conditions estimated from a downlink reception signal are notified as the uplink notification information.

The base station apparatus 190 as shown in FIG. 11 has the same structural elements as those of the base station apparatus 100 as shown in FIG. 1 except the respects that the base station apparatus 190 has a modulation parameter selecting section 191 between the notification information reconstructing section 390 and the notification information generating apparatus 400, and that the notification information reconstructing section 390 reconstructs an estimation result of propagation path conditions as the uplink notification information. The modulation parameter selecting section 191 is capable of being actualized by the same circuit configuration as that of the modulation parameter selecting section 206 in the terminal apparatus 200 as shown in FIG. 2. The notification information reconstructing section 390 is different from the notification information reconstructing section 300 as shown in FIG. 1 in the input and output information amounts, but is capable of being actualized by the circuit for performing the same processing.

The terminal apparatus 290 as shown in FIG. 12 has the same configuration as that of the terminal apparatus 200 as shown in FIG. 2 except the respects that the terminal apparatus 290 does not need the modulation parameter selecting section between the propagation path estimating section 205 and the notification information generating apparatus 490, and that the notification information generating apparatus 490 receives as an input signal the estimation result of propagation path conditions output from the propagation path estimating section 205, and generates the notification information related to the estimation result of propagation path conditions as the uplink notification information.

The downlink transmission procedures in the base station apparatus 190 of FIG. 11 are the same as the downlink transmission procedures in the base station apparatus 100 of FIG. 1, and descriptions thereof are omitted.

Described next are the downlink reception procedures in the terminal apparatus 290 of FIG. 12. The operations in the radio reception section 202, Fourier transform section 203, demultiplex section 204, propagation path estimating section 205, adaptive demodulation control section 207, demodulation section 208, error correcting decoding section 209 and notification information reconstructing section 300 are the same as in the downlink reception procedures in the terminal apparatus 200 of FIG. 2.

The notification information generating apparatus 490 receives an estimation result of propagation path conditions output from the propagation path estimating section 205, and based on the input estimation result of propagation path conditions, generates the uplink notification information to output. The processing in the notification information generating apparatus 490 will be described later with reference to FIG. 13.

Further, the uplink transmission procedures in the terminal apparatus 290 of FIG. 12 are the same as the uplink transmission procedures in the terminal apparatus 200 of FIG. 2, and descriptions thereof are omitted.

Described next are the uplink reception procedures in the base station apparatus 190 of FIG. 1. The operations in the radio reception section 108, demultiplex section 109, demodulation section 110, error correcting decoding section 111, and adaptive modulation control section 112 are the same as in the uplink reception procedures in the base station apparatus 100 of FIG. 1.

The notification information reconstructing section 390 receives the uplink notification information output from the demultiplex section 204, and reconstructs the information about the estimation result of downlink propagation path conditions from the input uplink notification information. In addition, the processing in the notification information reconstructing section 390 will be described later with reference to FIG. 14.

The modulation parameter selecting section 191 receives the estimation result of downlink propagation path conditions output from the notification information reconstructing section 390, selects a subsequent downlink modulation parameter on a subcarrier block basis based on the input estimation result of propagation path conditions, and outputs the selected modulation parameter. In addition, selection of the modulation parameter is performed by applying the estimation result of propagation path conditions to the beforehand determined correspondence relationship between the modulation parameter and propagation path conditions. For example, the section 191 holds modulation parameters and ranges of propagation path conditions corresponding to the parameters as a table, and is capable of determining a modulation parameter to select by comparing the table with the estimation result of propagation path conditions.

The notification information generating apparatus 400 receives the information about the modulation parameter output from the modulation parameter selecting section 191, and based on the input information about the modulation parameter, generates the downlink notification information to output, while based on the downlink notification information, reconstructing the information about the modulation parameter to output. Further, the notification information generating apparatus 400 is capable of being actualized by the same functional block configuration as in the notification information generating apparatus 400 as shown in FIG. 3.

Figure 13:
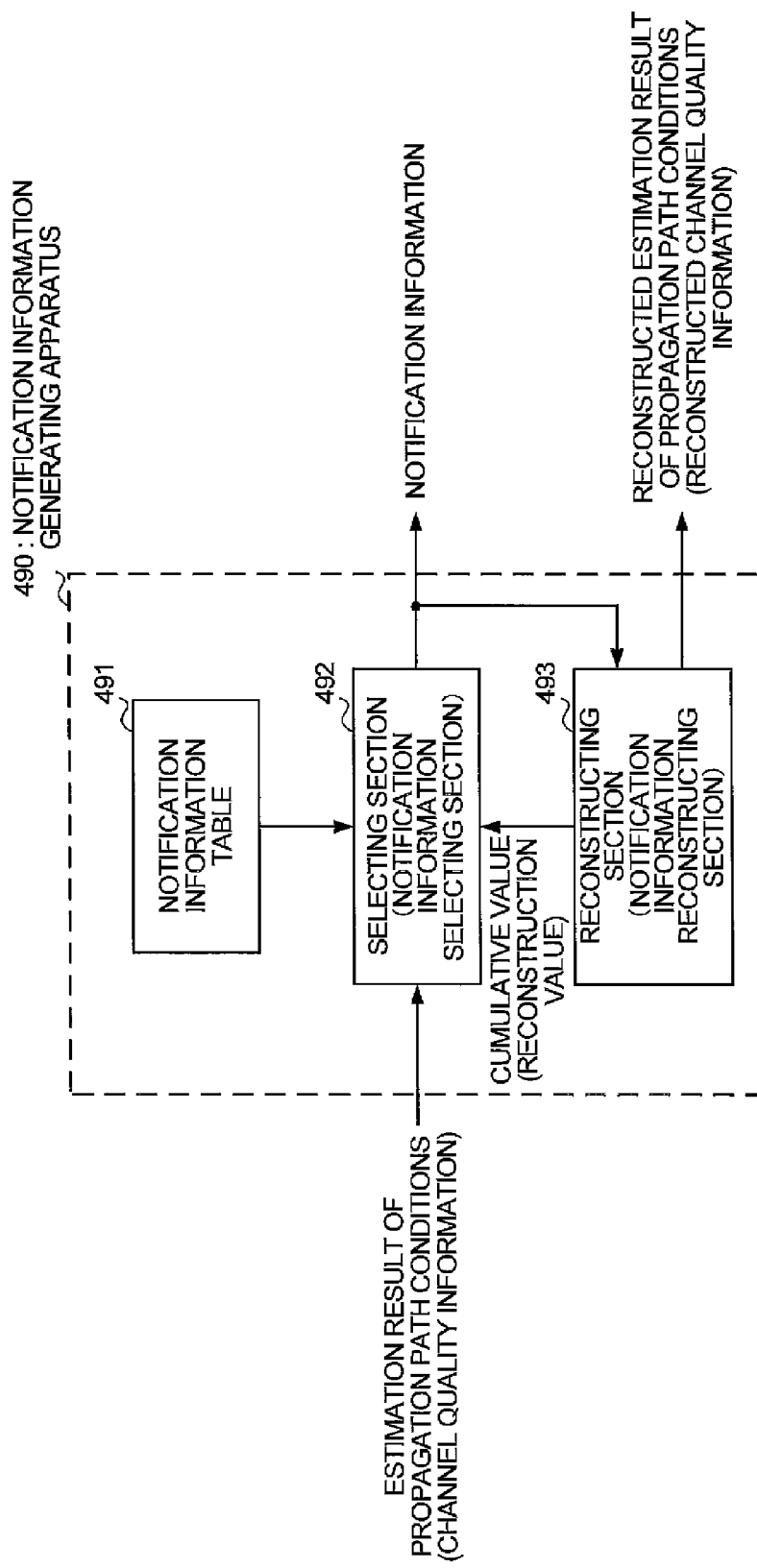
FIG. 13 is a diagram showing an example of a functional block of a notification information generating apparatus in the terminal apparatus in FIG. 12.

FIG. 13 shows a functional block diagram of the notification information generating apparatus 490 in the terminal apparatus 290 in FIG. 12. A notification information table 491 is a storage area for storing candidate values selectable as the notification information. The candidate values include difference-value candidate values each indicating a difference between two pieces of channel quality information, and non-difference value candidate values each indicating propagation path conditions of channels. The notification information table 491 holds a table comprised of a plurality of values (difference-value absolute-value candidate values) $X'_k$ ($k=1\sim M$, M is a natural number) indicating differences between estimation results of propagation path conditions, and values (non-difference value candidate values) $Y'_j$ ($j=1\sim N$, N is a natural number) indicating specific estimation results of propagation path conditions that are not differences (hereinafter, the combination of $X'_k$ and $Y'_j$ is described as the notification information candidate values), which are selectable as the notification information, and outputs these notification information candidate values.

The selecting section 492 receives the estimation result of propagation path conditions on a subcarrier block basis estimated in the propagation path estimating section 205 in FIG. 12, notification information candidate values output from the notification information table 491, and a cumulative value output from the reconstructing section 493, and generates the notification information. The procedures for generating the notification information in the selecting section 492 are the same as in the notification information generating apparatus 400 as shown in FIGS. 3 and 4 except the estimation result of propagation path conditions being used as a substitute for the modulation parameter as the channel quality information. More specifically, for a subcarrier block used as a starting point, the selecting section 492 outputs the estimation result of propagation path conditions on the subcarrier block as the notification information without modification. For a subcarrier block being not used as a starting point, the selecting section 492 calculates a difference value between the estimation result of propagation path conditions on the subcarrier block and the cumulative value input from the reconstructing section 493, and based on the estimation result of propagation path conditions and the calculated difference value, selects one from the notification information candidate values to output as the notification information.

More specifically, for each subcarrier block not to use as a starting point, the selecting section 492 selects a difference-value candidate value nearest the calculated difference value from among difference-value candidate values $X'_k$, adds the selected difference-value candidate value and the cumulative value to calculate an addition result, selects a value nearest the calculated addition result or the estimation result of propagation path conditions of the subcarrier block input from the non-difference value candidate value $Y'_j$, and selects the notification information candidate value ($X'_k$ or $Y'_j$) used in the selected value as the notification information. The generated notification information is output to the reconstructing section 493.

The reconstructing section 493 holds the notification information output from the selecting section 492, reconstructs the estimation result of propagation path information based on the held notification information, and outputs the reconstructed estimation result of propagation path information. The details of the reconstructing section 403 will be described later with reference to FIG. 14.

In addition, the reconstructing section 493 in the notification information generating apparatus 490 has the same functional block configuration as in the notification information reconstructing section 390 for the uplink notification information in the base station apparatus 190 of FIG. 11.

Figure 14:
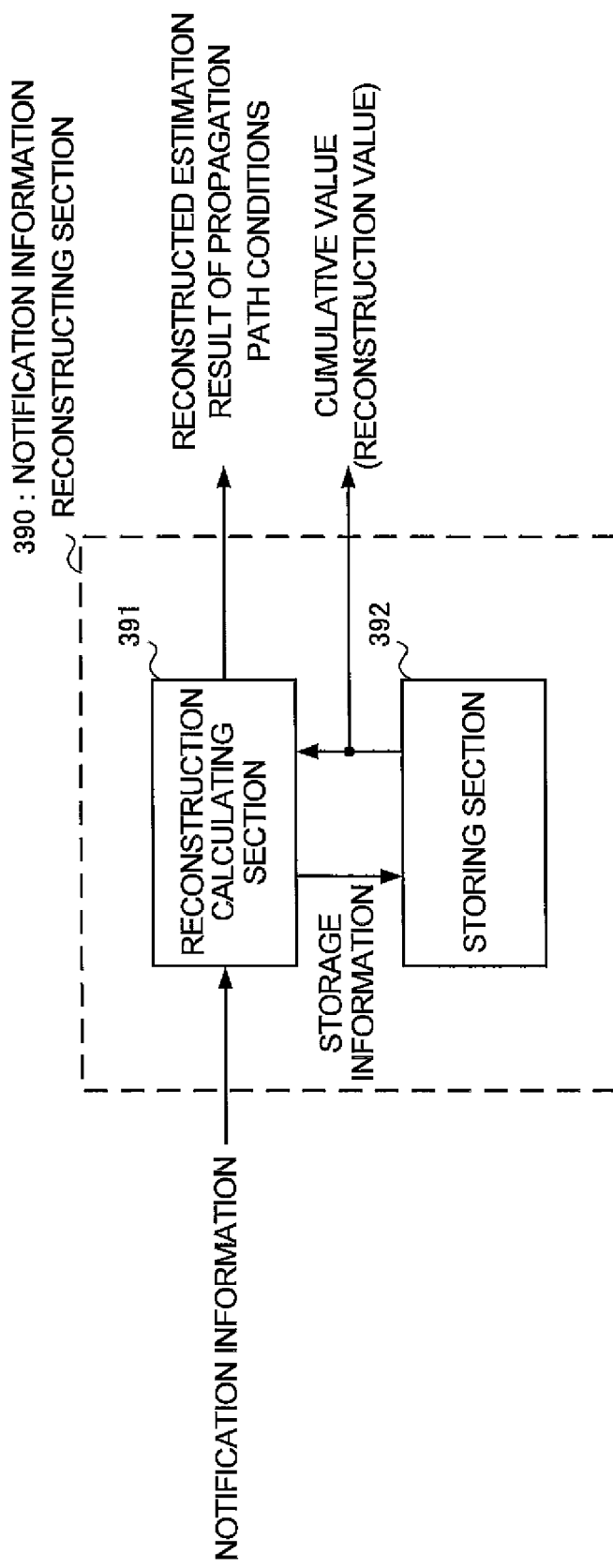
FIG. 14 is a diagram showing an example of a functional block of a notification information constructing section in Embodiments 2 and 8.

FIG. 14 shows an example of a functional block diagram of the notification information reconstructing section 390 in this Embodiment. The notification information reconstructing section 390 has a reconstruction calculating section 391 and storing section 392. The reconstructing section 493 also has the same configuration. The reconstruction calculating section 391 differs from the reconstruction calculating section 301 as shown in FIG. 5 in the respect of outputting the reconstructed estimation result of propagation path conditions, instead of the section 301 outputting the reconstructed modulation parameter. Further, the storing section 392 differs in the respect of receiving notification information candidate values selected based on the estimation result of propagation path conditions as the notification information, and outputting the reconstructed estimation result of propagation path conditions as the cumulative value. The other portions are the same as in FIGS. 5 and 6.

More specifically, the reconstruction calculating section 391 receives the notification information and the cumulative value output from the storing section 392, and for a subcarrier block used as a starting point in generating the notification information, outputs the notification information about the subcarrier block as the reconstructed estimation result of propagation path conditions without modification, while outputting the notification information to the storing section 392 as the storage information. For a subcarrier block being not used as a starting point, when the notification information about the subcarrier block is a difference-value candidate value $X'_k$, the reconstruction calculating section 391 adds the notification information and the cumulative value to output as the reconstructed estimation result of propagation path conditions, while outputting the addition result to the storing section 392 as the storage information. When the notification information is a non-difference value candidate value $Y'_j$, the section 391 outputs the notification information as the reconstructed estimation result of propagation path conditions without modification, while outputting the notification information to the storing section 392 as the storage information. Alternately, as another configuration, when the notification information is the non-difference value candidate value $Y'_j$, the section 391 outputs the notification information as the reconstructed estimation result of propagation path conditions without modification, and outputs the cumulative value to the storing section 392 as the storage information without modification.

In Embodiment 2, the notification information and specific examples of the reconstruction on the downlink notification information as shown in FIGS. 7 to 10 are the same as in Embodiment 1. Further, for the uplink notification information, the procedures are the same as in Embodiment 1 except that "the modulation parameter" is replaced with "the estimation result of propagation path conditions", and that a range of available values (the number of bits and the like) is changed.

Thus, according to this Embodiment, when a difference in the estimation result of propagation path conditions is notified to the communicating party as the channel quality information, by notifying the notification information with either the difference-value candidate value indicating the difference in the estimation result of propagation path conditions or the non-difference candidate value selected, it is possible to improve accuracy of the reconstructed channel quality information.

EMBODIMENT 3

Embodiment 3 describes the notification information generating apparatus using a specific example for calculating a difference value. The following explanation describes the case of using the notification information generating apparatus 400 as shown in FIG. 3, and inputting a modulation parameter as an example of the channel quality, but this Embodiment is applicable to the notification information generating apparatus 490 as shown in FIG. 13.

The number of a subcarrier block (channel) is indicated by a variable i, and it is assumed that Q(i) is a modulation parameter of the ith subcarrier block, S(i) is a cumulative value (reconstruction value) to compare with the modulation parameter of the ith subcarrier block, and that D(i) is a difference value. $i_0$ ... indicates a subcarrier block number as a starting point. R(i) indicates the notification information of the ith subcarrier block.

In the subcarrier block as a starting point, the selecting section 402 generates the notification information as R(i)=Q(i).

For subcarrier blocks except the subcarrier block as a starting point, first, the reconstructing section 403 calculates a cumulative value S(i) using equation (1) while omitting the subcarrier block as a starting point. In calculating the cumulative value, the section 403 uses a different equation corresponding to the relationship between the subcarrier block number $i_0$ as a starting point and i to calculate the cumulative value S(i).

[Eq. 1]

$$S(i) = \begin{cases} \sum_{k=i_0}^{i+1} R(k) & (i < i_0) \\ \sum_{k=i_0}^{i-1} R(k) & (i > i_0) \end{cases} \quad (1)$$

Next, using the cumulative value S(i) calculated by the reconstructing section 403, the selecting section 402 calculates a difference value D(i) using the equation of D(i)=Q(i)−S(i). Based on the calculated difference value D(i) and the input modulation parameter (an example of the channel quality information), the section 402 selects a notification information candidate value, and based on the selected notification information candidate value, generates the notification information to output.

Thus, the notification information generating apparatus 400 first generates the notification information of a channel as a starting point, and sequentially generates the notification information of channels that are not used as a starting point. The notification information generating apparatus 400 generates the channel quality information of the channel used as a starting point as the notification information. Herein, with attention given to two different channels (subcarrier blocks) i.e. the first channel and the second channel, the operation is described in the case of generating the notification information of the second channel when the notification information of the first channel is already generated. The reconstructing section 403 already holds (stores) the notification information generated based on the channel quality information of the first channel as the last notification information, and further holds the notification information of the channel (starting-point channel) as a starting point in the generating the notification information. Based on the held last notification information, the reconstructing section 403 generates the cumulative value (reconstruction value), and outputs the generated cumulative value to the selecting section 402 as a reconstruction value of the first channel. In addition, irrespective of whether the first channel is a starting-point channel or not, the sane operation is performed.

The selecting section 402 receives the channel quality information of the second channel, calculates a difference value between the received channel quality information of the second channel and the reconstruction value of the first channel reconstructed by the reconstructing section 403, and based on a value obtained by adding the cumulative value generated by the reconstructing section 403 and a difference-value candidate value (in the case of a plurality of difference-value candidate values, a plurality of addition values), non-difference candidate value and the channel quality information of the second channel, selects a single notification information candidate value from the notification information table 401 to generate the notification information. The reconstructing section 403 receives the generated notification information of the second channel to store as the last notification information.

Further, the notification information generating apparatus 400 repeats the operation of generating the notification information based on a difference value between two channels such as the second channel and third channel, and generates the notification information of all the plurality of channels.

Moreover, the notification information generating apparatus of each of the above-mentioned Embodiments is capable of being actualized by hardware such as a circuit and the like or software. In the case of actualizing by software, the apparatus is implemented by a program (notification information generating program) on the operation of a computer. The notification information generating program is loaded on memory in a computing machine (in the communication apparatus) and executed under control of a central processing unit (CPU). The notification information generating program has the function of making the computing machine execute at least the following procedures.

The program has the procedures for selecting a single candidate value from candidate values for the notification information including at least one difference-value candidate value indicating a difference between two pieces of channel quality information and at least one non-difference value candidate value indicating channel quality information, and generating the notification information based on the selected candidate value. More specifically, the program has the function of executing the procedures for (1) storing in a notification information table a plurality of difference-value candidate values and non-difference value candidate values as candidate values for the notification information, (2) generating a reconstruction value using the notification information generated based on the channel quality information of a first channel, and (3) receiving the channel quality information of a second channel differing from the first channel, selecting a single candidate from the candidate values for the notification information based on the channel quality information of the second channel and the reconstruction value, and generating the notification information based on the selected candidate value.

Further, (5) for a channel as a starting point, the program may have the procedure for outputting the input channel quality information as the notification information. Furthermore, (6) in selecting a candidate value, the program may have the procedure for selecting a candidate value based on the channel quality information of the second channel, in addition to the calculated difference value.

EMBODIMENT 4

Embodiment 4 describes a notification information generating apparatus that generates the notification information using a candidate-value number for specifying the notification information candidate value. In Embodiments 1 to 3, the descriptions are given while assuming that the notification information is a notification information candidate value itself, and this Embodiment describes the case of using the candidate-value number indicating a value of the notification information candidate value and generating the notification information.

The following explanation describes the case of using the notification information generating apparatus 400 as shown in FIG. 3, but this Embodiment is applicable to the notification information generating apparatus 490 as shown in FIG. 13. As an example, the case is explained that the notification information generating apparatus 400 generates the notification information with n bits. In calculating the cumulative value, the reconstructing section needs to acquire information that associates a candidate-value number with a notification information candidate value by referring to the notification information table, being notified of the correspondence between the notification information candidate value and the candidate-value number from the selecting section, or the like.

The notification information table 401 stores notification information candidate values and candidate-value numbers specifying the notification information candidate values in association with each other. The notification information table 401 has a storage area for storing n bits to store $2^n$ candidate-value numbers specifying respective candidate values for the notification information and candidate values for the notification information associated respectively with $2^n$ candidate-value numbers. In addition, for the notification information as a starting point, it is possible to notify such information by a method of selecting a non-difference value candidate value to approximate the channel quality information, using the starting-point notification information having a value that can be notified with n bits, separately notifying the starting-point notification information (for example, the channel quality information itself), or the like. For example, when the notification information candidate values contain difference-value candidate values $X_k$ (k=1~M, M is a natural number) and non-difference value candidate values $Y_j$ (j=1~N, N is a natural number), M and N have the relationship of $M=2^n-N$.

According to the procedures as shown in FIG. 4, the selecting section 402 selects a notification information candidate value, and using a candidate-value number specifying the selected notification information candidate value, generates the notification information.

The reconstructing section 403 receives the candidate-value number as the notification information, and by referring to the notification information table 401, generates the reconstructed channel quality information.

Thus, according to this Embodiment, by generating the notification information with n bits using the candidate-value number, the information amount of the notification information can be suppressed. By this means, it is possible to suppress the control information amount transmitted and received between communication apparatuses. Further, it is possible to generate the notification information with the notification information amount remaining constant while maintaining accuracy of the reconstructed channel quality information, and to suppress complexity and non-efficiency of the notification procedures of the control information transmitted and received between communication apparatuses.

EMBODIMENT 5

The notification information generating apparatus explained in each of the above-mentioned Embodiments is capable of adopting the following configuration. Each of the above-mentioned Embodiments describes the case of repeating a feedback loop comprised of the selecting section and reconstructing section. Inside the selecting section of each of the above-mentioned Embodiments, the same processing as the reconstruction processing that is processing inside the reconstructing section is performed on each candidate value, and a single candidate value is selected based on the result. In other words, the selecting section has the function of reconstruction, and the function of comparing with the reconstruction result. Therefore, a common circuit can be shared as the circuit with the function of reconstruction inside the selecting section and the circuit with the function of reconstruction inside the reconstructing section. Further, not limited to hardware such as the circuit and the like, also when such a function is implemented by software, the function can be shared to actualize.

Figure 15:
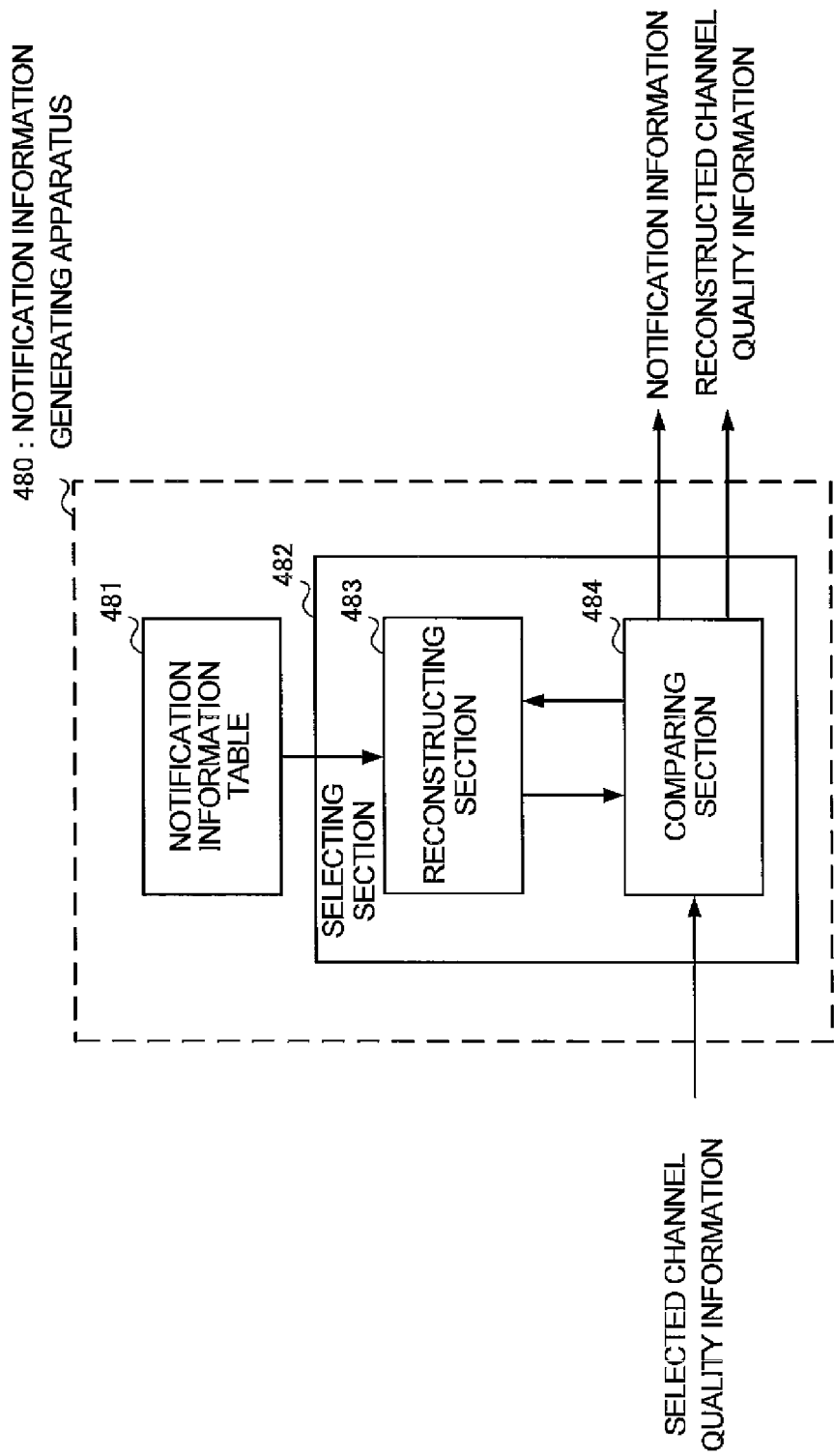
FIG. 15 is a diagram showing an example of a functional block of a notification information generating apparatus with the function of reconstruction incorporated into the selecting section.

FIG. 15 is a block diagram showing an example of a configuration of a notification information generating apparatus 480 that provides the selecting section with the reconstructing section. The notification information generating apparatus 480 has a notification information table 481, selecting section 482, reconstructing section 483, and comparing section 484. The notification information table 481 is the same as the notification information table 401 of FIG. 3. The block configuration of FIG. 15 adopts the configuration where the reconstructing section 483 is included inside the selecting section 482. The selected channel quality information is input to the comparing section 484 inside the selecting section 482. The reconstructing section 483 has the storage function, and stores a last reconstructed reconstruction value (cumulative value, channel quality information reconstructed in the processing of the last channel).

Figure 16:
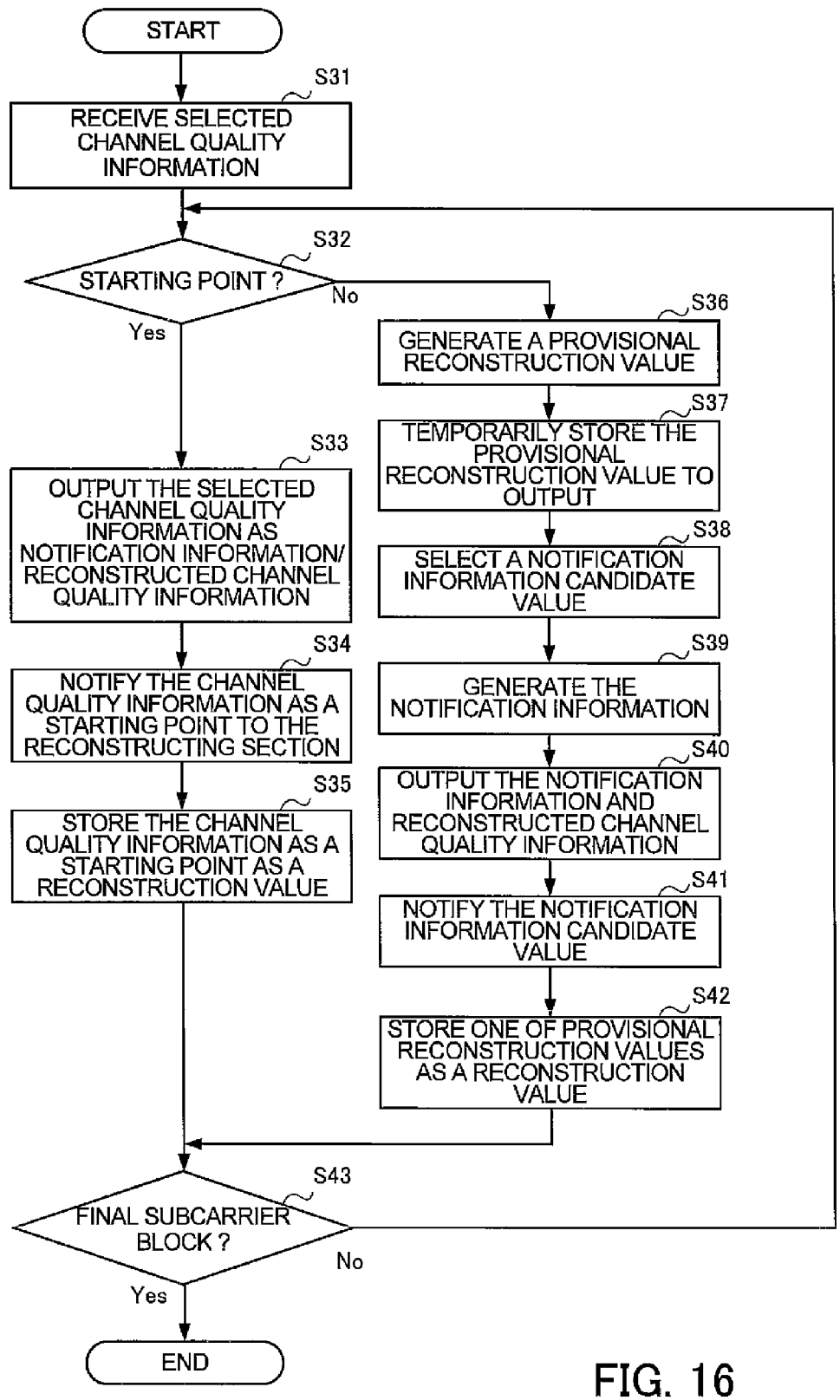
FIG. 16 is a flowchart showing an example of the operation of a notification information generating apparatus of Embodiment 5.

Described next is the operation of the notification information generating apparatus 480 of this Embodiment. FIG. 16 is a flowchart showing an example of the operation of the notification information generating apparatus 480 of this Embodiment.

First, in the notification information generating apparatus 480, the comparing section 484 receives the selected channel quality information (S31). The comparing section 484 determines whether the input selected channel quality information is of a channel as a starting point (S32), and when the information is of the channel as a starting point (Yes in S32), outputs the selected channel quality information as the notification information and the reconstructed channel quality information (S33), while notifying the reconstructing section 483 of the channel quality information of the channel as a starting point (S34) The reconstructing section 483 stores the notified channel quality information as the last reconstruction value (S35).

In the case of channels except the starting-point channel (No in S32), the comparing section 484 outputs an instruction for outputting a reconstruction value to the reconstructing section 483, and the reconstructing section 483 generates a plurality of provisional reconstruction values (provisionally reconstructed channel quality information) including a value obtained by adding the difference-value candidate value and the last reconstruction value, and non-difference value candidate value (S36). The section 483 outputs the plurality of generated provisional reconstruction values and the notification information candidate value to the comparing section 484 (S37).

More specifically, the reconstructing section 483 stores the last reconstructed reconstruction value, and sequentially receives the notification information candidate value input from the notification information table 481. For the channel (subcarrier block) under the processing, the reconstructing section 483 calculates the provisionally reconstructed channel quality information (provisional reconstruction value) including a value obtained by adding each difference-value candidate value to the last reconstruction value, and non-difference value candidate value. Next, the reconstructing section 483 associates the provisionally reconstructed channel quality information with the notification information candidate value to temporarily store, while sequentially outputting the notification information candidate value and the provisionally reconstructed channel quality information to the comparing section 484.

The comparing section 484 compares the provisionally reconstructed channel quality information sequentially input from the reconstructing section 483 with the selected channel quality information, selects the provisionally reconstructed channel quality information nearest the selected channel quality information as a result of the selection (S38), and generates as the notification information the notification information candidate value used in calculating the selected provisionally reconstructed channel quality information (S39).

The comparison performed by the comparing section 484 is the same as evaluation of the comparison performed by the selecting section in the configuration described previously, although the expression method of the calculation procedures is different. The comparing section 484 outputs the generated notification information, and the reconstructed channel quality information (the selected value among a plurality of provisionally reconstructed channel quality information) associated with the generated notification information, while sending a signal (a signal for specifying the notification information candidate value) indicative of the selected notification information to the reconstructing section 483 (S41).

The reconstructing section 483 stores the provisionally reconstructed channel quality information associated with the notification information candidate value indicated by the signal output from the comparing section 484 (S42) to use as a last reconstructed reconstruction value (last reconstruction value) in the next processing. In addition, the reconstructing section 483 is allowed to adopt either the case of replacing the reconstruction value with the non-difference value candidate value or the case of using the last reconstruction value without considering the non-difference value candidate value in calculating the reconstruction value when the non-difference value candidate value is selected as the notification information, as in the first-configuration reconstruction calculating section and the second-configuration reconstruction calculating section. Accordingly, the reconstruction value output from the reconstructing section 483 may be different from the reconstructed channel quality information.

The comparing section 484 determines whether the channel is a final channel (subcarrier block) (S43), and repeats the processing from step S32 when the channel is not the final channel (No in S43), while finishing the processing when the channel is the final channel (Yes in S43). Thus, by sharing the function of reconstruction processing, the calculation amount can be reduced.

In addition, FIG. 16 illustrates the operations of the comparing section 484 and reconstructing section 483 being performed sequentially, but depending on the processing, the comparing section 484 and reconstructing section 483 are capable of performing the processing in parallel with each other. Further, in FIG. 15, the notification information table 481 may be provided with a dedicated storage area or may be a temporarily reserved storage area (cache). Furthermore, the notification information table 481 may be a storage area temporarily reserved in the selecting section 482 (reconstructing section 483 or comparing section 484).

Moreover, the notification information generating apparatus 480 of this Embodiment is not limited to the operation of FIG. 16. For example, the calculation (step S37 in FIG. 16) of provisional reconstruction values can be configured to be performed in the comparing section 484. For example, the reconstructing section 483 is configured to store a reconstruction value (last reconstruction value) of the last processed channel. The reconstructing section 483 outputs a plurality of notification information candidate values and the last reconstruction value to the comparing section 484. Using input the plurality of notification information candidate values and last reconstruction value, the comparing section 484 calculates provisionally reconstructed channel quality information (a plurality of provisional reconstruction values), compares the plurality of calculated provisional reconstruction values with the selected channel quality information, and selects the provisional reconstruction value nearest the selected channel quality information. The comparing section 484 outputs the selected provisional reconstruction value as the reconstructed channel quality information, while generating the notification information based on the notification information candidate value used in calculating the selected provisional reconstruction value to output.

Further, the comparing section 484 outputs a signal for specifying the notification information candidate value used in calculating the selected provisional reconstruction value to the reconstructing section 483. Based on the signal notified from the comparing section 484, the reconstructing section 483 acquires the selected notification information candidate value, and stores a value obtained by adding the acquired notification information candidate value to the last reconstruction value stored in the storage area as the last reconstruction value when the selected notification information candidate value is a difference-value candidate value, while storing the selected non-difference value candidate value or the last reconstruction value stored in the storage area as the last reconstruction value when the selected notification information candidate value is a non-difference value candidate value, as in the first-configuration reconstruction calculating section and the second-configuration reconstruction calculating section described in Embodiment 1.

In addition, the non-difference value candidate value described in each of the above-mentioned Embodiments may be one of values (information) available as the channel quality information, or a value selected based on the channel quality information. Examples of the value available as the channel quality information include a value indicating the poorest state as a state indicated by the channel quality information, a value indicating a medium state as a state indicated by the channel quality information and the like. Further, examples of the value selected based on the channel quality include a value (for example, average value, dispersion value, a value obtained by subtracting a dispersion value from an average value) calculated by performing statistics (for example, summary statistics processing) on the channel quality information notified from a communication apparatus that receives the signal, frequency interval of channels, delay dispersion value of the propagation path obtained from the channel quality information, a value determined based on the Doppler frequency and the like.

Further, not only the non-difference value candidate value, but also the difference-value candidate value is capable of being changed based on the channel quality information. As an example, a change of the notification information candidate value can be made in the selecting section in the notification information generating apparatus. The selecting section receives the channel quality information of a plurality of channels, determines whether or not to change the notification information candidate value based on the input plurality of channel quality information, and based on a result of the determination, is capable of changing the notification information candidate value (either or both of the difference-value candidate value and the non-difference value candidate value).

The selecting section changes the difference-value candidate value and/or the non-difference value candidate value based on the input channel quality information, delay dispersion value of the propagation path or the like, while updating the notification information table, and the base station apparatus notifies the terminal apparatus (communication apparatus of the communicating party) of the information about the updated notification information candidate value (candidate value). The information about the notification information candidate value to notify may be the notification information candidate value itself, or when notification information candidate values are associated with candidate-value numbers, notified is a candidate-value number and the information about the notification information candidate value associated with the candidate-value number. The terminal apparatus stores the received information about the notification information candidate value in the notification information table of the notification information generating apparatus. By this means, it is possible to determine a suitable notification information candidate value corresponding to the propagation path conditions, and to respond to variations during communication with flexibility.

EMBODIMENT 6

FIGS. 7 to 10 show the example of the case where a single subcarrier block exists as a starting point in generating the notification information as an example of generation of the notification information in the notification information generating apparatus 400, but it is possible to adopt a configuration where a plurality of subcarrier blocks exists as the starting point. This Embodiment uses a modulation parameter as an example of the channel quality information to explain.

FIG. 17 shows an example of the generation result of the notification information and reconstructed modulation parameter in the notification information generating apparatus 400 (or notification information generating apparatus 480) when four subcarrier blocks of subcarrier block numbers 1, 6, 11 and 16 are starting points in generating the notification information. In addition, the number of subcarrier blocks, MCS used as the modulation parameter and notification information candidate values ($X_k$, $Y_1$) are the same as in FIG. 7.

In the example of FIG. 17, as the notification information about the first, sixth, eleventh and sixteenth subcarrier blocks that are starting points, modulation parameters selected respectively on the subcarrier blocks are output without modification. For the notification information about the other subcarrier blocks, a difference value is obtained between the cumulative value (reconstruction value) of the notification information of from the starting-point subcarrier block to a subcarrier block immediately before the subcarrier block and the selected modulation parameter of the subcarrier block, and for example, a value nearer a value of the originally selected modulation parameter is selected from between a value of the modulation parameter to be reconstructed in selecting $X_k$ nearest the difference value as the notification information and a value of the modulation parameter to be reconstructed in selecting $Y_1$ as the notification information.

Figure 18:
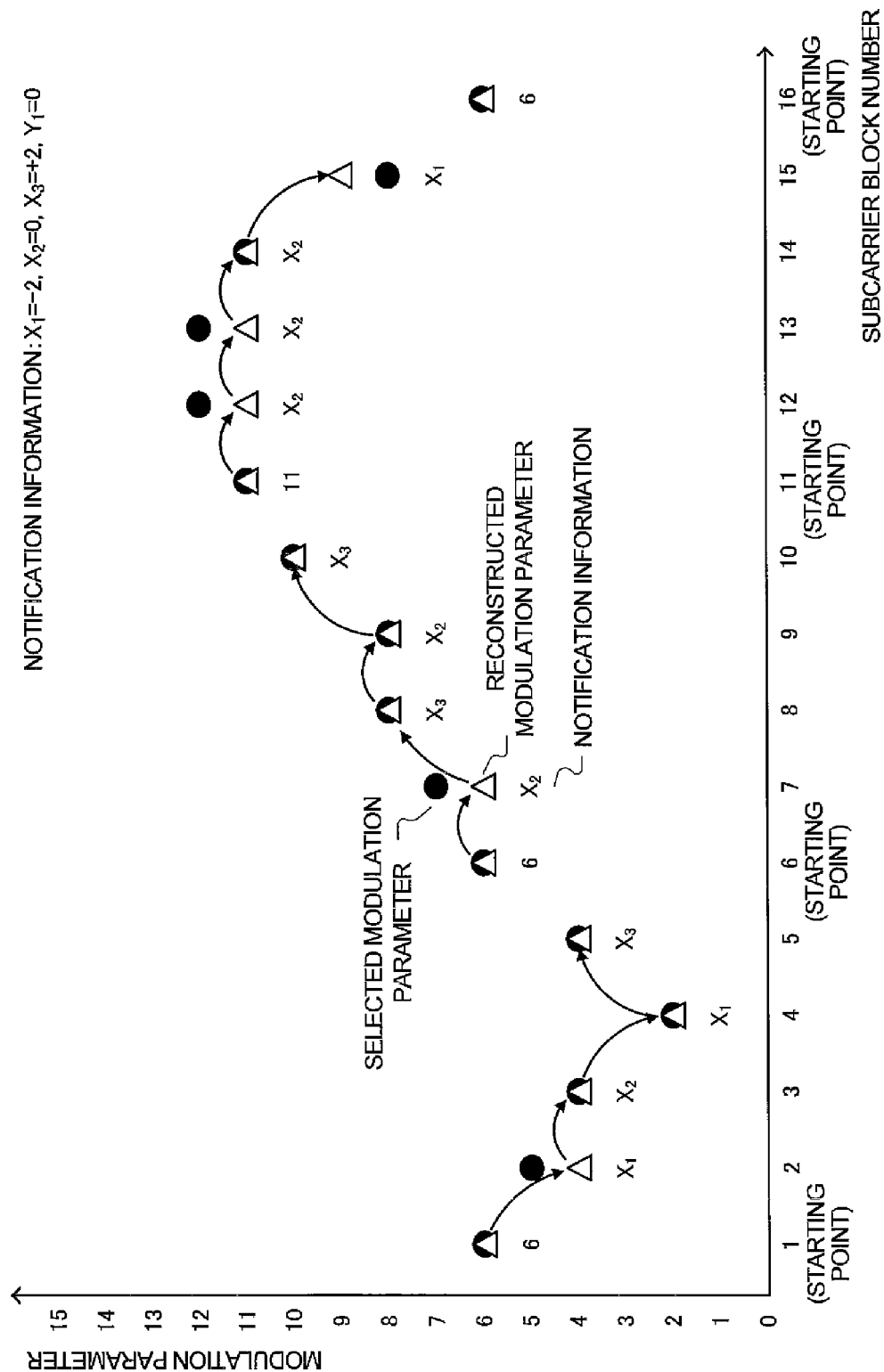
FIG. 18 is a diagram showing a graph plotted with selected modulation parameters, notification information and reconstructed modulation parameters shown in the example of FIG. 17.

FIG. 18 shows a graph plotted with the selected modulation parameters, notification information and reconstructed modulation parameters shown in the example of FIG. 17. The horizontal axis represents the subcarrier block number, and the vertical axis represents the modulation parameter. The black circle indicates a selected modulation parameter of each subcarrier block input to the notification information generating apparatus, and the white triangle indicates a reconstructed modulation parameter. In addition, each arrow indicates the direction of processing in obtaining a difference value between the cumulative value of the notification information of from the starting-point subcarrier block to a subcarrier block immediately before the subcarrier block and the selected modulation parameter of the subcarrier block.

FIG. 19 shows another example of the generation result of the notification information and reconstructed modulation parameter in the notification information generating apparatus 400 (or notification information generating apparatus 480) when four subcarrier blocks of subcarrier block numbers 1, 6, 11 and 16 are starting points in generating the notification information.

Figure 20:
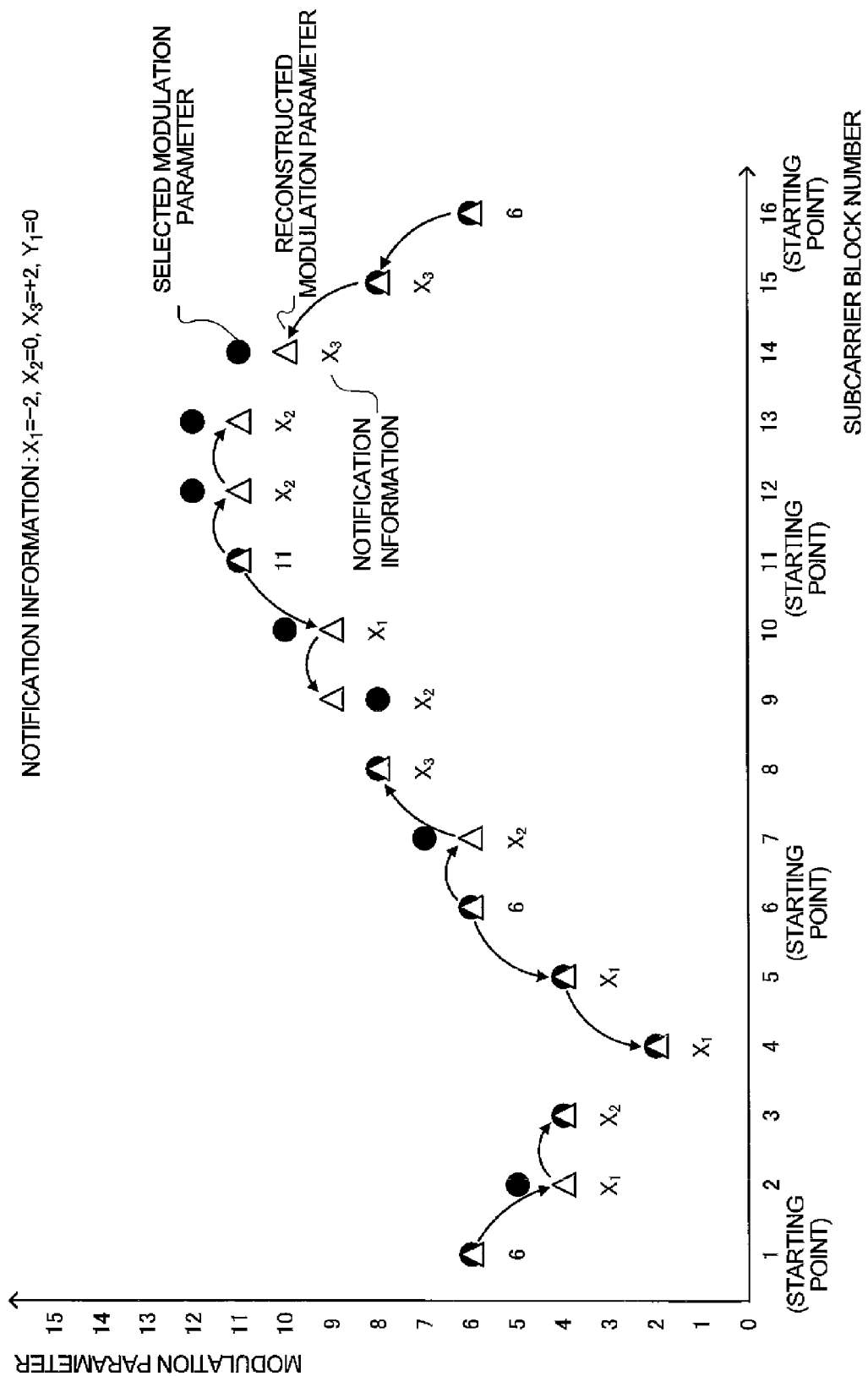
FIG. 20 is a diagram showing a graph plotted with the selected modulation parameters, notification information and reconstructed modulation parameters shown in the example of FIG. 19.

Further, FIG. 20 shows a graph plotted with the selected modulation parameters, notification information and reconstructed modulation parameters shown in the example of FIG. 19. The horizontal axis represents the subcarrier block number, and the vertical axis represents the modulation parameter. The black circle indicates a selected modulation parameter of each subcarrier block input to the notification information generating apparatus, and the white triangle indicates a reconstructed modulation parameter. In addition, each arrow indicates the direction of processing in obtaining a difference value between the cumulative value (reconstruction value) of the notification information of from the starting-point subcarrier block to a subcarrier block immediately before the subcarrier block and the selected modulation parameter of the subcarrier block.

When a plurality of subcarrier blocks exists as a starting point, for the notification information about subcarrier blocks except the subcarrier blocks as a starting point, a subcarrier block as a starting point and the processing direction can be selected arbitrarily in obtaining a difference value between the cumulative value of the notification information of from the starting-point subcarrier block to a subcarrier block immediately before the subcarrier block and the selected modulation parameter of the subcarrier block. For example, FIG. 20 shows an example of case where the nearest starting-point subcarrier block is used as a starting point in calculation of the cumulative value in generating the notification information about each of subcarrier blocks except the starting-point subcarrier, and the processing is performed in the direction of the arrow as shown in the figure.

Figure 21:
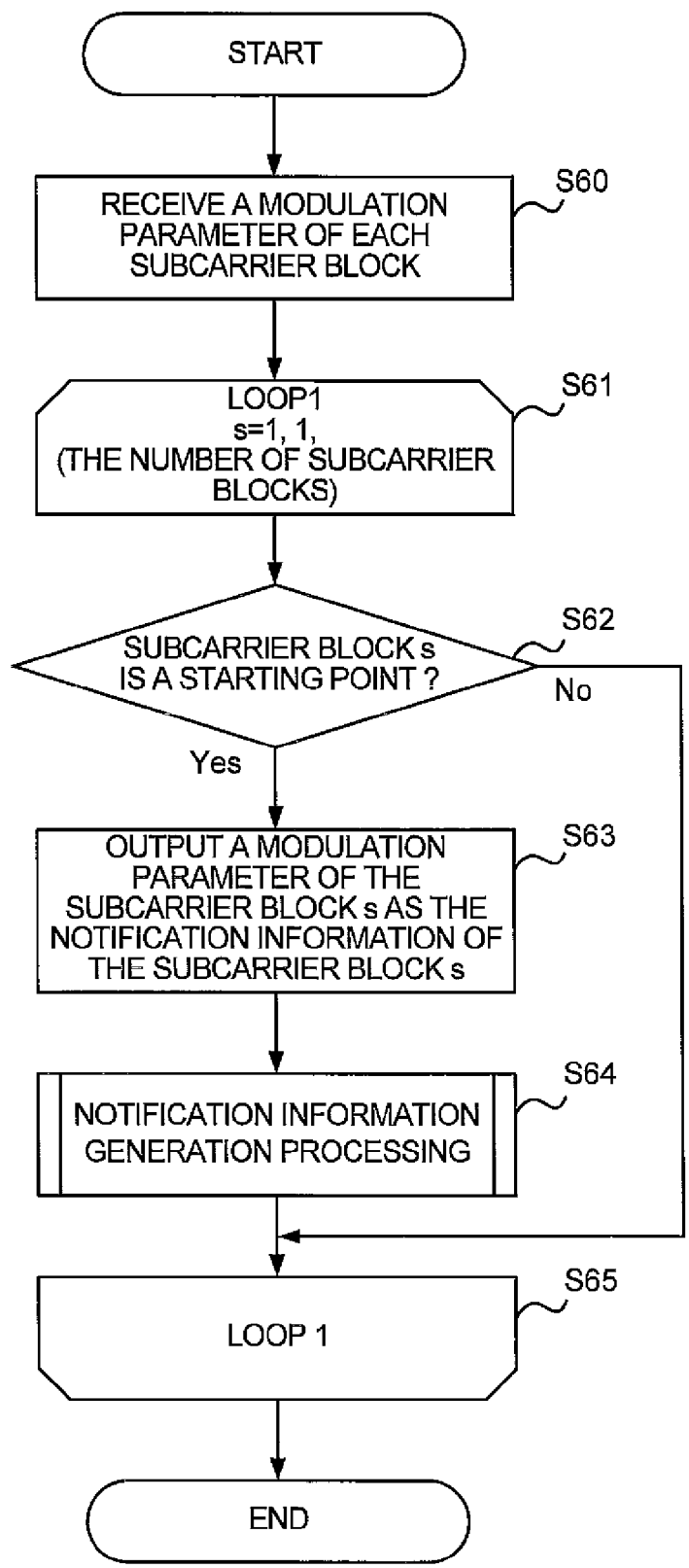
FIG. 21 is a flowchart showing an example of the operation of the notification information generating apparatus when a plurality of subcarrier blocks is provided as a starting point.
Figure 22:
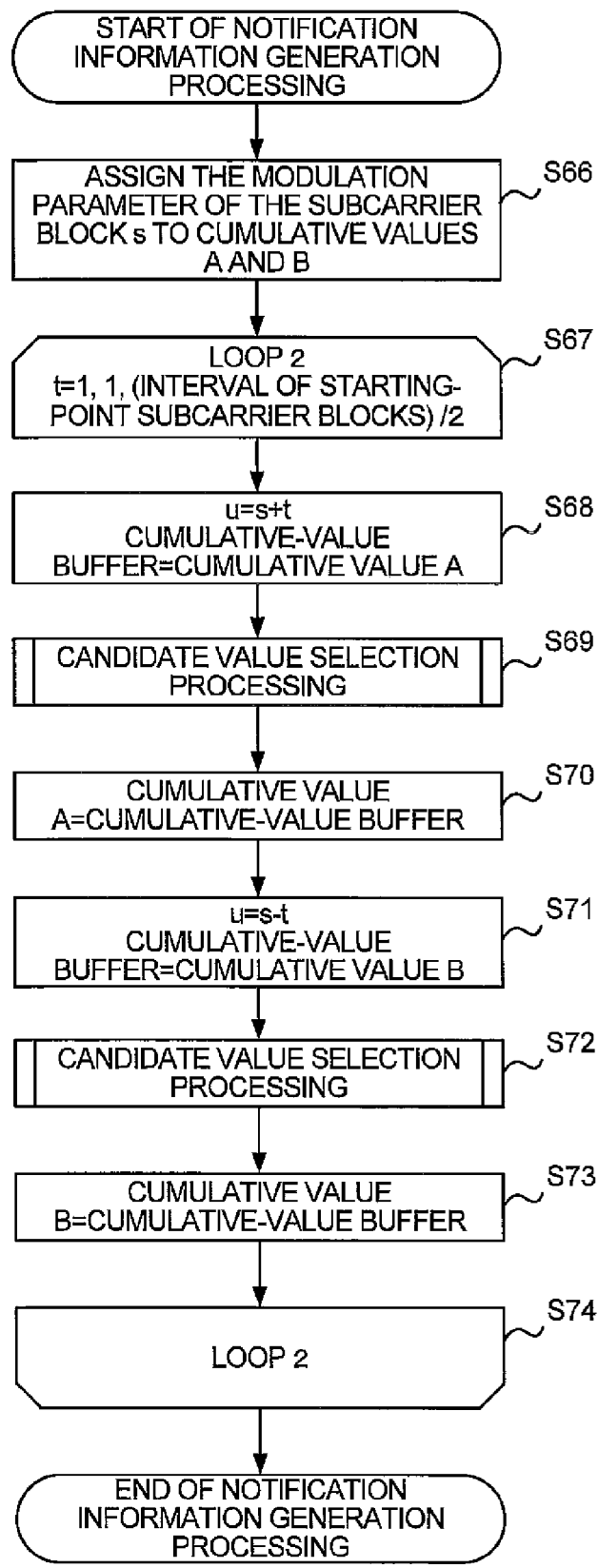
FIG. 22 is a flowchart showing an example of the reconstruction value generation processing in FIG. 21.
Figure 23:
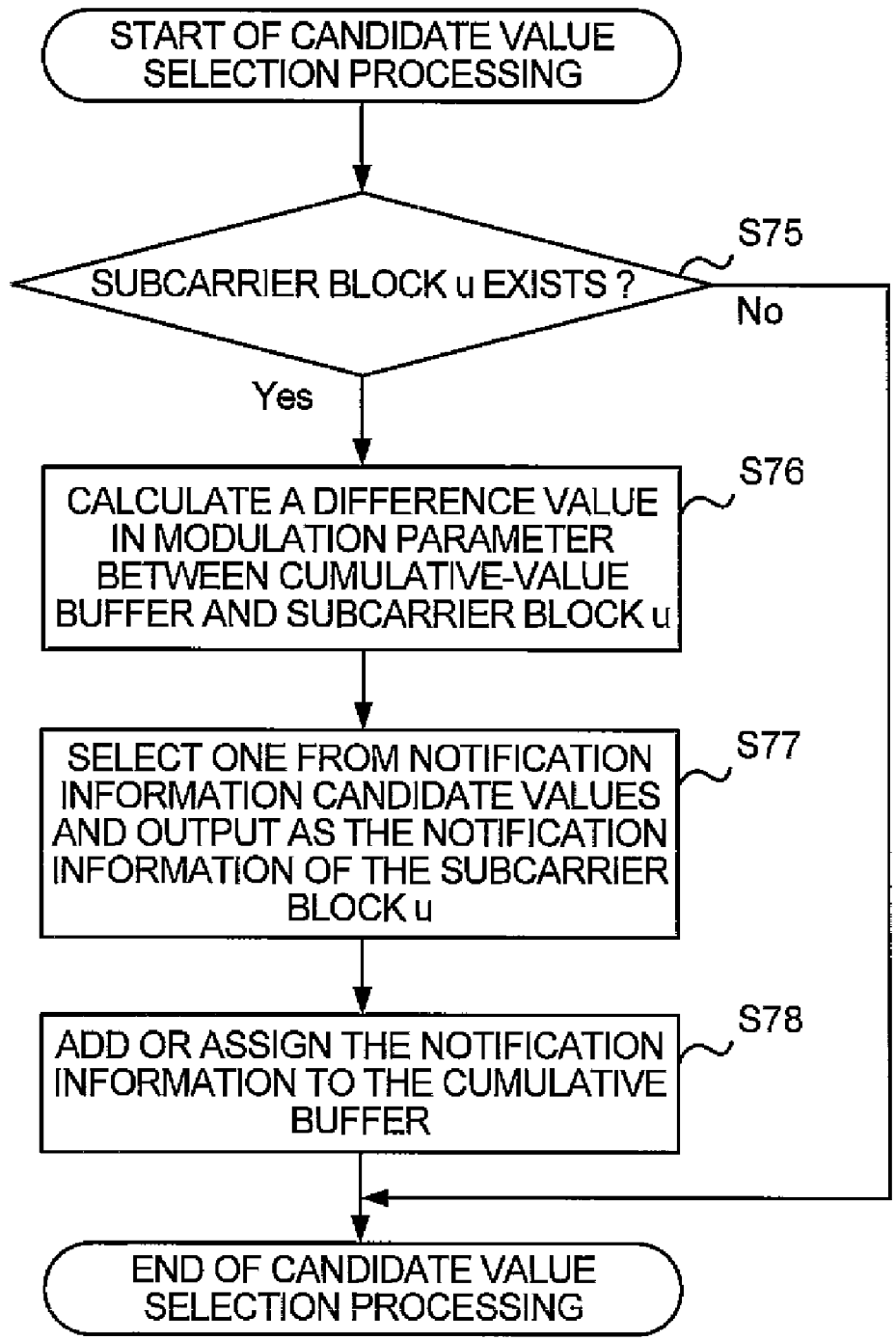
FIG. 23 is a flowchart showing an example of the cumulative value calculation processing in FIG. 22.

FIG. 21 is a flowchart showing an example of the operation of the notification information generating apparatus when a plurality of subcarrier blocks (starting-point channels) is provided as a starting point. FIG. 22 is a flowchart showing an example of the notification information generation processing in FIG. 21, and FIG. 23 is a flowchart showing an example of the candidate value selection processing in FIG. 22. FIGS. 21 to 23 are predicated on that a plurality of starting-point subcarrier blocks is provided at equal intervals, and show an example of the operation for calculating the cumulative value by sequentially adding the notification information of each channel from a starting-point channel near (distance is short between a target subcarrier block and the starting-point subcarrier block) a target channel to generate a reconstruction value to the target channel, and generating the notification information and reconstruction value. The operation of the notification information generating apparatus 400 as shown in FIG. 3 will be described below as an example, but such operation can be implemented in the notification information generating apparatus 480 as shown in FIG. 15. In addition, the operations as shown in FIGS. 21 to 23 are of an example of the operations for generating the notification information shown as an example in FIGS. 19 to 20, and naturally, it is possible to perform operations other than FIGS. 21 to 23 to achieve.

The selecting section 402 receives a selected modulation parameter of each subcarrier block (S60), and repeats the processing of loop 1 shown by steps S61 to S65 for each subcarrier block (S61). s indicates the number of a subcarrier block targeted for the processing. The selecting section 402 detects whether the subcarrier block s is a subcarrier block (starting-point channel) as a starting point (Yes in S62). When the subcarrier block s is not a subcarrier block as a starting point (No in S62), the section 401 finishes loop 1 and shifts to the processing of a subsequent subcarrier block (S65). The selecting section 402 outputs a modulation parameter of the subcarrier block s as the notification information of the subcarrier block s (S63). Next, the section 402 performs the processing for generating the notification information and reconstruction value of another subcarrier block of which the starting point is the subcarrier block s (S64).

The notification information generation processing will be described below. In the notification information generation processing, cumulative values A and B are used as variables to calculate the cumulative value on both sides of a starting-point subcarrier block, and a cumulative-value buffer is used as a temporary variable for calculation. First, the reconstructing section 403 receives the modulation parameter (notification information) of the starting-point subcarrier block from the selecting section 402 to assign to the cumulative values A and B (S66). Next, the reconstructing section 403 repeats the processing of loop 2 shown by steps S67 to S74 for half of the interval between two starting-point subcarrier blocks (S67). The section 40e sets a subcarrier block (target channel) u targeted for generating the notification information and reconstruction value, and the cumulative-value buffer (S68), performs the candidate value selection processing (S69), and acquires the cumulative value A (S70). Steps S68 to S70 are of the processing for shifting the target subcarrier block in ascending order of the number from the starting-point subcarrier block. Steps S71 to S73 are of the processing for shifting the target subcarrier block in descending order of the number from the starting-point subcarrier block, and to perform the same processing as in steps S67 to S70.

In the candidate value selection processing (S69, S72), the selecting section 402 receives the subcarrier block u and cumulative-value buffer from the reconstructing section 403, calculates a difference value (S76) when the subcarrier block u exists (Yes in S75), selects one from candidate values for the notification information based on the difference value, and outputs the notification information to the reconstructing section 403 and the outside (S77). Next, the reconstructing section 403 adds or assigns the notification information (candidate value) notified from the selecting section 402. Either the addition or assignment is performed in the same processing as in steps S24 to S26 of FIG. 6. Herein, a cumulative-value buffer to be calculated is a reconstruction value.

In addition, the notification information and the reconstructed modulation parameter as shown in FIGS. 17 and 18 can be explained by the operation shown as an example in FIGS. 4 and 6, and descriptions thereof are omitted.

Described next is an example where when the notification information of either of the subcarrier blocks existing between two starting-point subcarrier blocks is a non-difference value candidate value, by using the non-difference value candidate value, a starting-point subcarrier block is selected for each of subcarrier blocks that are not the starting point. FIG. 24 shows still another example of the generation result of the notification information and reconstructed modulation parameter in the notification information generating apparatus 400 (or notification information generating apparatus 480) when four subcarrier blocks of subcarrier block numbers 1, 6, 11 and 16 are starting points in generating the notification information.

Figure 25:
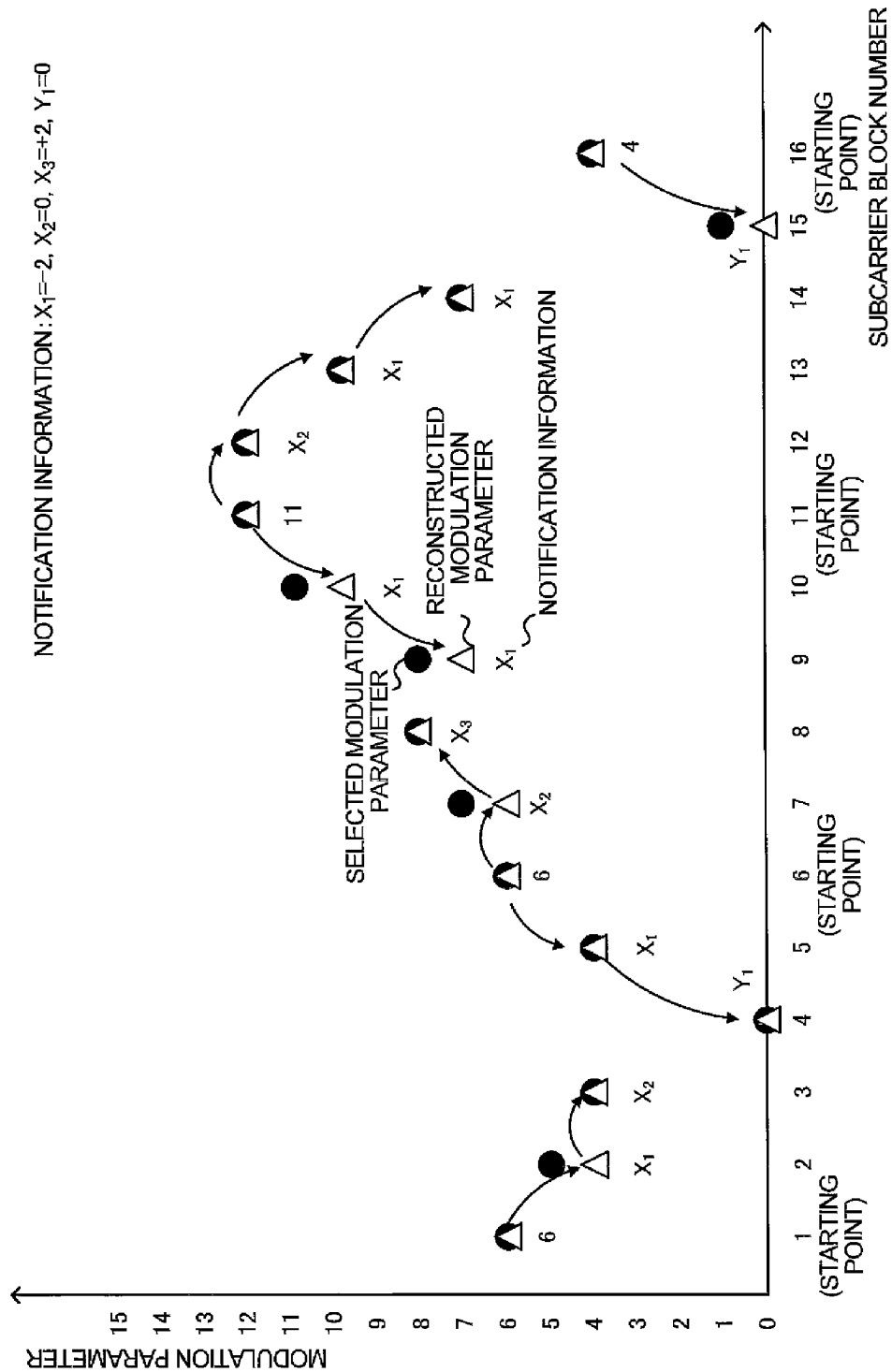
FIG. 25 is a diagram showing a graph plotted with the selected modulation parameters, notification information and reconstructed modulation parameters shown in the example of FIG. 24.

Further, FIG. 25 shows a graph plotted with the selected modulation parameters, notification information and reconstructed modulation parameters shown in the example of FIG. 24. The horizontal axis represents the subcarrier block number, and the vertical axis represents the modulation parameter. The black circle indicates a selected modulation parameter of each subcarrier block input to the notification information generating apparatus, and the white triangle indicates a reconstructed modulation parameter. In addition, each arrow indicates the direction of processing in obtaining a difference value between the cumulative value (reconstruction value) of the notification information of from the starting-point subcarrier block to a subcarrier block immediately before the subcarrier block and the selected modulation parameter of the subcarrier block.

When a plurality of subcarrier blocks (starting-point channels) exists as a starting point, for the notification information about subcarrier blocks except the subcarrier blocks as a starting point, a subcarrier block as a starting point and the processing direction can be selected arbitrarily in obtaining a difference value between the cumulative value of the notification information of from the starting-point subcarrier block to a subcarrier block immediately before the subcarrier block and the selected modulation parameter of the subcarrier block. Herein, one or more subcarrier blocks existing between two starting-point subcarrier blocks where another starting-point subcarrier does not exist are assumed to be "inter-starting-point subcarrier blocks". FIG. 25 shows an example of the case that when a subcarrier block such that a non-difference value candidate value is selected exists among the inter-starting-point subcarrier blocks, the subcarrier block is set as a subcarrier block to be selected as a starting point in obtaining the cumulative value and the difference value and as the boundary of the direction of the processing in each inter-starting-point subcarrier, and the processing is performed in the direction of the arrow as shown in the figure.

In the example of FIG. 25, since non-difference value candidate values are selected in subcarrier block numbers 4 and 15, the processing for calculating the cumulative value and difference value is performed using the fourth subcarrier block as the boundary in inter-starting-point subcarriers between the first and sixth subcarrier blocks as the starting point, while being performed using the fifteenth subcarrier block as the boundary in inter-starting-point subcarriers between the eleventh and sixteenth subcarrier blocks as the starting point.

In addition, a subcarrier block where a non-difference value candidate value is selected does not exist between subcarrier block numbers 6 and 11 as the starting point, and in such a case, for example, the center is used as the boundary as shown in the figure.

Further, when a plurality of subcarrier blocks where a non-difference value candidate value is selected exists between two starting-point subcarrier blocks, for example, there are methods that a subcarrier block nearest the center is used as the boundary, and that a subcarrier with the poorest (lowest) value selected is used as the boundary. The reconstructing section determines a channel to add the notification information to the cumulative value in generating the reconstruction value of each channel, based on positions of a plurality of starting-point subcarrier blocks, and a position of a channel where a non-difference value candidate value is selected as the notification information. Further, at this point, the reconstructing section also determines the processing direction (addition direction) to add the notification information to the cumulative value.

The operations of the notification information generating apparatus as shown in FIGS. 24 and 25 are capable of being implemented by applying the operations as shown in FIGS. 21 to 23, for example. Although the processing is performed using the center between the starting-point subcarriers as the boundary in FIG. 22, it is possible to achieve the operations by separately repeating the processing loop of steps S68 to S70 and the processing loop of steps S71 to S73 and setting the number of repetitions for each loop. Alternately, the specific operation may be another operation other than the above-mentioned operation.

Described next is a method of setting a starting-point channel (subcarrier block as a starting point). Further, the examples as shown in FIGS. 18, 20 and 25 are descried based on the premise that a starting-point channel is beforehand sets but it is also possible to vary the number of starting-point channels, and arrangement interval to arrange the starting-point channels.

The number of starting-point channels and arrangement interval are capable of being determined using one or more of the channel interval (of all the channels) a delay dispersion value of the propagation path obtained from the reception state, and a variation width in Doppler frequency or channel quality information among channels. For example, in OFDM, when the channel interval is large or the delay dispersion value is large, a variation (fluctuation in channel) in the frequency direction is large. Therefore, by properly controlling the number of starting-point channels (to notify the complete channel quality information) and the interval corresponding to the variation in the frequency direction, it is possible to generate the notification information with high accuracy and high efficiency.

Further, the notification information table is capable of storing candidate values for the notification information determined corresponding to the number of starting-point channels and the arrangement interval of the starting-point channels. Accordingly, the notification information generating apparatus changes the candidate values for the notification information according to changes in the number of starting-point channels and arrangement interval to store in the notification information table, and is thereby capable of generating the notification information and reconstruction value with higher accuracy.

Furthermore, the notification information table is capable of increasing the number of candidate values for the notification information to store based on either the relationship inversely proportional to the number of a plurality of starting-point channels or the relationship proportional to the arrangement interval of the plurality of starting-point channels. More specifically, as the number of starting-point channels decreases or the arrangement interval of the starting-point channels increases, the notification information table increases the number of candidate values (the number of bits for use in the notification information) of the notification information. Thus, by increasing the number of bits of the candidate value as the number of starting-point channels decreases or the arrangement interval of the starting-point channels increases, or inversely, by decreasing the number of bits of the candidate value as the number of starting-point channels increases or the arrangement interval of the starting-point channels decreases, it is possible to perform control so as to keep the total number of bits required to transmit the notification information at a (almost) constant value. Further, since the possibility of increasing the variation width (fluctuation of the channel quality information) between starting-point channels is higher as the arrangement interval of the starting-point channels increases, it is also made possible to hold the accuracy by using the higher number of bits to increase the number of candidate values.

Thus, according to this Embodiment, when a difference in modulation parameter is notified to the communicating party as the channel quality information, by providing a plurality of subcarrier blocks used as a starting point in difference value calculation, as compared with the case of a single starting-point subcarrier, it is possible to improve accuracy of the reconstructed channel quality information.

Further, by providing a plurality of subcarrier blocks used as a starting point, even when an error occurs in part of the notification information in receiving the notification information, it is possible to reduce the range of subcarrier blocks on which erroneous reconstruction values are generated based on the erroneous notification information.

Furthermore, in this Embodiment, in the communication apparatuses on the transmitting and receiving sides, by beforehand sharing the information of the starting-point subcarrier block, and determining the processing method of the inter-starting-point subcarrier, the communication apparatuses on the transmitting and receiving sides eliminate the need of notifying the information about the direction of the processing for generating the reconstruction value. For example, in generating the notification information about an inter-starting-point subcarrier block, when a difference value is obtained between the cumulative value of the notification information from the starting-point subcarrier block to a subcarrier block immediately before the subcarrier block and the selected modulation parameter in the subcarrier block, in the case of performing the sequential processing in the predetermined direction as the direction of the processing using the starting-point subcarrier block as shown in FIG. 18, selecting the nearest starting-point subcarrier block in each subcarrier as shown in FIG. 20, using as a reference a subcarrier block where a non-difference value candidate value is selected as shown in FIG. 25, or the like, since the processing direction can be determined uniquely, without notifying the information about the starting-point subcarrier and the direction of the processing in each subcarrier block, the reconstruction can be performed on the side that receives the notification information.

In addition, each of the above-mentioned Embodiments describes the case where the notification information table includes the difference-value information and non-difference value information, but the invention is applicable to the case of including only the difference-value information. In this case, the operation of selecting the non-difference value information is not performed in each of the above-mentioned Embodiments.

As described above, according to preferred Embodiments according to the invention, when the channel quality information is notified using the difference, by selecting a difference value or a value (non-difference value candidate value) indicating predetermined channel quality to notify, it is possible to improve accuracy of the channel quality information reconstructed based on the difference. Further, by generating the notification information using the difference (at least one of the difference-value information and the non-difference value information), it is possible to suppress the information amount to notify. By suppressing the information amount to notify, it is possible to enhance system throughput, and to reduce power consumption.

EMBODIMENT 7

Embodiment 7 describes as an example the case of using modulation parameter information as the channel quality information.

FIG. 1 is a functional block diagram showing a configuration example of a base station apparatus 100 in Embodiment 7 according to the invention. Further, FIG. 2 is a functional block diagram showing a configuration example of a terminal apparatus 200 in Embodiment 7 according to the invention. Embodiment 7 illustrates a case where the base station apparatus 100 notifies the information about a modulation parameter used in adaptive modulation of downlink transmission data as the downlink notification information, and the terminal apparatus 200 notifies the information about a modulation parameter for subsequent downlink transmission data as the uplink notification information.

The base station apparatus 100 has an error correcting coding section 101, modulation section 102, multiplex section 103, inverse Fourier transform section 104, radio transmission section 105, antenna sections 106 and 107, radio reception section 108, demultiplex section 109, demodulation section 110, error correcting decoding section 111, notification information reconstructing section 300, notification information generating apparatus 400, and adaptive modulation control section 112.

The terminal apparatus 200 has antenna sections 201 and 214, radio reception section 202, Fourier transform section 203, demultiplex section 204, propagation path estimating section 205, modulation parameter selecting section 206, notification information generating apparatus 400, notification information reconstructing section 300, adaptive demodulation control section 207, demodulation section 208, error correcting decoding section 209, error correcting coding section 210, modulation section 211, multiplex section 212 and radio transmission section 213.

Described first are downlink transmission procedures in the base station apparatus as shown in FIG. 1. The error correcting coding section 101 receives downlink transmission data and adaptive modulation control information output from the adaptive modulation control section 112, and based on the input adaptive modulation control information, performs error correcting coding on the downlink transmission data to output a coded data sequence.

The modulation section 102 receives the coded data sequence output from the error correcting coding section 101 and the adaptive modulation control information output from the adaptive modulation control section 112, and based on the input adaptive modulation control information, modulates the coded data sequence to output a modulated symbol sequence.

The multiplex section 103 receives the modulated symbol sequence output from the modulation section 102, downlink notification information generated in the notification information generating apparatus 400 and a pilot signal to multiplex, and outputs an OFDM frequency signal. In addition, herein, the pilot signal is a known signal used in estimating propagation path conditions in the terminal apparatus 200. The base station apparatus 100 preferably stores a beforehand generated pilot signal in memory, and inputs the pilot signal stored in the memory to the multiplex section 103. However, the base station apparatus 100 may have another configuration for generating the pilot signal whenever the signal is required without storing the pilot signal in the memory, and the like.

The inverse Fourier transform section 104 receives the OFDM frequency signal output from the multiplex section 103, and performs frequency/time transform (inverse Fourier transform) on the signal to output an OFDM time signal.

The radio transmission section 105 receives the OFDM time signal output from the inverse Fourier transform section 104, adds a guard interval to the signal, performs digital/analog conversion and upconverting to the radio frequency to transform to a radio signal, and transmits the signal via the antenna section 106.

Described next are downlink reception procedures in the terminal apparatus 200 as shown in FIG. 2. The radio reception section 202 receives the downlink radio signal via the antenna section 201, performs downconverting from the radio frequency and analog/digital conversion, and further removes the guard interval to output an OFDM time signal.

The Fourier transform section 203 receives the OFDM time signal output from the radio reception section 202, and performs time/frequency transform (Fourier transform) on the signal to output an OFDM frequency signal.

The propagation path estimating section 205 receives the pilot signal output from the demultiplex section 204, performs estimation of propagation path conditions from the input pilot signal, and outputs an estimation result of propagation path conditions.

In addition, in the case of performing propagation path estimation using a downlink reception data signal, instead of a pilot signal, the propagation path estimating section receives a downlink reception data signal, or demodulation result or error correcting decoding result of the downlink reception data signal. In this case, the need is eliminated for the pilot signal multiplexing processing in the multiplex section 103 in the base station apparatus 100 and the demultiplex processing of the pilot signal in the demultiplex section 204 in the terminal apparatus 200. Further, in the case of performing propagation path estimation using both of the pilot signal and the downlink reception data signal, as well as the pilot signal, the propagation path estimating section receives a downlink reception data signal, or demodulation result or error correcting decoding result of the downlink reception data signal. The present invention is applicable to such configurations.

The modulation parameter selecting section 206 receives the estimation result of propagation path conditions output from the propagation path estimating section 205, selects a subsequent downlink modulation parameter on a subcarrier block basis based on the input estimation result of propagation path conditions, and outputs information (modulation parameter information) about the selected modulation parameter. The modulation parameter selecting section 206 applies the estimation result of propagation path conditions to the beforehand determined correspondence relationship between the modulation parameter and propagation path conditions, and thereby selects a modulation parameter. For example, the section 206 holds modulation parameters and ranges of propagation path conditions corresponding to the parameters as a table, and is capable of determining a modulation parameter to select by comparing the table with the estimation result of propagation path conditions.

The notification information generating apparatus 400 receives the modulation parameter output from the modulation parameter selecting section 206, and based on the input modulation parameter, generates the uplink notification information to output. The processing in the notification information generating apparatus 400 will be described later with reference to FIGS. 3 and 28.

The notification information reconstructing section 300 receives the downlnk notification information output from the demultiplex section 204, and reconstructs the information about the modulation parameter from the input downlink notification information to output. In addition, the processing in the notification information reconstructing section 300 will be described later with reference to FIGS. 5 and 29.

The adaptive demodulation control section 207 receives the reconstructed information (modulation parameter information) about the modulation parameter output from the notification information reconstructing section 300, and based on the input information about the modulation parameter, generates the adaptive demodulation control information for controlling the demodulation processing and error correcting decoding processing to output.

The demodulation section 208 receives the downlink reception data signal output from the demultiplex section 204 and the adaptive demodulation control information output from the adaptive demodulation control section 207, and based on the input adaptive demodulation control information, demodulates the downlink reception data signal to output a demodulated data sequence.

The error correcting decoding section 209 receives the demodulated data sequence output from the demodulation section 208 and the adaptive demodulation control information output from the adaptive demodulation control section 207, performs error correcting decoding on the demodulated data sequence based on the input adaptive demodulation control information, and outputs downlink reception data. In addition, as preprocessing of demodulation, such a configuration may be adopted that propagation path compensation processing is performed using the estimation result of propagation path conditions estimated in the propagation path estimating section 205, and that the estimation result of propagation path conditions is referred to in error correcting decoding.

Described next are uplink transmission procedures in the terminal apparatus 200 as shown in FIG. 2. The error correcting coding section 210 receives uplink transmission data, and performs error correcting coding on the data with a predetermined coding rate to output a coded data sequence.

The modulation section 211 receives the coded data sequence output from the error correcting coding section 210, modulates the input coded data sequence with a predetermined modulation scheme, and outputs a modulated symbol sequence.

The multiplex section 212 receives the modulated symbol sequence output from the modulation section 211, and uplink notification information output from the notification information generating apparatus 400, multiplexes the input modulated symbol sequence and the uplink notification information, and outputs a transmission signal.

The radio transmission section 213 receives the transmission signal output from the multiplex section 212, performs digital/analog conversion and upconverting to the radio frequency to transform to a radio signal, and transmits the signal via the antenna section 214.

Described next are uplink reception procedures in the base station apparatus 100 as shown in FIG. 1. The radio reception section 108 receives the uplink radio signal via the antenna section 107, performs downconverting from the radio frequency and analog/digital conversion, and outputs a reception signal.

The demultiplex section 109 receives the reception signal output from the radio reception section 108, and demultiplexes the input reception signal into an uplink reception data signal and uplink notification information to output. In addition, such a configuration may be adopted that a pilot signal is beforehand multiplexed in the multiplex section 212 in the terminal apparatus 200, the pilot signal is demultiplexed in the demultiplex section 109 in the base station apparatus 100, and that propagation path compensation is performed for the uplink reception data signal and uplink notification information using the demultiplexed pilot signal.

The demodulation section 110 receives the uplink reception data signal output from the demultiplex section 109, demodulates the input uplink reception data signal with a predetermined modulation scheme, and outputs a demodulated data sequence.

The error correcting decoding section 111 receives the demodulated data sequence output from the demodulation section 110, performs error correcting decoding on the input demodulated data sequence with a predetermined channel coding rate, and outputs uplink reception data.

The notification information reconstructing section 300 receives the uplink notification information output from the demultiplex section 109, and reconstructs the information about the modulation parameter from the input uplink notification information to output. In addition, the processing in the notification information reconstructing section 300 will be described later with reference to FIG. 5.

The notification information generating apparatus 400 receives the information about the modulation parameter output from the notification information reconstructing section 300, and based on the input information about the modulation parameter, generates the downlink notification information to output, while reconstructing the information about the modulation parameter based on the generated downlink notification information to output.

In addition, it is not necessary that the uplink notification information and the information about a modulation parameter output from the notification information reconstructing section 300 in the base station apparatus is always in agreement with the downlink notification information and information about the modulation parameter output from the notification information generating apparatus 400 in the base station apparatus 100. The base station apparatus 100 may change the modulation parameter. The apparatus 100 may have a structural element that selects (changes) the modulation parameter between the notification information reconstructing section 300 and the notification information generating apparatus 400, which is not shown in FIG. 1. Further, the notification information generating apparatus 400 in the base station apparatus 100 is capable of being achieved by the same functional block configuration as that of the notification information generating apparatus 400 in the terminal apparatus 200 of FIG. 2. The processing in the notification information generating apparatus 400 will be described later with reference to FIG. 3.

The adaptive modulation control section 112 receives the information about the modulation parameter output from the notification information generating apparatus 400, and generates an adaptive modulation control signal to control the modulation processing and error correcting coding processing to output.

In addition, the above-mentioned explanation describes the configuration where the base station apparatus 100 also has the notification information generating apparatus 400, but in the case where the base station apparatus 100 performs modulation and error correcting coding on downlink transmission data using the modulation parameter reconstructed by the notification information reconstructing section 300 without modification, the base station apparatus 100 does not always need to have the notification information generating apparatus 400. In this case, the uplink notification information output from the demultiplex section 109 is input not only to the notification information reconstructing section 300, but also to the multiplex section 103 as the downlink notification information without modification. Further, instead of the information about a modulation parameter output from the notification information generating apparatus 400, the adaptive modulation control section 112 receives the information about a modulation parameter output from the notification information reconstructing section 300.

FIG. 3 shows an example of a functional block diagram of the notification information generating apparatus 400 in the terminal apparatus 200 in FIG. 2. The notification information generating apparatus 400 has a notification information table 401, selecting section (notification information selecting section) 402, and reconstructing section (notification information reconstructing section) 403.

The notification information table 401 is a storage area for storing candidate values selectable as the notification information. The candidate values include difference-value candidate values each indicating a difference between two pieces of channel quality with a sign, and absolute-value candidate values each indicating an absolute value of the difference between two pieces of channel quality information. The notification information table 401 holds a table comprised of a plurality of values (difference-value candidate values) $X_k$ (k=1~M, M is a natural number) indicating differences between modulation parameters, and values (absolute-value candidate values) $Y_j$ (j=1~N, N is a natural number) indicating specific modulation parameters that are not the difference (hereinafter, the combination of $X_k$ and $Y_j$ is described as the notification information candidate values), which are selectable as the notification information, and outputs these notification information candidate values. The case may be adopted where the value is larger than an absolute value of the difference-value candidate value.

Figure 28:
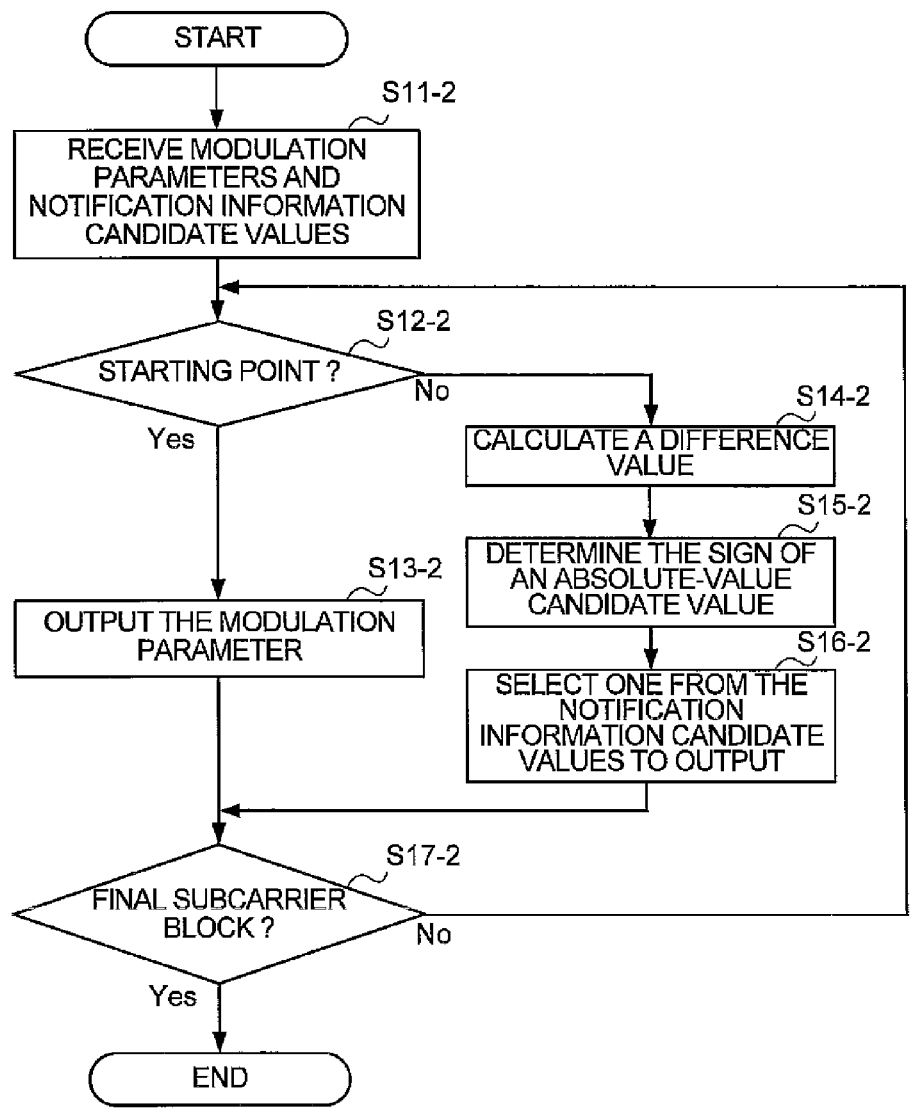
FIG. 28 is a flowchart showing an example of the operation of generating the notification information in Embodiment 7.

The selecting section 402 receives the modulation parameter (an example of the channel quality information) on a subcarrier block basis selected in the modulation parameter selecting section 206 in FIG. 2, notification information candidate values output from the notification information table, and a cumulative value (reconstruction value) output from the reconstructing section 403, and generates the notification information. The selecting section 402 beforehand holds information about a processing unit in notification information generation including a subcarrier block number used as a starting point in generating the notification information, and generates the notification information using the subcarrier block to start the processing as a starting point. The selecting section 402 determines whether a subcarrier block is a starting point, generates the notification information sequentially according to the procedures as shown in FIG. 28 described later, and outputs the generated notification information. Further, the generated notification information is output to the reconstructing section 403.

The reconstructing section 403 receives the notification information output from the selecting section 402, reconstructs the modulation parameter based on the input notification information (last notification information), and outputs the reconstructed modulation parameter. The reconstructing section 403 generates a cumulative value (reconstruction value) based on the last notification information, and outputs the generated cumulative value to the selecting section 402. The cumulative value (reconstruction value) is a value generated by the reconstructing section 403 based on the input notification information (last notification information), and may be a reconstruction value because of including the case of a value of input notification information or a predetermined value, as well as a cumulative value obtained by accumulating a plurality of input notification information. In the description of the invention, the reconstruction value is explained as a value obtained by reconstructing the channel quality information using the notification information. The reconstructing section 403 may store (hold) a plurality of input last notification information without modification, but by storing as the cumulative value, the memory capacity can be suppressed. Details of the reconstructing section 403 will be described later with reference to FIGS. 5 and 29.

Figure 26:
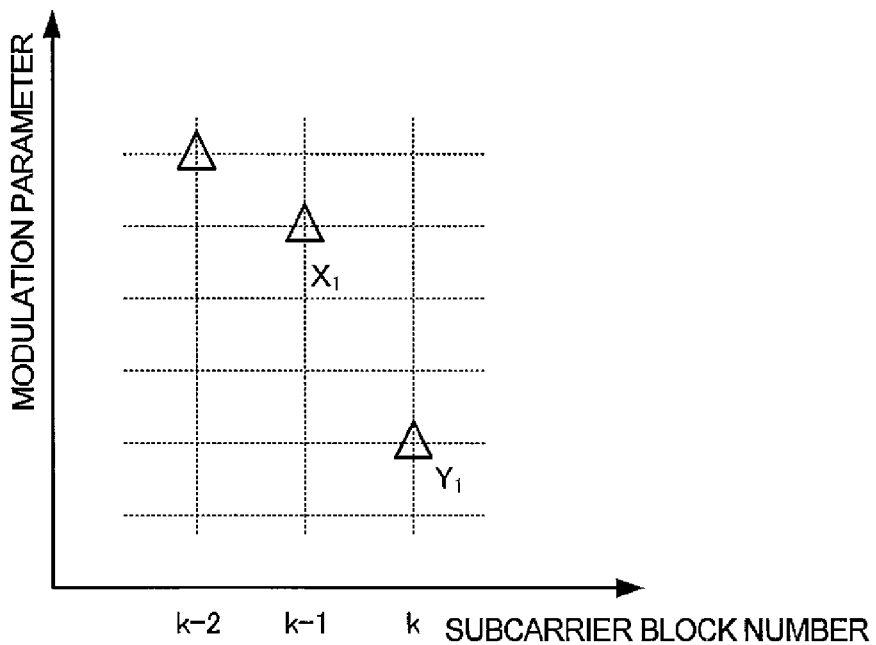
FIG. 26 is a diagram showing an example of a method of determining the sign of an absolute-value candidate value.
Figure 27:
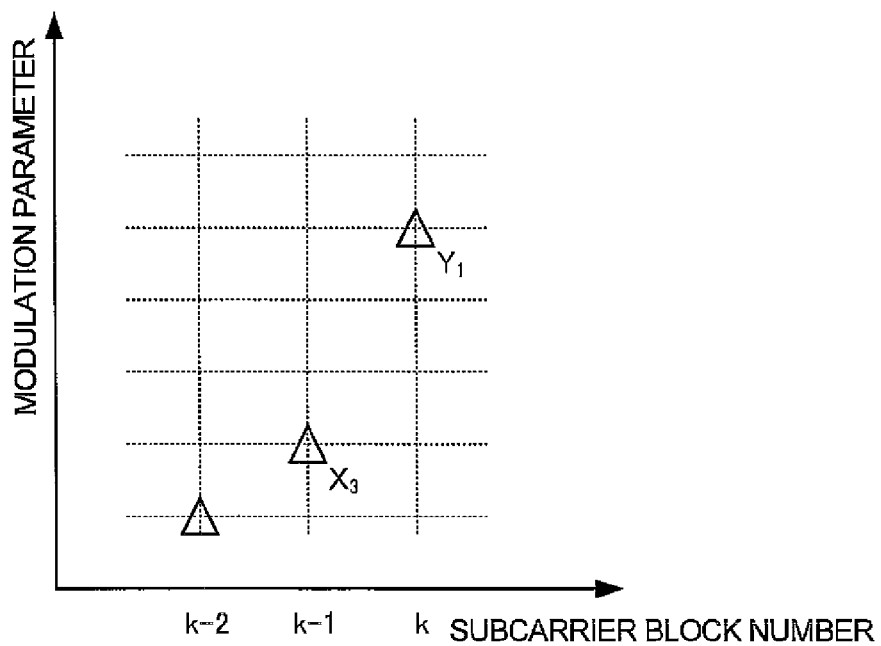
FIG. 27 is a diagram showing another example of the method of determining the sign of an absolute-value candidate value.

Further, when the last notification information is an absolute-value candidate value, the reconstructing section 403 first determines a sign of the absolute-value candidate value, and calculates the cumulative value based on the determined sign. As a method of determining the sign, there are (1) a method of using a sign of the last difference value (referred to as a "first sign determining method"), (2) another method of determining based on the cumulative value (cumulative value under calculation) being calculated (referred to as a "second sign determining method"), and the like. FIGS. 26 and 27 are diagrams showing examples of the method of determining a sign of an absolute-value candidate value. FIGS. 26 and 27 show two examples of the first sign determining method for determining a sign of notification information of a subcarrier block number k using as an example the case where difference-value candidate value $X_1=-1$, difference-value candidate value $X_2=0$, difference-value candidate value $X_3=-1$, and absolute-value candidate value $Y_1=-3$. In FIG. 26, since the notification information immediately before the absolute-value candidate value $Y_1$ is the difference-value candidate value $X_1$ being "−1", the absolute-value candidate value $Y_1$ is set for the difference value of "−3" using the same sign as that of the difference-value candidate value $X_1$. Further, in FIG. 27, since the notification information immediately before the absolute-value candidate value $Y_1$ is the difference-value candidate value $X_3$ being "+1", the absolute-value candidate value $Y_1$ is set for the difference value of "+3" using the same sign as that of the difference-value candidate value $X_3$.

Further, as the second sign determining method for determining a sign based on a value of the cumulative value, for example, there are a method of using a positive sign when the cumulative value is less than a predetermined value, while using the same sign (the sign used in the last notification information) as in the last notification information when the cumulative value is the predetermine value or more, and the like. The method of determining a sign is assumed to be beforehand determined and notified to the communicating party. Further, it is assumed that the method used in the reconstructing section 403 is in accordance with a method used in the selecting section 402 described later with reference to FIG. 28.

Next, the operation of generating the notification information will be described with reference to FIG. 28. FIG. 28 is a flowchart showing an example of the operation of generating the notification information in this Embodiment.

The selecting section 402 receives modulation parameters and notification information candidate values (S11-2). FIG. 28 shows an example of receiving a plurality of modulation parameters respectively corresponding to a plurality of subcarrier blocks included in a communication unit, and sequentially processing each subcarrier block. The selecting section 402 first determines whether a subcarrier block is a starting point (S12-2), and for a subcarrier block used as a starting point in generating the notification information (Yes in S12-2), outputs the modulation parameter for the subcarrier block as the notification information without modification (S13-2). For a subcarrier block being not used as a starting point (No in S12-2), the selecting section 402 calculates a difference value between the modulation parameter for the subcarrier block and the cumulative value (reconstruction value) input from the reconstructing section 403 (S14-2), determines a sign of an absolute-value candidate value, and further determines a value indicated by the absolute-value candidate value (S15-2). Based on the calculated difference value, the section 402 selects one from the notification information candidate values including the difference-value candidate value and absolute-value candidate value with the sign determined to output as the notification information (S16-2).

More specifically, for each subcarrier block being not used as a starting point, the selecting section 402 first determines a sign of the absolute-value candidate value. The sign is determined using either of two methods described in the reconstructing section 403 i.e. either the first or the second sign determining method. The selecting section 402 selects a notification information candidate value nearest the calculated difference value from among difference-value candidate values and the absolute-value candidate value with the sign determined. Alternately, the selecting section 402 may calculate provisional reconstructed modulation parameters (reconstructed channel quality information) by adding each notification information candidate value to the reconstruction value reconstructed by the reconstructing section 403 on the last channel, and select an added notification information candidate value nearest the selected modulation parameter among provisional reconstructed modulation parameters as a candidate value for the notification information.

The selecting section 402 repeats the processing of step S12-2 and subsequent steps until the final subcarrier block is detected (S17-2).

In addition, the reconstructing section 403 in the notification information generating apparatus 400 has the same functional block configuration as that of the notification information reconstructing section 300 for the uplink notification information in the base station apparatus 100 as shown in FIG. 1 and the notification information reconstructing section 300 for the downlink notification information in the terminal apparatus 200 as shown in FIG. 2. In the description of the invention, to simplify the explanation, descriptions are made using different reference numerals and names for the notification information reconstructing section 300 and reconstructing section 403.

FIG. 5 shows an example of the functional block diagram of the notification information reconstructing section 300 of this Embodiment. The notification information reconstructing section 300 has a reconstruction calculating section 301 and storing section 302. The reconstructing section 403 in FIG. 3 also has the same configuration as that of the notification information reconstructing section 300, and therefore, also has the reconstruction calculating section 301 and storing section 302.

The reconstruction calculating section 301 receives the notification information and the cumulative value output from the storing section 302, reconstructs a modulation parameter (an example of the channel quality information) based on the notification information and the cumulative value, and outputs the reconstructed modulation parameter. Further, the reconstruction calculating section 301 outputs the information to be held in the storing section 302 as the storage information. Furthermore, the reconstruction calculating section 301 beforehand holds information about a processing unit for notification information generation including a subcarrier block number used as a starting point in generating the notification information. The storing section 302 stores the storage information output from the reconstruction calculating section 301, and based on the stored storage information, outputs a cumulative value.

Figure 29:
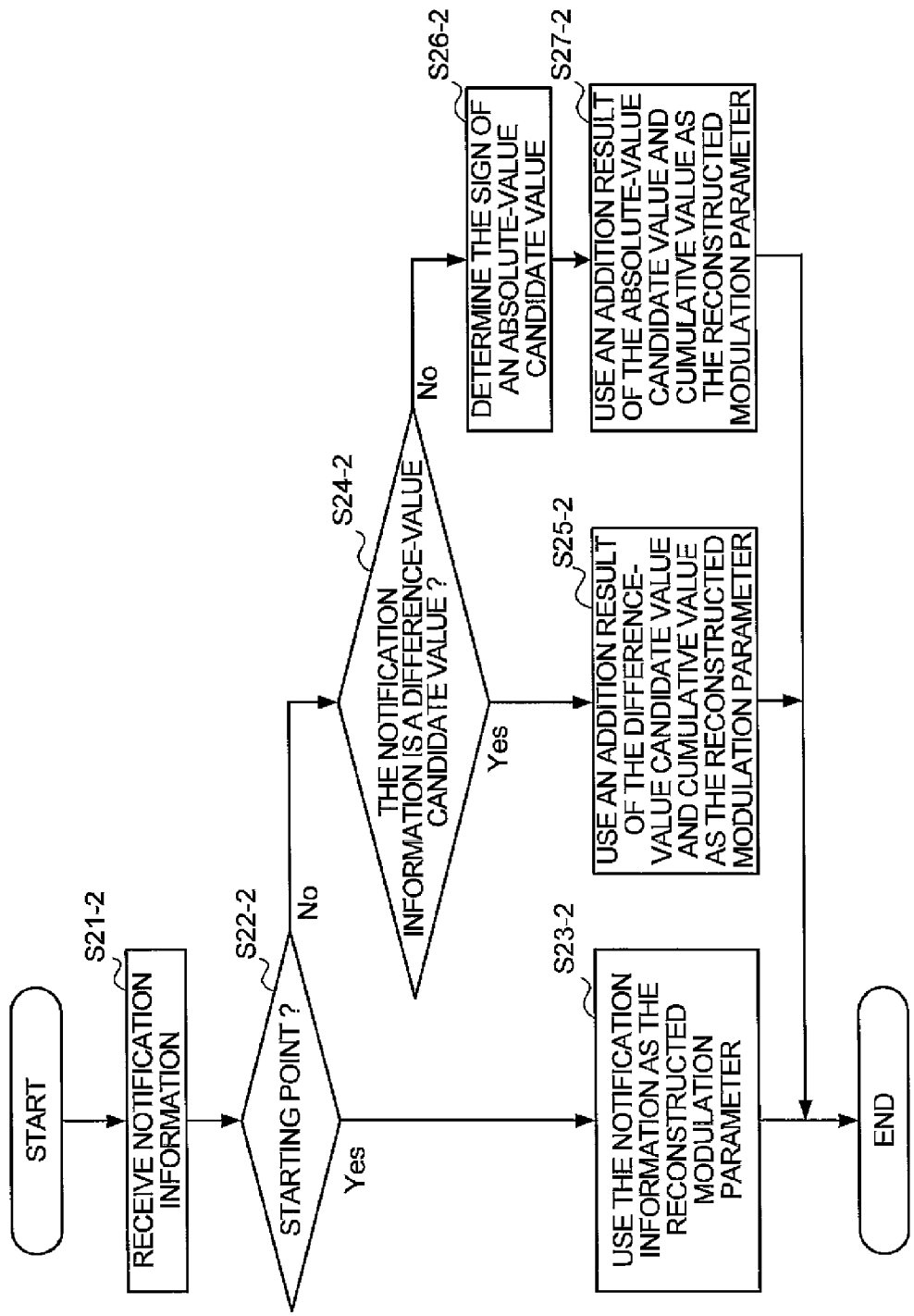
FIG. 29 is a flowchart showing an example of the operation of reconstructing the notification information in Embodiment 7.

Referring to FIG. 29, described next are details of the operation of reconstructing the notification information in the notification information reconstructing section 300. FIG. 29 is a flowchart showing an example of the operation of reconstructing the notification information in this Embodiment.

The reconstruction calculating section 301 receives the notification information (S21-2), and determines whether the subcarrier block is a starting point (S22-2). For a subcarrier block used as a starting point in generating the notification information (Yes in S22-2), the reconstruction calculating section 301 outputs the notification information about the subcarrier block as the reconstructed modulation parameter without modification, while outputting the notification information to the storing section 302 as the storage information (S23-2). For a subcarrier block being not used as a starting point, when the notification information about the subcarrier block is a difference-value candidate value $X_k$ (Yes in S24), the reconstruction calculating section 301 adds the input notification information (difference-value candidate value $X_k$) and the cumulative value input from the storing section 302, and outputs the addition result as the reconstructed modulation parameter, while outputting the addition result to the storing section 302 as the storage information (S25-2).

In step S24-2, when the notification information is not a difference-value candidate value $X_k$ i.e. the notification information is an absolute-value candidate value $Y_j$ (No in S24-2), the reconstruction calculating section 301 determines that the sign of absolute-value candidate value $Y_j$ is the same as the sign of the last notification information (S26-2), adds the input notification information (absolute-value candidate value $Y_j$) and the cumulative value input from the storing section 302 using the determined sign, and outputs the addition result as the reconstructed modulation parameter, while outputting the addition result to the storing section 302 as the storage information (S27-2). Hereinafter, the reconstruction calculating section 301 of the configuration using the first sign determining method is described as a "first-configuration reconstruction calculating section".

Alternately, as another configuration, it is possible to adopt a configuration that when the notification information is the absolute-value candidate value $Y_j$ (No in S24-2), the reconstruction calculating section 301 determines the sign of absolute-value candidate value $Y_j$ based on the cumulative value (reconstructed modulation parameter of a channel immediately before the channel) adds the input notification information (absolute-value candidate value $Y_j$) and the cumulative value input from the storing section 302 using the determined sign, and outputs the addition result as the reconstructed modulation parameter, while outputting the addition result to the storing section 302 as the storage information. More specifically, in step S26-2, the reconstruction calculating section 301 uses the positive sign when the cumulative value is less than a predetermined value, while using the sign of the last notification information when the cumulative value is the predetermined value or more. In other words, it is determined that the sign of the difference-value candidate value is used when the last notification information is the difference-value candidate value, and that the last used sign is used when the last notification information is the absolute-value candidate value. Hereinafter, the reconstruction calculating section 301 of the configuration using the second sign determining method is described as a "second-configuration reconstruction calculating section".

FIG. 30 shows an example of the selected modulation parameter as the input information of the notification information generating apparatus 400, and generation result of the notification information and reconstructed modulation parameter by the notification information generating apparatus 400 in this Embodiment. The selected modulation parameter is selected by the modulation parameter selecting section 206 and output to the notification information generating apparatus 400.

FIG. 30 shows an example where the base station apparatus 100 and terminal apparatus 200 use MCS (Modulation and channel Coding Scheme) comprised of combinations of a modulation scheme and channel coding rate as a modulation parameter using sixteen subcarrier blocks. MCS defines sixteen kinds (information of four bits) of from "0" to "15". Such an example is shown where the notification information table 401 holds a total of four kinds (information of two bits) of notification information candidate values of $X_1 = -1$, $X_2 = -0$ and $X_3 = +1$ as difference-value candidate values and $Y_1 = 3$ as an absolute-value candidate value. Herein, $Y_1$ indicates that the level (absolute value) of the difference value is "3". $X_k$ indicates one of $X_1 = -1$, $X_2 = -0$ and $X_3 = +1$ (k is 1 to 3). FIG. 30 shows an example of the case of using the first-configuration reconstruction calculating section as the reconstruction calculating section 301, where a subcarrier block with subcarrier block number 1 is a starting point in generating the notification information.

In the example of FIG. 30, the selecting section 402 in the generation notification generating apparatus 400 outputs selected modulation parameter "11" as the notification information about the subcarrier block with subcarrier block number 1 without modification. In the notification information on second and subsequent subcarrier blocks, the selecting section 402 obtains a difference value between the cumulative value of the notification information up to a subcarrier block immediately before the subcarrier block and the selected modulation parameter of the subcarrier block, and selects a value nearer the obtained difference value among candidate values for the notification information.

Further, in comparing the obtained difference value with an absolute-value candidate value, the selecting section 402 regards the sign of the absolute-value candidate value as being the same as the sign of the last notification information to compare. Accordingly, the section 402 regards the absolute-value candidate value $Y_1$ as "+3" when the sign of the last notification information is positive, while regarding the absolute-value candidate value $Y_1$ as "−3" when the sign of the last notification information is negative, and compares the absolute-value candidate value with the obtained difference value. Moreover, in calculating the cumulative value, when the notification information is an absolute-value candidate value, the reconstruction calculating section 301 first determines the sign of the notification information, adds the notification information and the cumulative value using the determined sign, and outputs the addition result as a next cumulative value.

An example will be described for generation of the notification information in a subcarrier block with subcarrier block number 4. Since the notification information in a subcarrier block with subcarrier block number 3 is $X_1=-1$ and the sign thereof is negative, $Y_1=3$ in the subcarrier block with subcarrier block number 4 indicates "−3". The selecting section 402 obtains a difference value "−2" between the cumulative value "11" (11+1−1) of the notification information up to the third subcarrier block and the selected modulation parameter "9" in the fourth subcarrier block, and selects $Y_1$ nearer the difference value "−2" as the notification information from among the notification information candidate values.

In addition, when the selecting section 402 selects the notification information, the modulation parameter to be reconstructed may be constrained not to exceed the originally selected modulation parameter.

Described next is $Y_1$ in a subcarrier block with subcarrier block number 5. Since the notification information in the subcarrier block with subcarrier block number 4 is $Y_1=3$ indicating difference value "−3" and the sign is negative, $Y_1=3$ in the subcarrier block with subcarrier block number 5 also indicates "−3".

Figure 31:
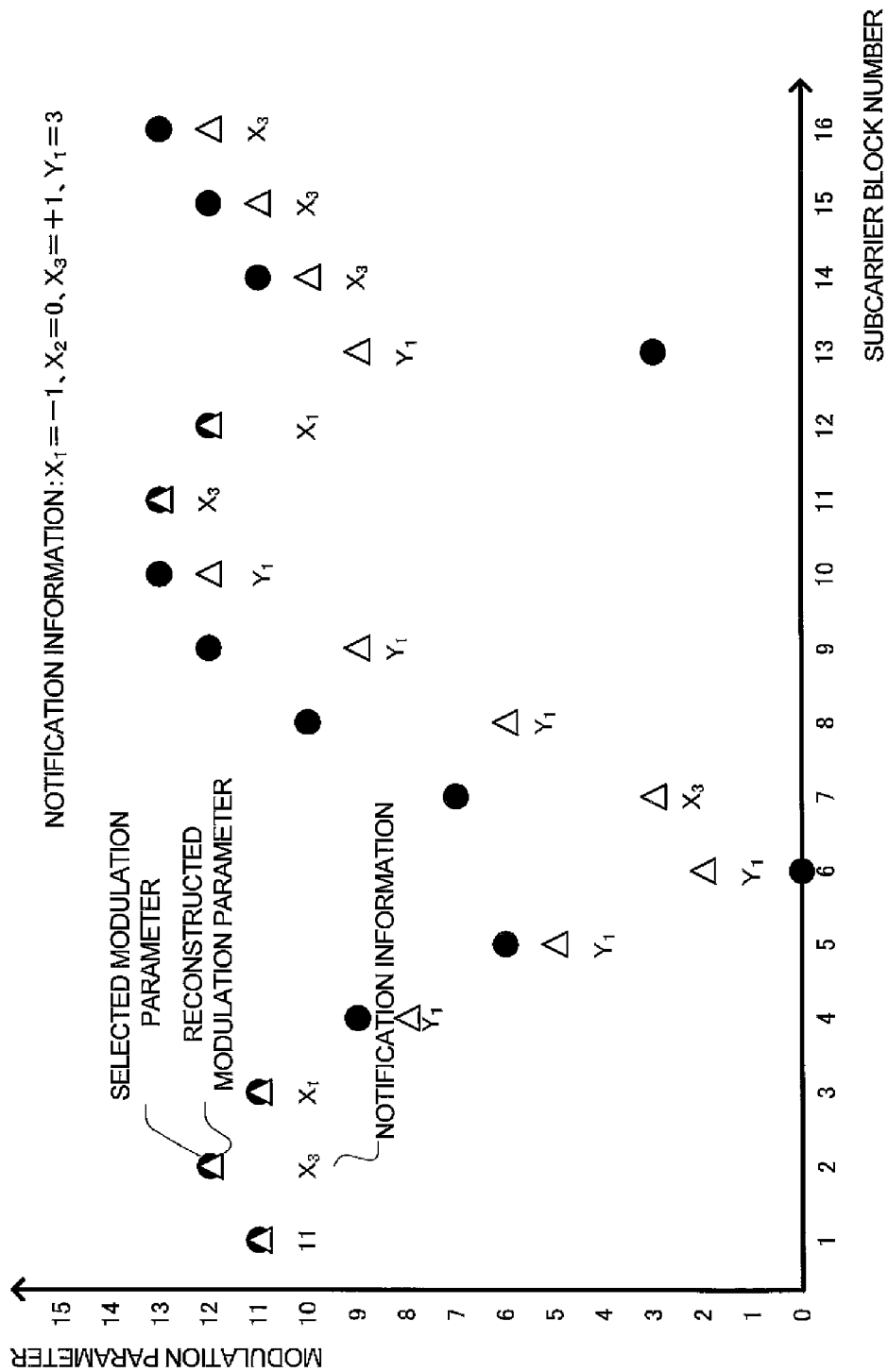
FIG. 31 is a diagram showing a graph plotted with the selected modulation parameters, notification information and reconstructed modulation parameters shown in the example of FIG. 30.

FIG. 31 shows a graph plotted with the selected modulation parameters, notification information and reconstructed modulation parameters shown in the example of FIG. 30. The horizontal axis represents the subcarrier block number, and the vertical axis represents the modulation parameter. The black circle indicates a selected modulation parameter of each subcarrier block input to the notification information generating apparatus, and the white triangle indicates a reconstructed modulation parameter.

FIG. 32 shows another example of the selected modulation parameter as the input information of the notification information generating apparatus 400, and generation result of the notification information and reconstructed modulation parameter by the notification information generating apparatus 400 in this Embodiment.

FIG. 32 shows an example where the number of subcarrier blocks is "16", sixteen kinds (information of four bits) are defined as MCS, and in the notification information table are defined a total of four kinds (information of two bits) of notification information candidate values of $X_1=-1$, $X_2=-0$ and $X_3=+1$ as difference-value candidate values and $Y_1=3$ as an absolute-value candidate value. $X_k$ indicates one of $X_1=-2$, $X_2=-0$ and $X_3=+2$ (k is 1 to 3). Further, FIG. 32 shows the example of using the second-configuration reconstruction calculating section as the reconstruction calculating section 301, and a subcarrier block with subcarrier block number 1 is a starting point in generating the notification information.

The details of procedures of notification information generation in FIG. 32 are basically the same as in the example in FIG. 30. A different portion in FIG. 32 is that the reconstruction calculating section 301 performs the operation by the second-configuration reconstruction calculating section. Then, when $Y_1$ is selected as the notification information, the reconstruction calculating section 301 considers the cumulative value and the sign of the last notification information (uses the second sign determining method) to determine the sign of the absolute-value candidate value, adds the absolute-value candidate value (notification information) to the cumulative value, and uses the addition result as the next cumulative value. The sign of $Y_j$ is made the same as the sign of the immediately-before notification information (last notification information) when the cumulative value is a predetermined value or more, while being made positive when the cumulative value is less than the predetermined value, as in the example of FIG. 30. In addition, in this example, the predetermined value is set for "3".

For example, using as an example determination of notification information of the seventh subcarrier block in FIG. 32, in calculation of the cumulative value of the notification information up to the immediately-before subcarrier block, since the cumulative value of the notification information of the sixth subcarrier block is "2" (11+1−1−3−3−3) and smaller than "3", $Y_1=3$ in the subcarrier block with subcarrier block number 5 indicates "+3". A difference value "5" is obtained between the cumulative value "2" of the notification information up to the sixth subcarrier block and the selected modulation parameter "7" in the seventh subcarrier block, and $Y_1$ nearer the difference value "+5" is selected from among the candidates for the difference value.

Figure 33:
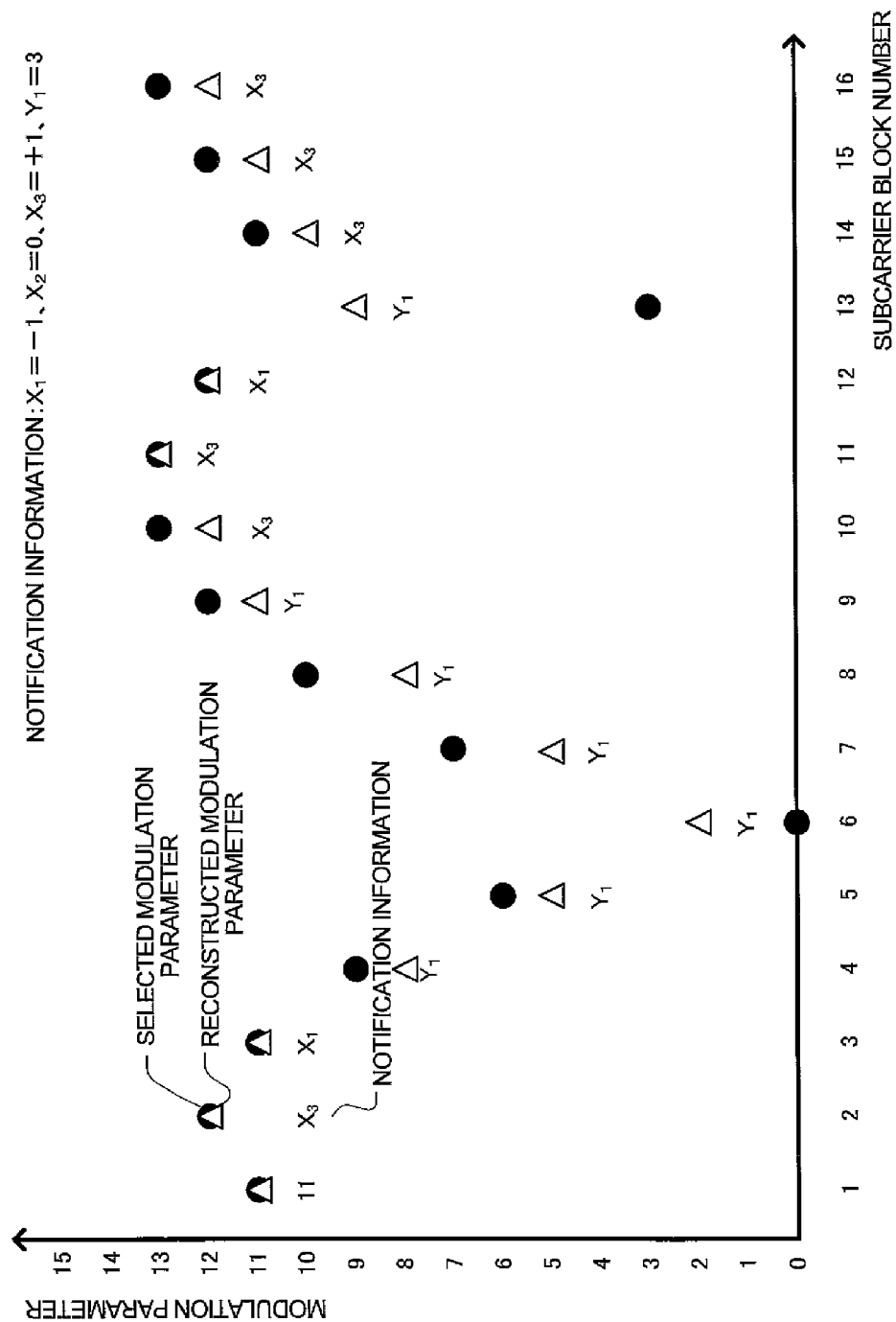
FIG. 33 is a diagram showing a graph plotted with the selected modulation parameters, notification information and reconstructed modulation parameters shown in the example of FIG. 32.

Further, FIG. 33 shows a graph plotted with the selected modulation parameters, notification information and reconstructed modulation parameters shown in the example of FIG. 32. The horizontal axis represents the subcarrier block number, and the vertical axis represents the modulation parameter. The black circle indicates a selected modulation parameter of each subcarrier block input to the notification information generating apparatus, and the white triangle indicates a reconstructed modulation parameter.

In addition, in the above-mentioned first sign determining method, the case is described that the sign of an absolute-value candidate value is matched with the sign of the last notification information, but the first sign determining method is not limited thereto, and is a method for determining the sign at least based on the last notification information. For example, the first sign determining method includes a method of calculating an average value of a plurality of previous notification information, and matching the sign of an absolute-value candidate value with the sign of the average value, and the like. The above-mentioned second sign determining method also adopts the same method when the cumulative value is a predetermined value or more.

Further, the following methods are used as selection of the processing method in above-mentioned two reconstruction calculating sections 301, and the method of determining values to use as the notification information candidate value, difference-value candidate value $X_k$ (k=1~M, M is a natural number) and absolute-value candidate value $Y_j$ (j=1~N, N is a natural number). In addition, the invention is not limited to the methods.

(1) For a selected modulation parameter in each subcarrier block, generation of the notification information is performed in some combinations of the processing method of the reconstruction calculating section 301 and the notification formation candidate value, such notification information is selected that the reconstructed modulation parameter is nearest the selected modulation parameter from among the results, and the used processing method of the reconstruction calculating section 301 and the notification information candidate value are notified together with the generated notification information. It is enough that the used processing method of the reconstruction calculating section 301 and the notification information candidate value is notified to the communicating party as the information about the notification information candidate value at timing at which the notification information candidate value is changed.

(2) A combination of the processing method of the reconstruction calculating section 301 and the notification information candidate value is selected from the variation width of selected modulation parameters between subcarrier blocks, the variation speed (variation pitch in the frequency direction), change amount between values before and after the minimum value of the selected modulation parameter, and the like, and the used processing method of the reconstruction calculating section 301 and the notification information candidate value are notified together with the generated notification information. For example, there is a method for increasing the maximum value of $X_k$ or $Y_1$ in proportion to the variation width of selected modulation parameters between subcarrier blocks and the variation speed while increasing the interval of each $X_k$, setting a threshold in the change amount between values before and after the minimum value of the selected modulation parameter, and when the change amount is less than the threshold, selecting the first configuration as the processing method of the reconstruction calculating section, while selecting the second configuration when the change amount is the threshold or more.

Further, in the examples as shown in FIGS. 30 and 32, the case is described of using one absolute-value candidate value $Y_j$ indicating an absolute value of a difference value, but a plurality of such values may be prepared.

Thus, according to this Embodiment, when a difference of the modulation parameter is notified to the communicating party as the channel quality information, by notifying the notification information with either the difference-value candidate value indicating the difference of the modulation parameter or the absolute-value candidate value selected, it is possible to improve accuracy of the reconstructed channel quality information.

EMBODIMENT 8

Embodiment 8 describes the case of using an estimation result of propagation path conditions as the channel quality information as an example.

FIG. 11 is a functional block diagram showing a configuration example of a base station apparatus 190 in Embodiment 8 according to the invention. Further, FIG. 12 is a functional block diagram showing a configuration example of a terminal apparatus 290 in Embodiment 8 according to the invention. Embodiment 8 illustrates a case where the information about a modulation parameter used in adaptive modulation of downlink transmission data is notified as the downlink notification information, and propagation path conditions estimated from a downlink reception signal is notified as the uplink notification information.

The base station apparatus 190 as shown in FIG. 11 has the same structural elements as those of the base station apparatus 100 as shown in FIG. 1 except the respects that the base station apparatus 190 has a modulation parameter selecting section 191 between the notification information reconstructing section 390 and notification information generating apparatus 400, and that the notification information reconstructing section 390 reconstructs an estimation result of propagation path conditions as the uplink notification information. The modulation parameter selecting section 191 is capable of being actualized by the same circuit configuration as that of the modulation parameter selecting section 206 in the terminal apparatus 200 as shown in FIG. 2. The notification information reconstructing section 390 is different from the notification information reconstructing section 300 as shown in FIG. 1 in the input and output information amounts, but is capable of being actualized by the circuit for performing the same processing.

The terminal apparatus 290 as shown in FIG. 12 has the same configuration as that of the terminal apparatus 200 as shown in FIG. 2 except the respects that the terminal apparatus 290 does not need the modulation parameter selecting section between the propagation path estimating section 205 and the notification information generating apparatus 490, and that the notification information generating apparatus 490 receives as an input signal the estimation result of propagation path conditions output from the propagation path estimating section 205, and generates the notification information related to the estimation result of propagation path conditions as the uplink notification information.

The downlink transmission procedures in the base station apparatus 190 of FIG. 11 are the same as the downlink transmission procedures in the base station apparatus 100 of FIG. 1, and descriptions thereof are omitted.

Described next are the downlink reception procedures in the terminal apparatus 290 of FIG. 12. The operations in the radio reception section 202, Fourier transform section 203, demultiplex section 204, propagation path estimating section 205, adaptive demodulation control section 207, demodulation section 208, error correcting decoding section 209 and notification information reconstructing section 300 are the same as in the downlink reception procedures in the terminal apparatus 200 of FIG. 2.

The notification information generating apparatus 490 receives an estimation result of propagation path conditions output from the propagation path estimating section 205, and based on the input estimation result of propagation path conditions, generates the uplink notification information to output. The processing in the notification information generating apparatus 490 will be described later with reference to FIG. 13.

Further, the uplink transmission procedures in the terminal apparatus 290 of FIG. 12 are the same as the uplink transmission procedures in the terminal apparatus 200 of FIG. 2, and descriptions thereof are omitted.

Described next are the uplink reception procedures in the base station apparatus 190 of FIG. 1. The operations in the radio reception section 108, demultiplex section 109, demodulation section 110, error correcting decoding section 111, and adaptive modulation control section 112 are the same as in the uplink reception procedures in the base station apparatus 100 of FIG. 1.

The notification information reconstructing section 390 receives the uplink notification information output from the demultiplex section 204, and reconstructs the information about the estimation result of downlink propagation path conditions from the input uplink notification information. In addition, the processing in the notification information reconstructing section 390 will be described later with reference to FIG. 14.

The modulation parameter selecting section 191 receives the estimation result of downlink propagation path conditions output from the notification information reconstructing section 390, and selects a subsequent downlink modulation parameter on a subcarrier block basis based on the input estimation result of propagation path conditions, and outputs the selected modulation parameter. In addition, selection of the modulation parameter is performed by applying the estimation result of propagation path conditions to the beforehand determined correspondence relationship between the modulation parameter and propagation path conditions. For example, the section 191 holds modulation parameters and ranges of propagation path conditions corresponding to the parameters as a table, and is capable of determining a modulation parameter to select by comparing the table with the estimation result of propagation path conditions.

The notification information generating apparatus 400 receives the information about the modulation parameter output from the modulation parameter selecting section 191, and based on the input information about the modulation parameter, generates the downlink notification information to output, while based on the downlink notification information, reconstructing the information about the modulation parameter to output. Further, the notification information generating apparatus 400 is capable of being actualized by the same functional block configuration as in the notification information generating apparatus 400 as shown in FIG. 3.

FIG. 13 shows an example of a functional block diagram of the notification information generating apparatus 490 in the terminal apparatus 290 in FIG. 12. A notification information table 491 is a storage area for storing candidate values selectable as the notification information. The candidate values include difference-value candidate values each indicating a difference between two pieces of channel quality information using the sign, and absolute-value candidate values each indicating an absolute value of the difference between two pieces of channel quality information. The notification information table 491 holds a table comprised of a plurality of values (difference-value candidate values) $X'_k$ (k=1~M, M is a natural number) indicating differences between estimation results of propagation path conditions, and absolute-value candidate values $Y'_j$ (j=1~N, N is a natural number) each indicating an absolute value of the difference in the estimation result of propagation path conditions (hereinafter, the combination of $X_k$ and $Y_j$ is described as the notification information candidate values), which are selectable as the notification information, and outputs these notification information candidate values.

The selecting section 492 receives the estimation result of propagation path conditions on a subcarrier block basis estimated in the propagation path estimating section 205 in FIG. 12, notification information candidate values output from the notification information table 491, and a cumulative value output from the reconstructing section 493, and generates the notification information. The procedures for generating the notification information in the selecting section 492 are the same as in the notification information generating apparatus 400 as shown in FIGS. 3 and 28 except the estimation result of propagation path conditions being used as a substitute for the modulation parameter as the channel quality information. More specifically, for a subcarrier block used as a starting point, the selecting section 492 outputs the estimation result of propagation path conditions on the subcarrier block as the notification information without modification. For a subcarrier block being not used as a starting point, the selecting section 492 calculates a difference value between the estimation result of propagation path conditions on the subcarrier block and the cumulative value input from the reconstructing section 493, and based on the estimation result of propagation path conditions and the calculated difference value, selects one from the notification information candidate values to output as the notification information.

For example, more specifically, for each subcarrier block not to use as a starting point, the selecting section 492 first determines a sign of the absolute-value candidate. The determination of the sign is made using either the first sign determining method or the second sign determining method. The selecting section 492 selects the notification information candidate value ($X'_k$ or $Y'_j$) nearest the calculated difference value from among the difference-value candidate values and the value of the absolute-value candidate value with the sign determined. The generated notification information is output to the reconstructing section 493.

The reconstructing section 493 holds the notification information output from the selecting section 492, reconstructs the estimation result of propagation path conditions based on the held notification information, and outputs the reconstructed estimation result of propagation path conditions. The details of the reconstructing section 403 will be described later with reference to FIG. 14.

In addition, the reconstructing section 493 in the notification information generating apparatus 490 has the same functional block configuration as in the notification information reconstructing section 390 for the uplink notification information in the base station apparatus 190 of FIG. 11.

FIG. 14 shows an example of a functional block diagram of the notification information reconstructing section 390 in this Embodiment. The notification information reconstructing section 390 has a reconstruction calculating section 391 and storing section 392. The reconstructing section 493 also has the same configuration. The reconstruction calculating section 391 differs from the reconstruction calculating section 301 as shown in FIG. 5 in the respect of outputting the reconstructed estimation result of propagation path conditions, instead of the section 301 outputting the reconstructed modulation parameter. Further, the storing section 392 differs in the respect of receiving a notification information candidate value selected based on the estimation result of propagation path conditions as the notification information, and outputting the reconstructed estimation result of propagation path conditions as the cumulative value. The other portions are the same as in FIGS. 5 and 29.

More specifically, the reconstruction calculating section 391 receives the notification information and the cumulative value output from the storing section 392, and for a subcarrier block used as a starting point in generating the notification information, outputs the notification information about the subcarrier block as the reconstructed estimation result of propagation path conditions without modification, while outputting the notification information to the storing section 392 as the storage information. For a subcarrier block being not used as a starting point, when the notification information about the subcarrier block is a difference-value candidate value $X'_k$, the reconstruction calculating section 301 adds the notification information (difference-value candidate value $X'_k$) and the cumulative value to output as the reconstructed estimation result of propagation path conditions, while outputting the addition result to the storing section 392 as the storage information. When the notification information is the absolute-value candidate value $Y'_j$, the section 391 determines the sign of the absolute-value candidate value $Y'_j$, adds the input notification information (absolute-value candidate value $Y'_j$) and the cumulative value input from the storing section 302 using the determined sign, and outputs the addition result as the reconstructed estimation result of propagation path conditions, while outputting the notification information to the storing section 392 as the storage information.

In Embodiment 8, the notification information and specific examples of the reconstruction on the downlink notification information as shown in FIGS. 30 to 33 are the same as in Embodiment 7. Further, for the uplink notification information, the procedures are the same as in Embodiment 7 except that "the modulation parameter" is replaced with "the estimation result of propagation path conditions", and that a range of available values (the number of bits and the like) is changed.

Thus, according to this Embodiment, when a difference in the estimation result of propagation path conditions is notified to the communicating party as the channel quality information, by notifying the notification information with either the difference-value candidate value indicating the difference in the estimation result of propagation path conditions or the absolute-value candidate value selected, it is possible to improve accuracy of the reconstructed channel quality information.

EMBODIMENT 9

Embodiment 9 describes the notification information generating apparatus using a specific example for calculating a difference value. The following explanation describes the case of using the notification information generating apparatus 400 as shown in FIG. 3, and inputting a modulation parameter as an example of the channel quality, but this Embodiment is applicable to the notification information generating apparatus 490 as shown in FIG. 13.

The number of a subcarrier block (channel) is indicated by a variable i, and it is assumed that Q(i) is a modulation parameter of the ith subcarrier block, S(i) is a cumulative value (reconstruction value) to compare with the modulation parameter of the ith subcarrier block, and that D(i) is a difference value. $i_0$ indicates a subcarrier block number as a starting point. R(i) indicates the notification information of the ith subcarrier block.

In the subcarrier block as a starting point, the selecting section 402 generates the notification information as R(i)=Q(i).

For subcarrier blocks except the subcarrier block as a starting point, first, the reconstructing section 403 calculates a cumulative value S(i) using equation (1) while omitting the subcarrier block as a starting point. In calculating the cumulative value, the section 403 uses a different equation corresponding to the relationship between the subcarrier block number $i_0$ as a starting point and i to calculate the cumulative value S(i).

Next, using the cumulative value S(i) calculated by the reconstructing section 403, the selecting section 402 calculates a difference value D(i) using the equation of D(i)=Q(i)−S(i). Based on the calculated difference value D(i) and the input modulation parameter (an example of the channel quality information), the section 402 selects a notification information candidate value, and based on the selected notification information candidate value, generates the notification information to output.

Thus, the notification information generating apparatus 400 first generates the notification information of a channel as a starting point, and sequentially generates the notification information of channels that are not used as a starting point. The notification information generating apparatus 400 generates the channel quality information of the channel used as a starting point as the notification information. Herein, with attention given to two different channels (subcarrier blocks) i.e. the first channel and the second channel, the operation is described in the case of generating the notification information of the second channel when notification information of the first channel is already generated. The reconstructing section 403 already holds (stores) the notification information generated based on the channel quality information of the first channel as the last notification information, and further holds the notification information of the channel as a starting point in the generating the notification information. Based on the held last notification information, the reconstructing section 403 generates the cumulative value (reconstruction value), and outputs the generated cumulative value to the selecting section 402 as a reconstruction value of the first channel. In addition, irrespective of whether the first channel is a channel that is used as a starting point or not, the same operation is performed.

The selecting section 402 receives the channel quality information of the second channel, calculates a difference value between the received channel quality information of the second channel and the reconstruction value of the first channel reconstructed by the reconstructing section 403, and selects a notification information candidate value nearer the calculated difference value from the notification information table 401 (holding the difference-value candidate values and absolute-value candidate values) to generate the notification information. The reconstructing section 403 receives the generated notification information of the second channel to store as the last notification information.

Further, the notification information generating apparatus 400 repeats the operation of generating the notification information based on a difference value between two channels such as the second channel and third channel, and generates the notification information of all the plurality of channels.

Moreover, the notification information generating apparatus of each of the above-mentioned Embodiments is capable of being actualized by hardware such as a circuit and the like or software. In the case of actualizing by software, the apparatus is implemented by a program (notification information generating program) on the operation of a computer. The notification information generating program is loaded on memory in a computing machine (in the communication apparatus) and executed under control of a central processing unit (CPU). The notification information generating program has the function of making the computing machine execute at least the following procedures.

The program has the procedures for selecting a single candidate value from candidate values for the notification information including at least one difference-value candidate value indicating a difference between two pieces of channel quality information with the sing and at least one absolute-value candidate value indicating an absolute value of the difference between two pieces of channel quality information, and generating the notification information based on the selected candidate value. More specifically, the program has the function of executing the procedures for (1) storing in a notification information table a plurality of difference-value candidate values and absolute-value value candidate values, (2) generating a reconstruction value using the notification information generated based on the channel quality information of a first channel, and (3) receiving the channel quality information of a second channel differing from the first channel, selecting a single candidate from the candidate values for the notification information based on the channel quality information of the second channel and the reconstruction value, and generating the notification information based on the selected candidate value.

Further, (4) for a channel as a starting point, the program may have the procedure for outputting the input channel quality information as the notification information.

EMBODIMENT 10

Embodiment 10 describes a notification information generating apparatus that generates the notification information using a candidate-value number for specifying the notification information candidate value. In Embodiments 7 to 9, the descriptions are given while assuming that the notification information is a notification information candidate value itself, and this Embodiment describes the case of using the candidate-value number indicating a value of the notification information candidate value and generating the notification information.

The following explanation describes the case of using the notification information generating apparatus 400 as shown in FIG. 3, but this Embodiment is applicable to the notification information generating apparatus 490 as shown in FIG. 13. As an example, the case is explained that the notification information generating apparatus 400 generates the notification information with n bits. In calculating the cumulative value, the reconstructing section needs to acquire information that associates a candidate-value number with a notification information candidate value by referring to the notification information table, being notified of the correspondence between the notification information candidate value and the candidate-value number from the selecting section, or the like.

The notification information table 401 stores notification information candidate values and candidate-value numbers specifying the notification information candidate values in association with each other. The notification information table 401 has a storage area for storing n bits to store $2^n$ candidate-value numbers specifying respective candidate values for the notification information and candidate values for the notification information associated respectively with $2^n$ candidate-value numbers. In addition, for the notification information as a starting point, it is possible to notify such information by a method of using the starting-point notification information having a value that can be notified with n bits, separately notifying the starting-point notification information (for example, the channel quality information itself), or the like. For example, when the notification information candidate values contain difference-value candidate values $X_k$ (k=1~M, M is a natural number) and absolute-value candidate values $Y_j$ (j=1~N, a N is a natural number), M and N have the relationship of $M=2^n-N$.

According to the procedures as shown in FIG. 28, the selecting section 402 selects a notification information candidate value, and using a candidate-value number specifying the selected notification information candidate value, generates the notification information.

The reconstructing section 403 receives the candidate-value number as the notification information, and by referring to the notification information table 401, generates the reconstructed channel quality information.

Thus, according to this Embodiment, by generating the notification information with n bits using the candidate-value number, the information amount of the notification information can be suppressed. By this means, it is possible to suppress the control information amount transmitted and received between communication apparatuses. Further, it is possible to generate the notification information with the notification information amount remaining constant while maintaining accuracy of the reconstructed channel quality information, and to suppress complexity and non-efficiency of the notification procedures of the control information transmitted and received between communication apparatuses.

EMBODIMENT 11

The notification information generating apparatus described in each of the above-mentioned Embodiments is capable of adopting the following configuration. Each of the above-mentioned Embodiments describes the case of repeating a feedback loop comprised of the selecting section and reconstructing section. Inside the selecting section of each of the above-mentioned Embodiments, the same processing as the reconstruction processing that is processing inside the reconstructing section is performed on each candidate value, and a single candidate value is selected based on the result. In other words, the selecting section has the function of reconstruction, and the function of comparing with the reconstruction result. Therefore, a common circuit can be shared as the circuit with the function of reconstruction inside the selecting section and the circuit with the function of reconstruction inside the reconstructing section. Further, not limited to hardware such as the circuit and the like, also when such a function is implemented by software, the function can be shared to actualize.

FIG. 15 is a block diagram showing an example of a configuration of a notification information generating apparatus 480 that provides the selecting section with the reconstructing section. The notification information generating apparatus 480 has a notification information table 481, selecting section 482, reconstructing section 483, and comparing section 484. The notification information table 481 is the same as the notification information table 401 of FIG. 3. The block configuration of FIG. 15 adopts the configuration where the reconstructing section 483 is included inside the selecting section 482. The selected channel quality information is input to the comparing section 484 inside the selecting section 482. The reconstructing section 483 has the storage function, and stores a last reconstructed reconstruction value (cumulative value, channel quality information reconstructed in the processing of the last channel). As an example, the reconstructing section 483 is capable of being actualized by the same configuration as in FIG. 5 or 14.

Figure 34:
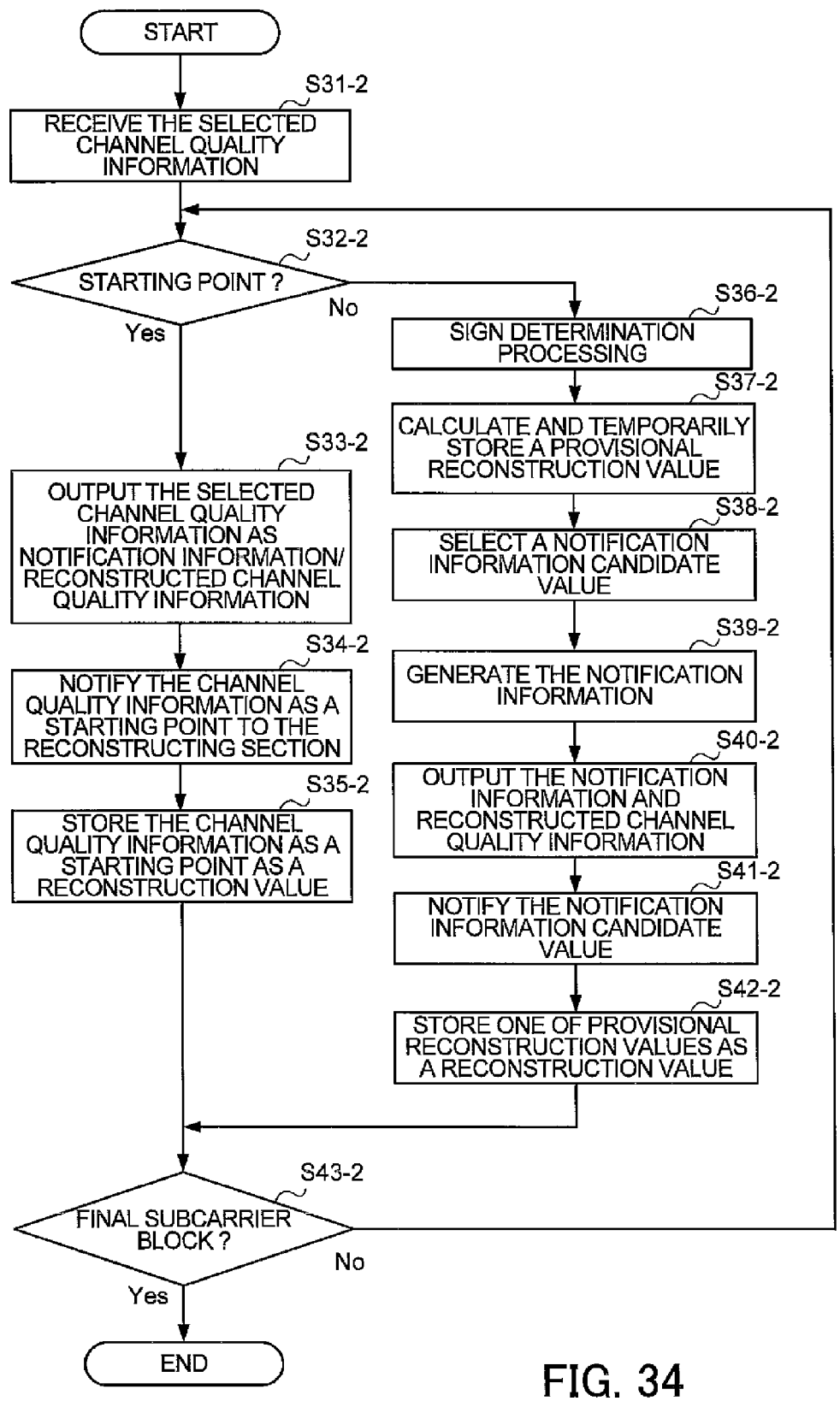
FIG. 34 is a flowchart showing an example of the operation of a notification information generating apparatus in Embodiment 11.

Described next is the operation of the notification information generating apparatus 480 of this Embodiment. FIG. 34 is a flowchart showing an example of the operation of the notification information generating apparatus 480 of this Embodiment.

First, in the notification information generating apparatus 480, the comparing section 484 receives the selected channel quality information (S31-2). The comparing section 484 determines whether the input selected channel quality information is of a channel as a starting point (S32-2), and when the information is of the channel as a starting point (Yes in S32-2), outputs the selected channel quality information as the notification information and the channel quality information (S33-2), while notifying the reconstructing section 483 of the channel quality information of the channel as a starting point (S34-2). The reconstructing section 483 stores the selected channel quality information as the last reconstruction value (S35-2).

In the case of channels except the starting-point channel (No in S32-2), the comparing section 484 outputs an instruction for outputting a reconstruction value to the reconstructing section 483, and the reconstructing section 483 determines a sign of an absolute-value candidate value (S36-2), and using the notification information candidate values including a value of the absolute-value candidate value with the determined sign and the stored last reconstruction value, generates a plurality of provisional reconstruction values (provisionally reconstructed channel quality information) to output to the comparing section 484 (S37-2).

More specifically, the reconstructing section 483 stores the last reconstructed reconstruction value, and sequentially receives the notification information candidate value input from the notification information table 481. The reconstructing section 483 determines the sign of the absolute-value candidate value based on the sign of the last notification information using either the first sign determining method or the second sign determining section, specifies a value of the absolute-value candidate value based on the determined sign, and further specifies the notification information candidate value. In addition, it is assumed that the sign of the last notification information is stored together with the reconstruction value. For the channel (subcarrier block) under the processing, the reconstructing section 483 calculates the provisionally reconstructed channel quality information (provisional reconstruction value) using the last reconstruction value and the notification information candidate value (by adding each notification information candidate value to the last reconstruction value). Next, the reconstructing section 483 associates the provisionally reconstructed channel quality information with the notification information candidate value to temporarily store, while sequentially outputting the notification information candidate value and the provisionally reconstructed channel quality information to the comparing section 484.

The comparing section 484 compares the provisionally reconstructed channel quality information sequentially input from the reconstructing section 483 with the selected channel quality information, selects the provisionally reconstructed channel quality information nearest the selected channel quality information as a result of the selection (S38-2), and generates as the notification information the notification information candidate value added to the selected provisionally reconstructed channel quality information (S39-2).

The comparison performed by the comparing section 484 is the same as evaluation of the comparison performed by the selecting section in the configuration described previously, although the expression method of the calculation procedures is different. The comparing section 484 outputs the generated notification information, and the reconstructed channel quality information (the selected value among a plurality of provisionally reconstructed channel quality information) associated with the generated notification information (S40-2), while sending a signal (a signal for specifying the notification information candidate value) indicative of the selected notification information to the reconstructing section 483 (S41-2).

The reconstructing section 483 stores the provisionally reconstructed channel quality information associated with the notification information candidate value indicated by the signal output from the comparing section 484 (S42-2) to use as a last reconstructed reconstruction value (last reconstruction value) in the next processing. The comparing section 484 determines whether the channel is a final channel (subcarrier block) (S43-2), and repeats the processing from step S32 when the channel is not the final channel (No in S43-2), while finishing the processing when the channel is the final channel (Yes in S43-2). Thus, by sharing the reconstruction processing, the calculation amount can be reduced.

In addition, FIG. 34 illustrates the operations of the comparing section 484 and reconstructing section 483 being performed sequentially, but depending on the processing, the comparing section 484 and reconstructing section 483 are capable of performing the processing in parallel with each other. Further, in FIG. 15, the notification information table 481 may be provided with a dedicated storage area or may be a temporarily reserved storage area (cache). Furthermore, the notification information table 481 may be a storage area temporarily reserved in the selecting section 482 (reconstructing section 483 or comparing section 484).

Moreover, the notification information generating apparatus 480 of this Embodiment is not limited to the operation of FIG. 34. For example, the calculation (step S37-2 of FIG. 34) of provisional reconstruction value can be configured to be performed in the comparing section 484. For example, the reconstructing section 483 is configured to store a reconstruction value (last reconstruction value) of the last processed channel. The reconstructing section 483 determines a sign of an absolute-value candidate value, and determines a value of the absolute-value candidate value. Next, the reconstructing section 483 outputs a plurality of notification information candidate values and the last reconstruction value to the comparing section 484. Using the input plurality of notification information candidate values and last reconstruction value, the comparing section 484 calculates provisionally reconstructed channel quality information (a plurality of provisional reconstruction values), compares the plurality of calculated provisional reconstruction values with the selected channel quality information, and selects the provisional reconstruction value nearest the selected channel quality information.

The selecting section 484 outputs the selected provisional reconstruction value as the reconstructed channel quality information, while generating the notification information based on the notification information candidate value added to the selected provisional reconstruction value to output. Further, the comparing section 484 outputs a signal for specifying the notification information candidate value added to the selected provisional reconstruction value to the reconstructing section 483. Based on the signal notified from the comparing section 484, the reconstructing section 483 acquires the selected notification information candidate value, and stores a value obtained by adding the acquired notification information candidate value to the last reconstruction value stored in the storage area as the last reconstruction value.

Thus, in the method of calculating a provisional reconstruction value in the comparing section 484, the calculation amount increases as compared with the procedures in FIG. 34, but for the sign determination processing, it is enough for the reconstructing section 483 to once make a determination, and the processing amount can be suppressed as compared with Embodiment 7.

In addition, as the absolute-value candidate value described in each of the above-mentioned Embodiments, values to use may be a value larger than the absolute value of the difference-value candidate value, a value selected based on the channel quality information and the like. Further, the value selected based on the channel quality information includes a value (for example, average value, dispersion value, a value obtained by subtracting a dispersion value from an average value) calculated by performing statistics (for example, summary statistics processing) on the channel quality information notified from a communication apparatus that receives the signal, frequency interval of channels, delay dispersion value of the propagation path obtained from the channel quality information, a value determined based on the Doppler frequency and the like. The absolute-value candidate value and difference-value candidate value are not limited to integers, and may be decimals.

Further, not only the absolute-value candidate value, but also the difference-value candidate value is capable of being changed based on the channel quality information. As an example, a change of the notification information candidate value can be made in the selecting section in the notification information generating apparatus. The selecting section receives the channel quality information of a plurality of channels, determines whether or not to change the notification information candidate value based on the input plurality of channel quality information, and based on a result of the determination, is capable of changing the notification information candidate value (either or both of the difference-value candidate value and the absolute-value candidate value).

The selecting section changes the difference-value candidate value and/or the absolute-value candidate value based on the input channel quality information, delay dispersion value of the propagation path or the like, while updating the notification information table, and the base station apparatus notifies the terminal apparatus (communication apparatus of the communicating party) of the information about the updated notification information candidate value (candidate value). The information about the notification information candidate value to notify may be the notification information candidate value itself, or when notification information candidate values are associated with candidate-value numbers, notified are a candidate-value number and the information about notification information candidate value associated with the candidate-value number. The terminal apparatus stores the received information about the notification information candidate value in the notification information table of the notification information generating apparatus. By this means, it is possible to determine a suitable notification information candidate value corresponding to the propagation path conditions, and to respond to variations during communication with flexibility.

As described above, according to preferred Embodiments according to the invention, when the channel quality information is notified using the difference, by selecting a difference-value candidate value indicating a difference between two pieces of channel quality information using a sign and an absolute-value candidate value indicating an absolute value of a difference between two pieces of channel quality to notify, it is possible to improve accuracy of the channel quality information reconstructed based on the difference. Further, by generating the notification information using the difference, it is possible to suppress the information amount to notify. By suppressing the information amount to notify, it is possible to enhance system throughput, and to reduce power consumption.

EMBODIMENT 12

In Embodiment 12, a value of the square of a difference in propagation path information between channels is used as the differential information.

Figure 35:
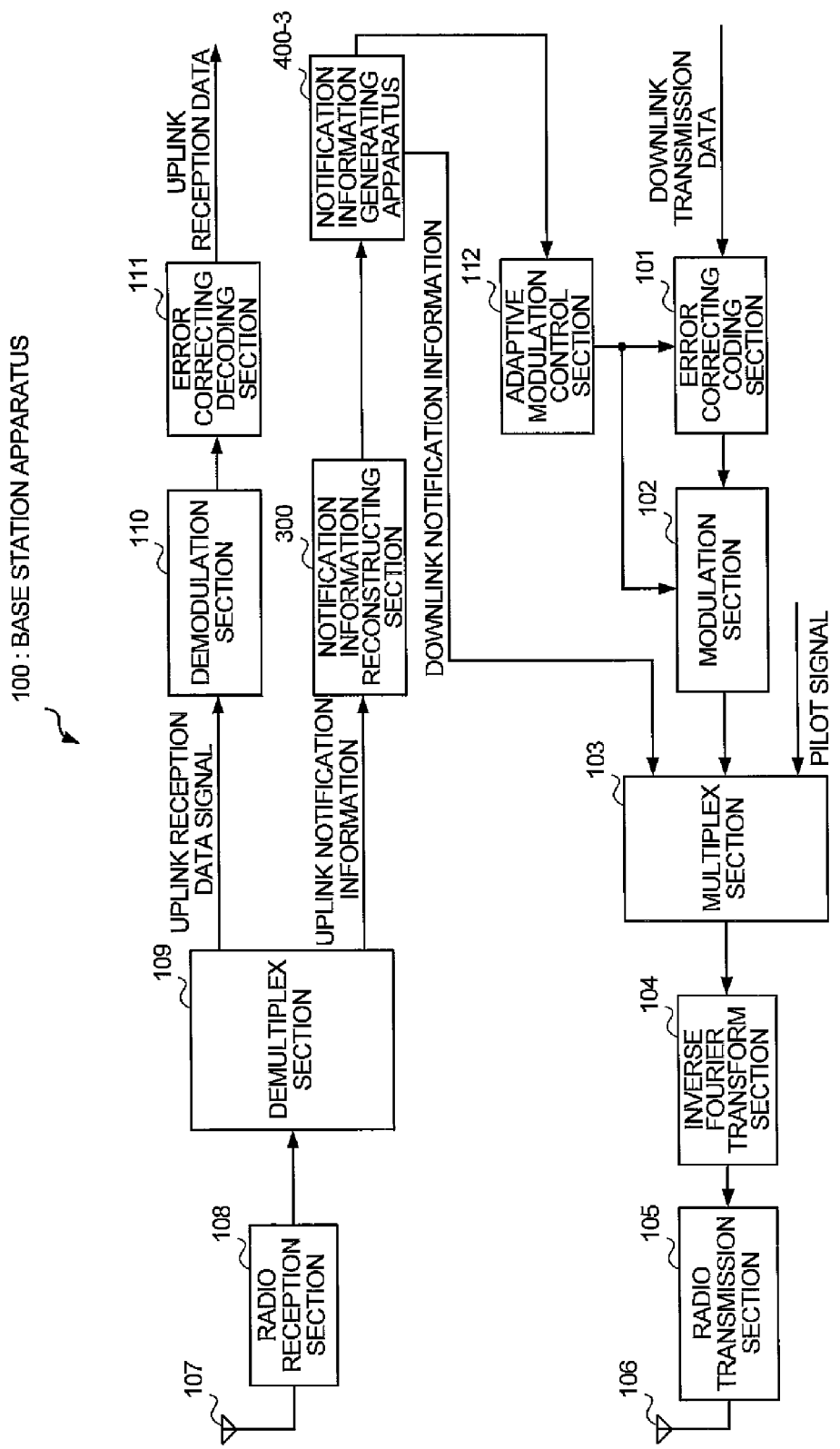
FIG. 35 is a block diagram showing a configuration example of a base station apparatus in Embodiment 12 according to the invention.

FIG. 35 is a block diagram showing a configuration example of a base station apparatus 100 in Embodiment 12 according to the invention. The base station apparatus 100 has an error correcting coding section 101, modulation section 102, multiplex section 103, inverse Fourier transform section 104, radio transmission section 105, antenna sections 106 and 107, radio reception section 108, demultiplex section 109, demodulation section 110, error correcting decoding section 111, notification information reconstructing section 300, notification information generating apparatus 400-3, and adaptive modulation control section 112.

Figure 36:
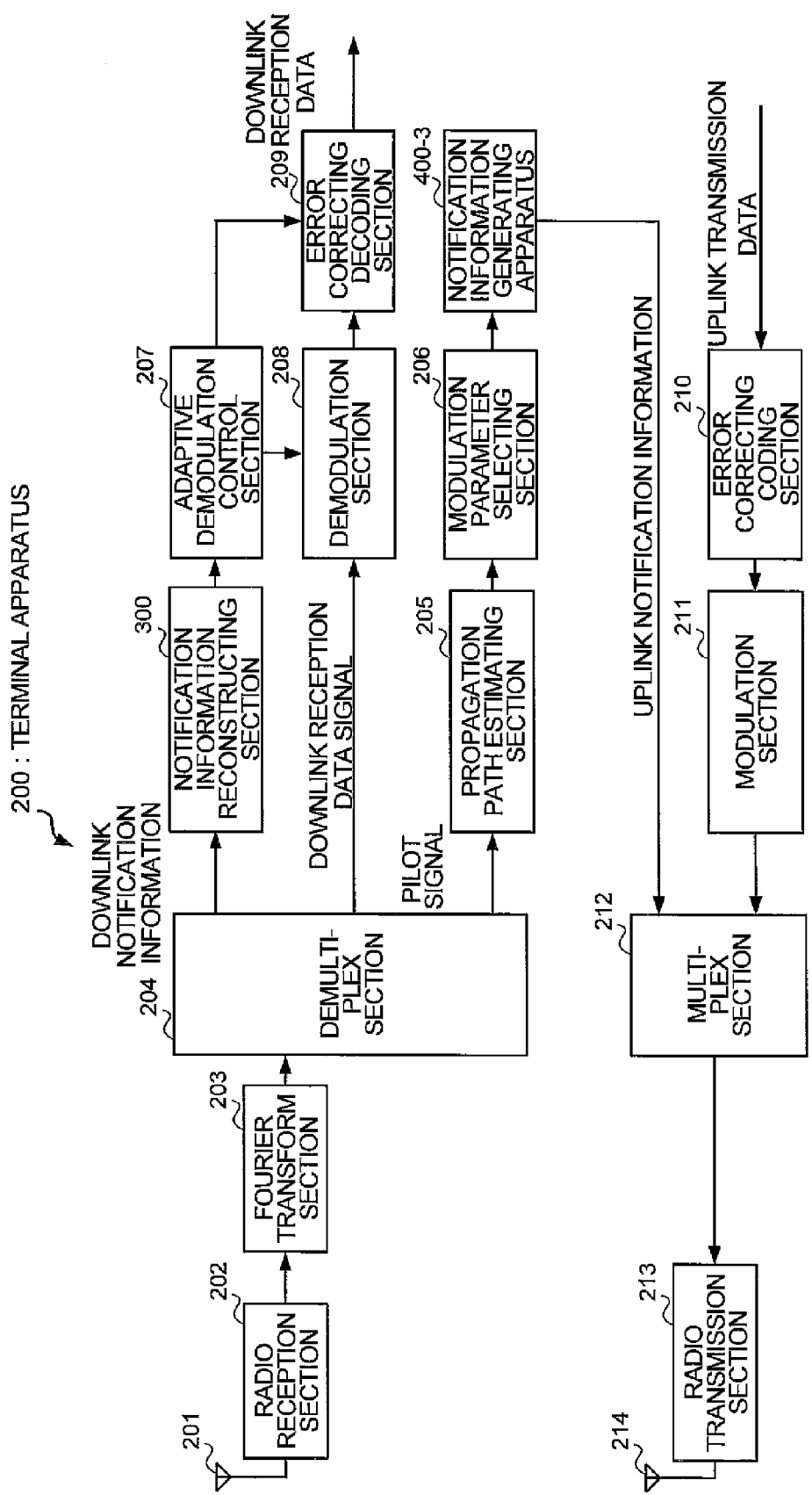
FIG. 36 is a block diagram showing a configuration example of a terminal apparatus in Embodiment 12 according to the invention.

FIG. 36 is a block diagram showing a configuration example of a terminal apparatus 200 in Embodiment 12 according to the invention. The terminal apparatus 200 has antenna sections 201 and 214, radio reception section 202, Fourier transform section 203, demultiplex section 204, propagation path estimating section 205, modulation parameter selecting section 206, notification information generating apparatus 400-3, notification information reconstructing section 300, adaptive demodulation control section 207, demodulation section 208, error correcting decoding section 209, error correcting coding section 210, modulation section 211, multiplex section 212 and radio transmission section 213.

Described first are downlink transmission procedures in the base station apparatus 100 as shown in FIG. 35. The error correcting coding section 101 performs error correcting coding on downlink transmission data based on adaptive modulation control information notified from the adaptive modulation control section 112, and outputs a coded data sequence.

The modulation section 102 modulates the downlink transmission data output from the error correcting coding section based on the adaptive modulation control information notified from the adaptive modulation control section 112, and outputs a modulated symbol sequence.

The multiplex section 103 multiplexes notification information generated in the notification information generating apparatus 400-3 and a pilot signal into the symbol sequence output from the modulation section 102. The inverse Fourier transform section 104 performs inverse Fourier transform on the signal output from the multiplex section 130 to output. The signal transformed in the inverse Fourier transform section 104 is transmitted from the radio transmission section 105 via the antenna section 106.

Described next are downlink reception procedures in the terminal apparatus as shown in FIG. 36. The signal received in the radio reception section 202 via the antenna section 201 is output to the Fourier transform section 203, and subjected to Fourier transform processing in the Fourier transform section 203. The signal output from the Fourier transform section 203 is demultiplexed into a downlink reception data signal, downlink notification information and the pilot signal in the demultiplex section 204. The pilot signal output from the demultiplex section 204 is output the propagation path estimating section 205 and is used in propagation path estimation processing.

The propagation path estimating section 205 performs estimation of propagation path conditions from the pilot signal, and outputs an estimation result of propagation path conditions. In addition, in the case of performing propagation path estimation using a downlink reception data signal, instead of a pilot signal, an input signal to the propagation path estimating section 205 is a downlink reception data signal, or demodulation result or decoding result of the downlink reception data signal. In this case, the need is eliminated for the pilot signal multiplexing processing in the multiplex section 103 in the base station apparatus 100 and the demultiplexing processing of the pilot signal in the demultiplex section 204 in the terminal apparatus 200.

Further, in the case of performing propagation path estimation using both of the pilot signal and the downlink reception data signal, as well as the pilot signal, the propagation path estimating section receives a downlink reception data signal, or demodulation result or decoding result of the downlink reception data signal. The present invention is applicable to such configurations. The modulation parameter selecting section 206 selects a downlink modulation parameter based on the estimation result of propagation path conditions output from propagation path estimating section 205, and notifies the information about the modulation parameter (modulation parameter information) to the notification information generating apparatus 400-3.

The notification information generating apparatus 400-3 generates the uplink notification information based on the information about the modulation parameter selected in the modulation parameter selecting section 206. The processing in the notification information generating apparatus 400-3 will be described later with reference to FIG. 37.

The downlink notification information output from the demultiplex section 204 is output to the notification information reconstructing section 300, and the section 300 reconstructs the information about the downlink modulation parameter to output. The adaptive demodulation control section 207 outputs a signal for controlling demodulation and error correcting decoding processing based on the information about the modulation parameter reconstructed in the notification information reconstructing section 300.

The downlink reception data signal output from the demultiplex section 204 is input to the demodulation section 208. The demodulation section 208 and error correcting decoding section 209 respectively perform the demodulation processing and error correcting decoding processing on the downlink reception data signal based on the adaptive demodulation control signal output from the adaptive demodulation control section 207. In addition, as preprocessing of demodulation, as a matter of course, such a configuration may be adopted that propagation path compensation processing is performed using the estimation result of propagation path conditions estimated in the propagation path estimating section 205, and that the estimation result of propagation path conditions is referred to in error correcting decoding, but is omitted in the figures of the description of the invention.

Described next are uplink transmission procedures in the terminal apparatus 200 as shown in FIG. 36. The error correcting coding section 210 performs error correcting coding on uplink transmission data, and outputs a data sequence subjected to error correcting coding. The modulation section 211 modulates the data sequence subjected to error correcting coding, and outputs a modulated symbol sequence. The multiplex section 212 multiplexes the uplink notification information output from the notification information generating apparatus 400-3 into the modulated symbol sequence output from the modulation section 211. The signal output from the multiplex section 212 is transmitted from the radio transmission section 213 via the antenna section 214.

Described next are uplink reception procedures in the base station apparatus 100 as shown in FIG. 35. The signal received in the radio reception section 108 via the antenna section 107 is output to the demultiplex section 109. The demultiplex section 109 demultiplexes the input signal into an uplink reception data signal and uplink notification information to output. In addition, as a matter of course, such a configuration may be adopted that a pilot signal is beforehand multiplexed in the multiplex section 212 in the terminal apparatus 200, the pilot signal is demultiplexed in the demultiplex section 109 in the base station apparatus 100, and that propagation path compensation is performed for the uplink reception data signal and uplink notification information using the demultiplexed pilot signal, but descriptions on the propagation path compensation are omitted in the description of the invention.

The uplink reception data signal output from the demultiplex section 109 is subjected to the demodulation processing and the error correcting decoding processing respectively in the demodulation section 110 and the error correcting decoding section 111, and the uplink reception data is extracted.

The uplink notification information output from the demultiplex section 109 is output to the notification information reconstructing section 300, and the information about the modulation parameter is reconstructed. The reconstructed information about the modulation parameter is output to the notification information generating apparatus 400-3.

The notification information generating apparatus 400-3 generates downlink notification information based on the information about the modulation parameter notified from the notification information reconstructing section 300, while outputting the information about the modulation parameter to the adaptive modulation control section 112. The downlink notification information output from the notification information generating apparatus 400-3 is input to the multiplex section 103. In addition, the notification information generating apparatus 400-3 is capable of being achieved by the same block configuration as that of the notification information generating apparatus 400-3 in the terminal apparatus 200.

The adaptive modulation control section 112 generates a signal for controlling the modulation processing and error correcting coding processing based on the information about the modulation parameter notified from the notification information generating apparatus 400-3, and outputs the signal to the modulation section 102 and error correcting coding section 101.

In addition, the above-mentioned explanation describes the configuration where the base station apparatus 100 also has the notification information generating apparatus 400-3, but the base station apparatus 100 does not always need to have the notification information generating apparatus 400-3. In the case where the notification information generating apparatus 400-3 is not provided, the notification information output from the demultiplex section 109 is input not only to the notification information reconstructing section 300, but also to the multiplex section 103 as the downlink notification information. Further, the information about a modulation parameter output from the notification information reconstructing section 300 is input to the adaptive modulation control section 112.

Figure 37:
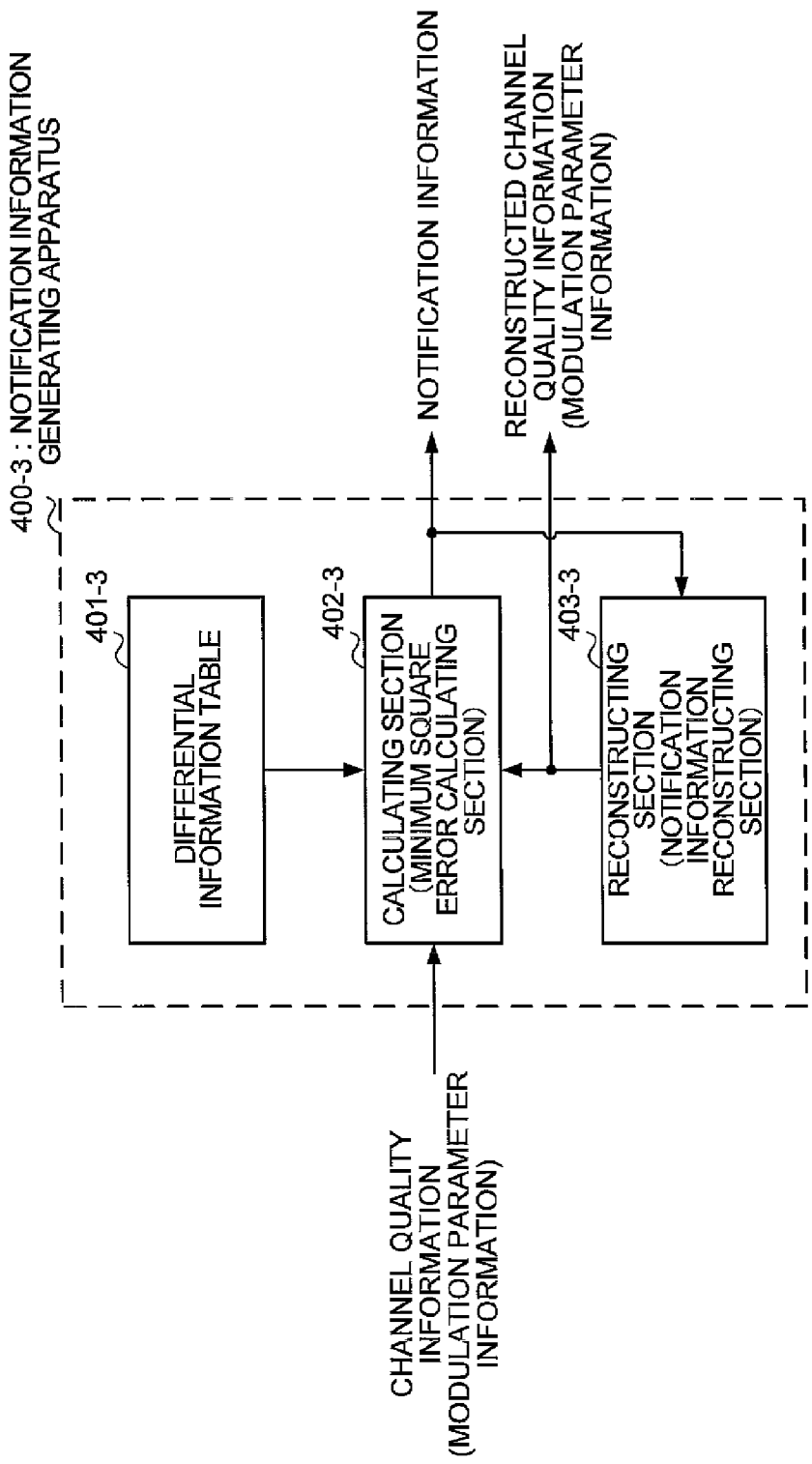
FIG. 37 is a block diagram showing an example of a configuration of a notification information generating apparatus in Embodiment 12.

FIG. 37 is a block diagram showing an example of the configuration of the notification information generating apparatus 400-3 in this Embodiment. The notification information generating apparatus 400-3 has a differential information table 401-3, calculating section 402-3, and reconstructing section 403-3. The processing of the notification information generating apparatus 400-3 will be described below.

The differential information table 401-3 is a storage area for storing the differential information that are candidate values (difference level, a value to notify the communicating party as the notification information) of a difference value calculated in the calculating section 402-3. The candidate values (candidate values for the difference value) are a plurality of predetermined numeric values, and this Embodiment describes as an example the case of holding four values, {+1, ±0, −1, −2}, as the differential information, but any numeric values and any number of values are used. Further, values held as the differential information do not always need to be difference values. A plurality of candidate values as the difference value may be a combination of difference values and non-difference values. For example, the invention is applicable to the case of holding three difference values and one non-difference value (Y) such as {+1, ±0, −1, Y}. Y may be a value indicative of propagation path conditions. For example, Y may be a non-difference value indicative of an absolute level (for example, carrier hole). Further, any numbers of difference values and non-difference values are applied.

The calculating section 402-3 calculates a square error (an example of an index value) for each of the candidates of the differential information based on the modulation parameter information (an example of the channel quality information), the differential information table 401-3, and the reconstructed modulation parameter information (an example of reconstructed channel quality information) output from the reconstructing section 403-3, and selects a candidate value that minimizes the square error from among the candidates of the differential information to output as the notification information. The index value is a value indicative of an error between the difference value and the candidate value, and used as the index value are a value of the square (square error) of a difference between the difference value and the candidate value, absolute value of the difference between the difference value and the candidate value, and the like. This Embodiment describes the case where the calculating section 402-3 calculates a square error as an index value.

In addition, the explanation on the calculation processing of the square error will be made later with reference to FIG. 38. The calculating section 402-3 calculates a minimum value of the square error, and therefore, is also referred to as a minimum square error calculating section or square error calculating section. The notification information output from the calculating section 402-3 is output to the notification information generating apparatus 400-3, while being output to the reconstructing section 403-3. The calculating section 402-3 beforehand holds a processing unit for generating the notification information, and generates the notification information for each carrier sequentially by using a carrier to start the processing as a starting point.

The reconstructing section 403 generates reconstructed modulation parameter information from the notification information, and sends the reconstructed modulation parameter information to the calculating section 402-3 as feedback. Further, the reconstructing section 403-3 has the function of sequentially holding the notification information notified from the calculating section 402-3 as the last notification information on a channel basis, and adding a plurality of last notification information. The added value becomes the reconstructed modulation parameter information based on the last notification information.

Herein, assuming that two different frequency channels are the first and second channels, the calculating section 402-3 has the function of receiving the reconstructed modulation parameter information (reconstructed channel quality information of the first channel) input from the reconstructing section 403-3 and the modulation parameter information (channel quality information of the second channel), calculating a difference value between the reconstructed modulation parameter information and the modulation parameter information, and outputting the calculated difference value as the notification information. More specifically, since the index value is calculated to select a candidate value, the calculating section 402-3 performs the following operation.

The calculating section 402-3 adds each of a plurality of candidate values to the reconstructed channel quality information of the first channel, generates a plurality of provisional channel quality information of the second channel, and calculates a second index value based on the difference between the input channel quality information of the second channel and each generated provisional channel quality information of the second channel. Next, the calculating section 402-3 selects the provisional channel quality information of the second channel with the calculated second index value being small, and further selects a candidate value used in the selected provisional channel quality information of the second channel to generate the notification information. In addition, although the expression method of the calculation procedures is different, the second index value is the same as an index value calculated based on a difference between a difference value between the channel quality information of the second channel and the reconstructed channel quality information of the first channel, and a candidate value.

Described next is the feedback processing in the notification information generating apparatus 400-3. The calculating section 402-3 receives the modulation parameter information, and determines a modulation parameter of a frequency channel (sub-channel) to use as a starting point among the input modulation parameters. As an example, described herein is the case of using, as a starting point, a modulation parameter of a frequency channel (first frequency channel in the communication unit) that is first input to the calculating section 402-3. In addition, the starting-point channel is not limited to a first channel (channel with the first number) among channels to be processed, and for example, may be an intermediate channel, or final channel.

The calculating section 402-3 outputs the modulation parameter information of the starting-point frequency channel as the notification information without modification. When the modulation parameter information of the starting-point frequency channel is input to the reconstructing section 403-3, the reconstructing section 403-3 outputs the notified modulation parameter information without modification. Next, when the modulation parameter information of the second and subsequent frequency channels is input to the calculating section 402-3, the calculating section 402-3 calculates the sum of a level (value for specifying the modulation parameter) indicated by the reconstructed modulation parameter information of the last frequency channel output from the reconstructing section 403-3 and each candidate value beforehand held in the differential information table as the differential information, and further calculates a square error (index value) from the level indicated by the input modulation parameter information. The section 402-3 selects a candidate value that minimizes the square error from among the plurality of candidate values, and outputs the selected candidate value as the notification information.

The reconstructing section 403-3 adds the notification information output from the calculating section 402-3 and the level indicated by the reconstructed modulation parameter information of the last frequency channel, thereby reconstructs the modulation parameter level, and outputs the modulation parameter information indicating the reconstructed modulation parameter level to the calculating section 402-3. Thus, the reconstructing section 403-3 holds the notification information output from the calculating section 402-3, and based on the held notification information and the newly notified notification information, reconstructs the modulation parameter information of the frequency channel being currently processed. As the notification information, the reconstructing section 403-3 acquires the modulation parameter information (modulation parameter level) for the frequency channel as a starting point, while acquiring a candidate value held as the differential information for the other frequency channels, and therefore, reconstructs the modulation parameter for each frequency channel by adding the candidate value to the modulation parameter information of the starting point. In holding the notification information, the reconstructing section 403-3 may hold the notification information for each frequency channel, or hold the modulation parameter information reconstructed based on the notification information.

Figure 38:
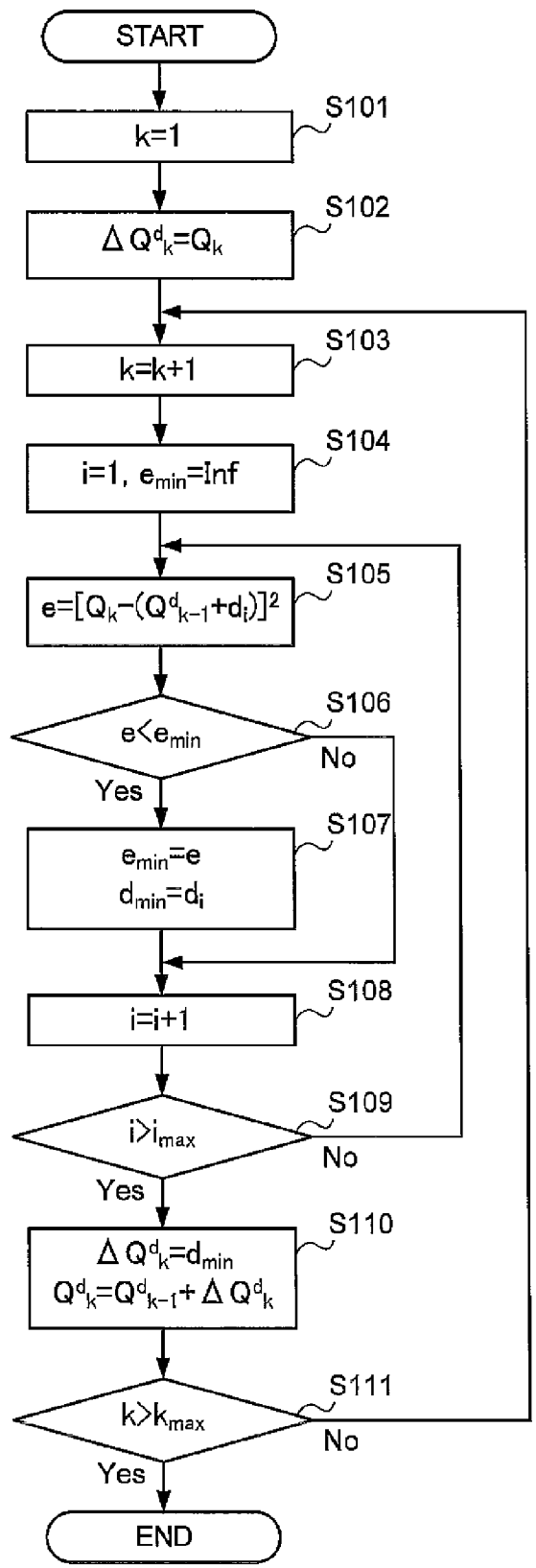
FIG. 38 is a flowchart showing an example of the operation of the notification information generating apparatus in Embodiment 12.
Figure 43:
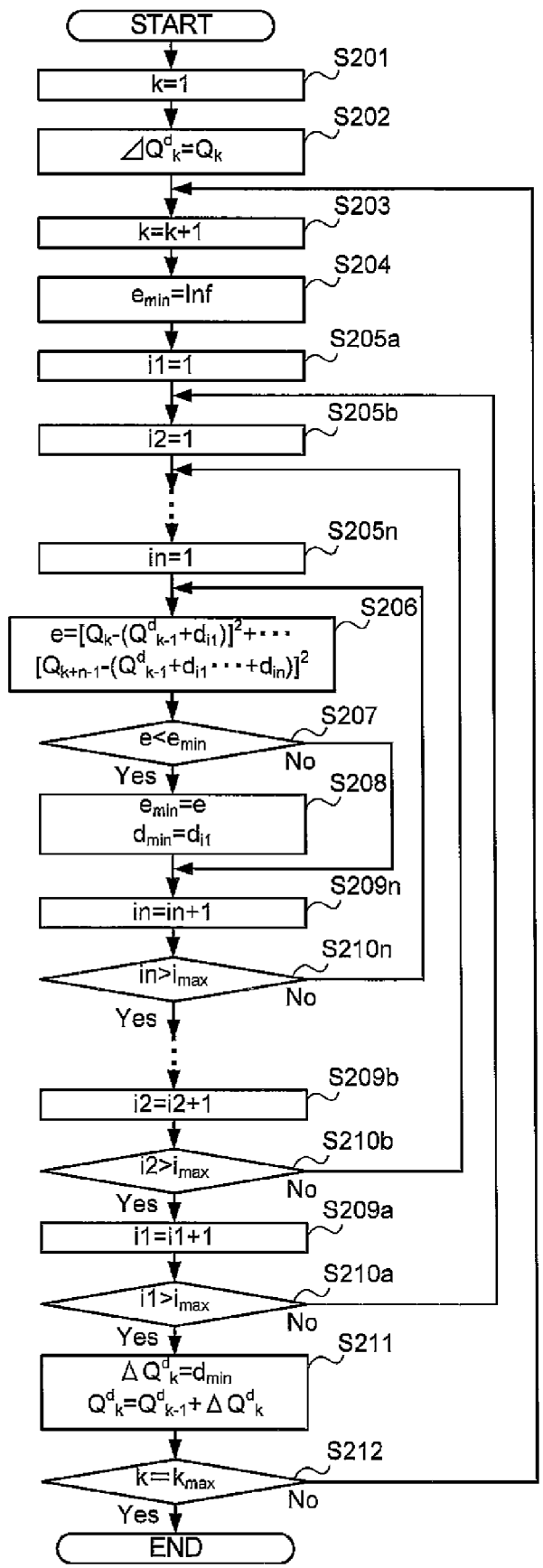
FIG. 43 is a flowchart showing an example of the operation of a notification information generating apparatus in Embodiment 13.

In addition, the reconstructing section 403-3 in the notification information generating apparatus 400-3 has the same functional block configuration as that of the notification information reconstructing section 300 for the uplink notification information in the base station apparatus 100 as shown in FIG. 38 and the notification information reconstructing section 300 for the downlink notification information in the terminal apparatus as shown in FIG. 43. In the description of the invention, to simplify the explanation, descriptions are made using different reference numerals and names for the notification information reconstructing section 300 and reconstructing section 403-3.

The notification information generating apparatus 400-3 repeats the processing on a plurality of frequency channels, and outputs the modulation parameter information indicating the modulation parameter level of a frequency channel of a starting points and the notification information indicating the difference value (difference level) in the second and subsequent frequency channels.

FIG. 38 is a flowchart showing an example of the operation of the notification information generating apparatus 400-3 in this Embodiment. In FIG. 38, k is a variable indicating a frequency channel number, and takes on values from 1 to $k_{max}$ that is the number of frequency channels to process. $Q_k$ is a storage area to set the modulation parameter information input to the notification information generating apparatus 400-3, and is set for the modulation parameter level (value to specify the modulation parameter). $Q^d_k$ is an area to set the reconstructed modulation parameter information. $\Delta Q^d_k$ is the notification information, and is an area to set the difference value (modulation parameter level in the case of the frequency channel as a starting point). The notification information generating apparatus 400-3 receives the modulation parameter information $Q_k$ on k frequency channels, and calculates the difference value to generate the notification information $\Delta Q^d_k$. According to FIG. 38, the feedback processing process in the notification information generating apparatus 400-3 will be described below specifically.

The calculating section 402-3 initializes k that is a variable indicating the frequency channel number (S101), and sets the notification information $\Delta Q^d_1$ of the first frequency channel as a starting point at the modulation parameter level $Q_1$ of the first frequency channel (S102, starting-point channel quality information generation processing). The calculating section 402-3 increments k by "1" (S103), and shifts to the next frequency channel (counting of the processing channel). k indicates a frequency channel number targeted for the calculation. The calculating section 402-3 initializes the differential information number i (i is a variable) for specifying a candidate value to hold in the differential information table 401-3 and variable $e_{min}$ indicating the provisional minimum square error (S104, variable initialization processing).

The calculating section 402-3 receives the modulation parameter level reconstructed in the reconstructing section 403-3 to set on the k−1th reconstructed parameter level $Q^d_{k-1}$. The calculating section 402-3 selects a candidate value (meaning the ith candidate value among a plurality of candidate values) specified by $d_i$ from the differential information, and calculates the square error e between the modulation parameter level $Q_k$ of the kth frequency channel and the reconstructed modulation parameter level $Q^d_{k-1}$+candidate value $d_i$ (S105, square error calculation processing).

The calculating section 402-3 compares the calculated square error e with the minimum square error $e_{min}$ (S106, square error determination processing), and when e is smaller than $e_{min}$ (Yes in S106), updates the provisional minimum square error $e_{min}$ to e, while updating the provisional difference value (candidate value of the differential information) $d_{min}$ to $d_i$ (S107, different value update processing). When e is $e_{min}$ or more (No in S106) and the processing of step S107 is finished, the calculating section 402-3 increments i by "1" (S108), and shifts to a candidate value indicated by the differential information that is a next candidate. The calculating section 402-3 compares the differential information number i with the number $i_{max}$ of candidates of the differential information (S109) and when the differential information number i exceeds the number $i_{max}$ of candidates (Yes in S109), shifts to step S110. When the differential information number does not exceed the number $i_{max}$ (No in S109), the section 402-3 returns to step S105, and repeats the processing of steps S105 to S109 until the differential information number i exceeds the number $i_{max}$ of candidates.

The calculating section 402-3 determines a candidate value selected from the differential information in the kth frequency channel as a difference value (S110). In other words, the calculating section 402-3 sets $d_{min}$ on the area of the notification information $\Delta Q^d_k$ to set the difference value, and outputs the notification information $\Delta Q^d_k$ to the reconstructing section 403-3. The reconstructing section 403-3 receives the notification information $\Delta Q^d_k$ of the kth frequency channel from the calculating section 402-3, and using the reconstructed modulation parameter information $Q^d_{k-1}$ of the k−1th frequency channel that is last reconstructed and the notification information $\Delta Q^d_k$, reconstructs the modulation parameter level of the kth frequency channel to set on the reconstructed modulation parameter information $Q^d_k$.

The calculating section 402-3 compares the variable k indicating the frequency channel number with the maximum number $k_{max}$ of frequency channels, and when the numbers agree with each other (Yes in S111), finishes the processing, while repeating the processing from step S103 when the numbers do not agree with each other (No in step S111). The calculating section 402-3 outputs thus calculated notification information $[\Delta Q^d_1, \Delta Q^d_2, \Delta Q^d_3, \ldots, \Delta Q^d_{kmax}]$ from the notification information generating apparatus 400-3.

In addition, FIG. 37 describes the case where the notification information generating apparatus 400-3 receives the modulation parameter information corresponding to the number of frequency channels to process, and collectively outputs the notification information corresponding to the number of frequency channels to the outside (the multiplex section 212 in FIG. 36 or the adaptive modulation control section 112 in FIG. 35), but the invention is not limited thereto. The calculating section 402-3 may output the notification information $\Delta Q^d_k$ to the outside on a frequency channel basis.

Figure 40:
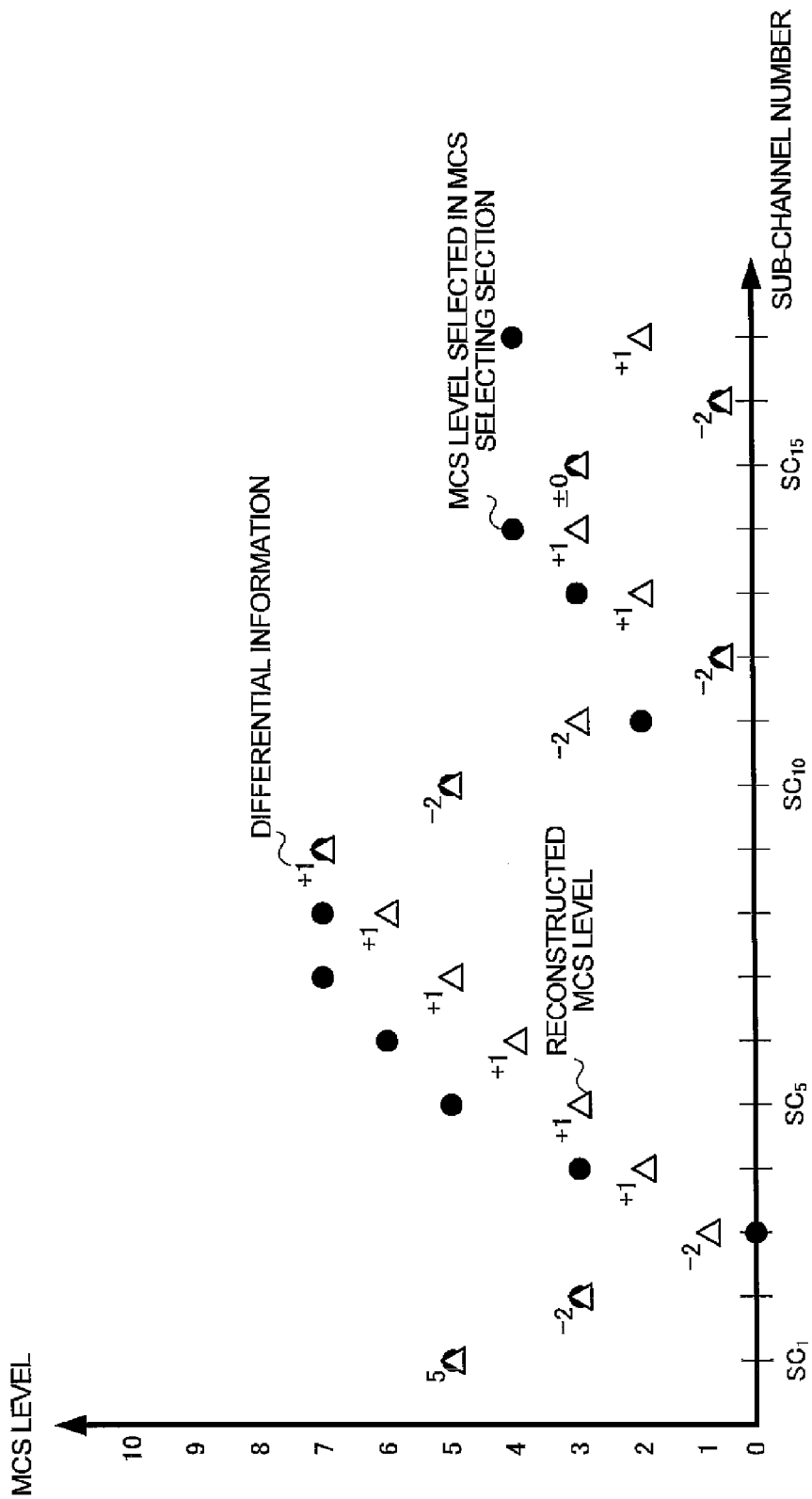
FIG. 40 is a diagram showing the input modulation parameter information and the modulation parameter information reconstructed based on the notification information.

As an example of thus obtained notification information, FIGS. 39 and 40 show an example of the case where candidate values for the differential information are {+1, ±0, −1, −2}. FIG. 39 shows an example of calculation values in the case where the notification information generating apparatus 400-3 generates the notification information. Further, FIG. 40 is a diagram showing the input modulation parameter information and the modulation parameter information reconstructed based on the notification information. In FIG. 40, the horizontal axis represents the frequency channel number ($SC_n$, n is a positive integer) and the vertical axis represents the modulation parameter (MCS) level. In addition, in this example, the frequency channel as a starting point is $SC_1$. Each black circle in the graph indicates the modulation parameter level (MCS level) $Q_k$ indicated by the modulation parameter information input to the notification information generating apparatus 400-3, and each white triangle indicates the modulation parameter level $Q^d_k$ indicated by the MCS information reconstructed in the reconstructing section 403-3. Further, a numerical value described on the upper left of each white triangle indicates a candidate value indicated by the differential information selected as the notification information $\Delta Q^d_k$.

Using the specific example of FIGS. 39 and 40, the processing in the notification information generating apparatus 400-3 is described in association with the variable in the flowchart of FIG. 38. For $SC_1$ that is the first channel, the MCS information indicating the MCS level of "5" is output as the notification information. Meanwhile, for $SC_2$ and subsequent channels, the differential information indicating a difference level selected so as to minimize the square error is output as the notification information.

First, in generating the notification information $\Delta Q^d_1$ in the frequency channel $SC_1$, i.e. when k=1 in FIGS. 39 and 40, the modulation parameter information input to the notification information generating apparatus 400-3 indicates that the modulation parameter level $Q_1$ is "5" ($Q_1$=5) Since $SC_1$ is a channel as a starting point, the calculating section 402-3 outputs the notification information $\Delta Q^d_1$ using the input information indicating the modulation parameter level $Q_1$ as the output information.

Figure 41:
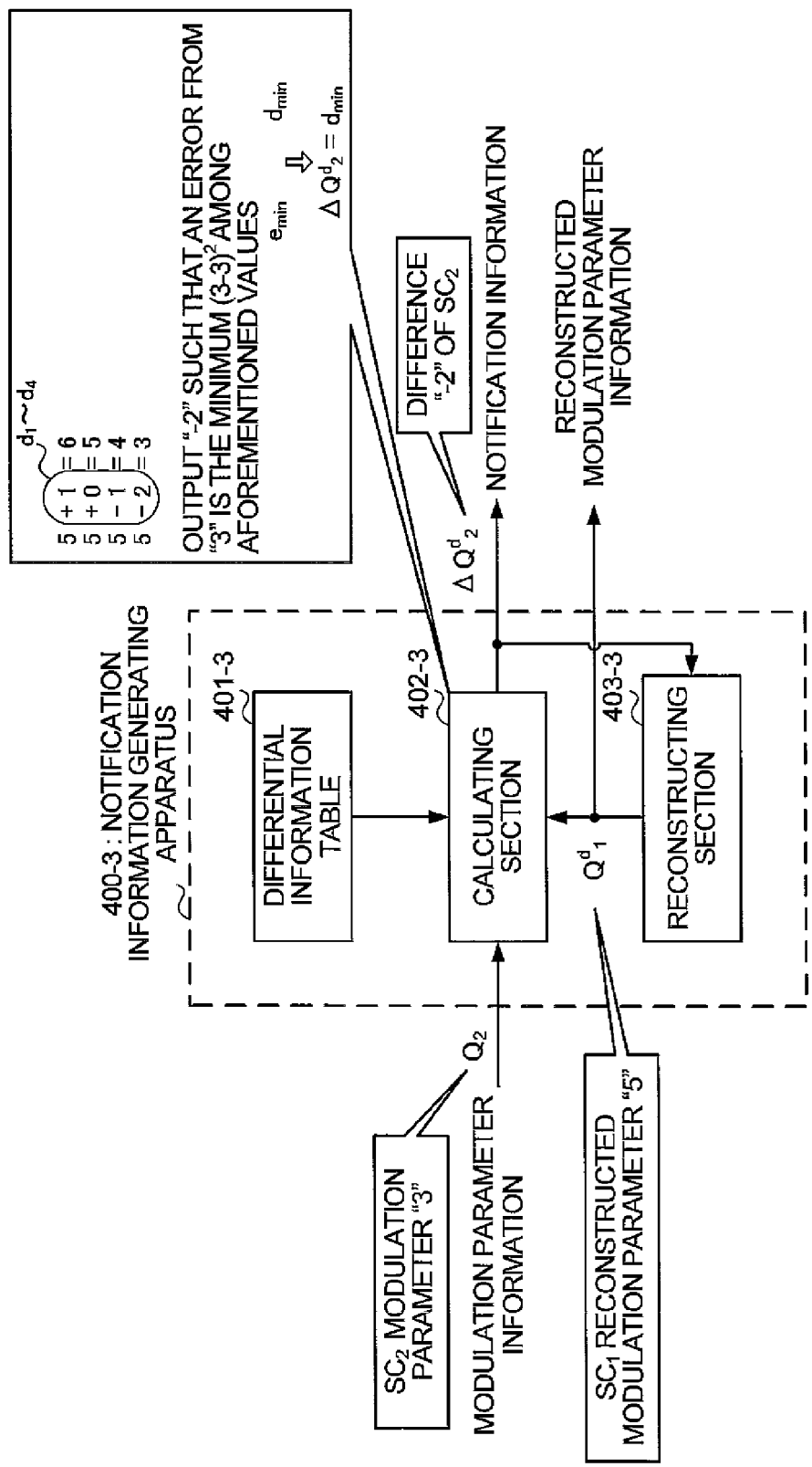
FIG. 41 is a diagram showing an example of the processing in the notification information generating apparatus when variable k is "2" in FIG. 38.

Next, in generating the notification information $\Delta Q^d_2$ in the frequency channel $SC_2$, i.e. when k=2 in FIGS. 39 and 40, the modulation parameter information input to the notification information generating apparatus 400-3 indicates that the modulation parameter level $Q_2$ is "3" ($Q_2$=3). FIG. 41 is a diagram showing an example of the processing in the notification information generating apparatus 400-3 when the variable k in FIG. 38 is "2" (k=2). The reconstructing section 403-3 outputs the notification information indicating that modulation parameter level $Q_1$ of $SC_1$ is "5" as the reconstructed modulation parameter information $Q^d_1$ of $SC_1$ without modification. Since $SC_2$ is not a channel as a starting point, the calculating section 402-3 calculates the square error e {9, 4, 1, 0} between the sum {6, 5, 4, 3} of reconstructed modulation parameter level $Q_1$ of $SC_1$ of "5" and each of candidate values {+1, +0, −1, −2} ($d_i$ to $d_{min}$ in FIG. 38) for the differential information set in the differential information table 401-3 and the modulation parameter information $Q_2$ of "3" input to the notification information generating apparatus 400-3, respectively (S105 in FIG. 38), and outputs the notification information $\Delta Q^d_2$ in candidate value $d_i$="−2" ($d_{min}$ in FIG. 38) with the minimum square error $e_{min}$ of $(3-3)^2$ (S107 in FIG. 38) as the output information.

Figure 42:
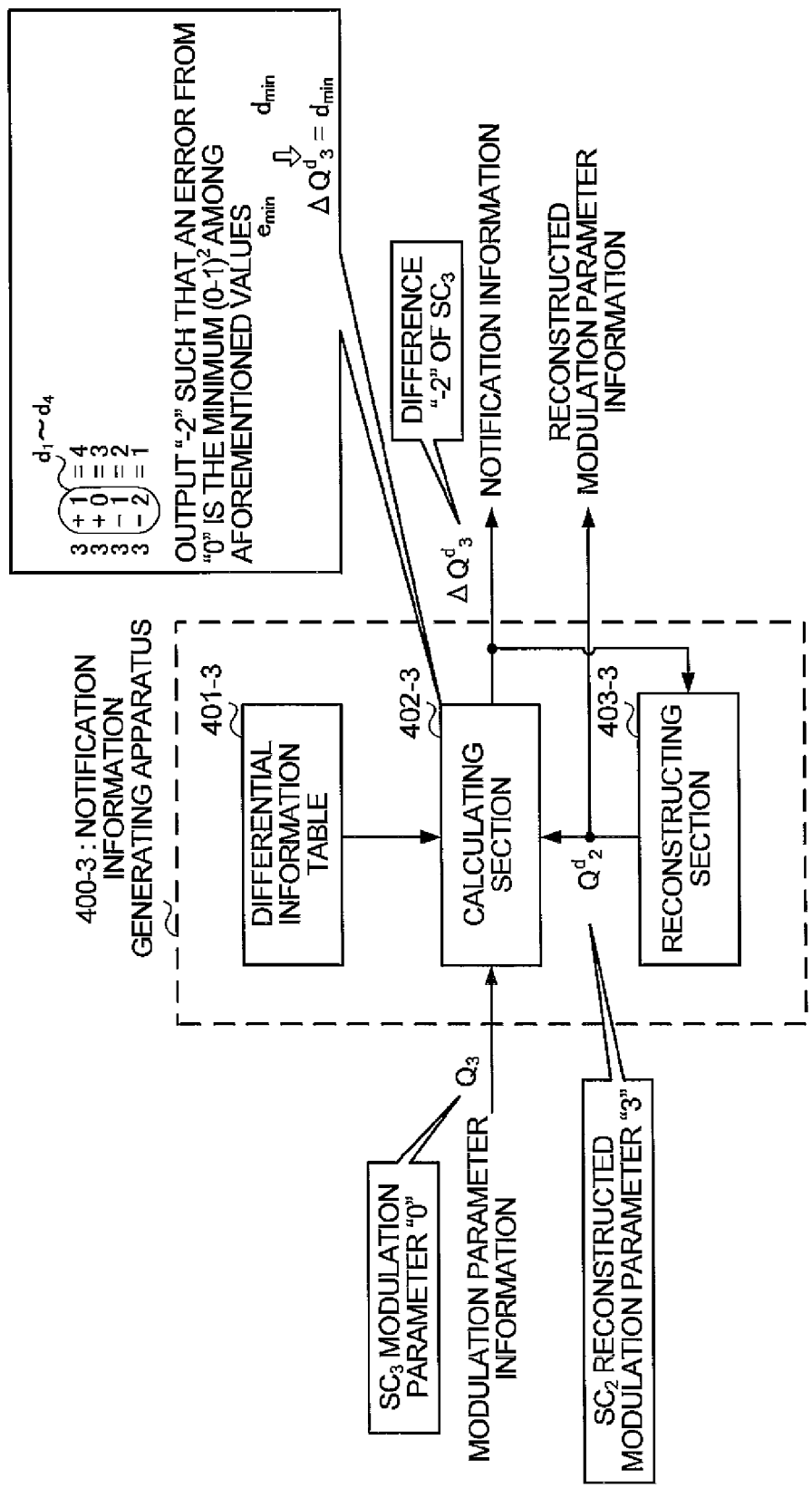
FIG. 42 is a diagram showing an example of the processing in the notification information generating apparatus when variable k is "3" in FIG. 38.

Next, in generating the notification information $\Delta Q^d_3$ in the frequency channel $SC_3$, i.e. when k=3 in FIGS. 39 and 40, the modulation parameter information input to the notification information generating apparatus 400-3 indicates that the modulation parameter level $Q_3$ is "0" ($Q_3$=0). FIG. 42 is a diagram showing an example of the processing in the notification information generating apparatus 400-3 when the variable k in FIG. 38 is "3" (k=3). The reconstructing section 403-3 adds the notification information $\Delta Q^d_2$ of "−2" indicated by the notification information of $SC_2$ and the reconstructed modulation parameter level $Q_1$ of $SC_1$ of "5", and thereby outputs the modulation parameter level $Q^d_3$ of "3" as the reconstructed modulation parameter information of $SC_2$. Since $SC_3$ is not a channel as a starting point, the calculating section 402-3 calculates the square error e {16, 9, 4, 1} between the sum {4, 3, 2, 1} of reconstructed modulation parameter level $Q^d_2$ of $SC_2$ of "3" and each of candidate values {+1, ±0, −1, −2} ($d_i$ to $d_{min}$ in FIG. 38) for the differential information set in the differential information table and the modulation parameter information $Q_3$ of "0" input to the notification information generating apparatus 400-3, respectively (S105 in FIG. 38), and outputs the notification information $\Delta Q^d_3$ in candidate value $d_i$="−2" (d in in FIG. 38) with the minimum square error $e_{min}$ of $(0-1)^2$ (S107 in FIG. 38) as the output information.

Thereafter, by performing the similar processing, [$\Delta Q^d_1$, $Q^d_2, Q^d_3, \ldots, Q^d_{kmax}$] as shown in FIGS. 39 and 40 is obtained as the notification information.

In addition, FIG. 37 shows the case where a frequency channel as a starting point is only the first frequency channel, but a plurality of channels may be starting points, or a frequency channel except the first frequency channel may be a starting point. The calculating section 402-3 beforehand holds the frequency channel number to use as a starting point. For example, the section 402-3 may use frequency channels every some channels as a starting point, and output the modulation parameter information as the notification information without modification, while outputting the differential information on the frequency channels except the starting-point channels as the notification information. In such a case, although the information amount required for the notification information increases, it is possible to perform reconstruction nearer a modulation parameter level (optimal modulation parameter level) indicated by the modulation level input to the notification information generating apparatus 400-3.

Thus, by sequentially selecting a difference value as the notification information so as to minimize the square error between the optimal modulation parameter level and the reconstructed modulation parameter level, the reconstructed modulation parameter level approaches the optimal modulation parameter level. Therefore, by using the difference value as the notification information, it is possible to suppress deterioration in performance caused by the fact that the optimal modulation parameter level cannot be reconstructed.

Further, in this Embodiment, the notification information generating apparatus 400-3 calculates the difference value on a plurality of channels existing in the frequency-axis direction to generate the notification information. By determining the order (including selection of a channel as a starting point) for generating the notification information in a plurality of channels, any frames can be reconstructed in the same reconstruction method. Further, it is possible to maintain the information amount required for the notification information at the same amount in any frames (also in the first-transmitted frame).

EMBODIMENT 13

Embodiment 12 describes the case of sequentially selecting the differential information so as to minimize the square error of a single frequency channel in selecting a difference value from among a plurality of candidate values as the notification information. Embodiment 13 describes the case of selecting a candidate value for the difference information so as to minimize the total sum of square errors of n frequency channels. In other words, the notification information is generated using a difference value in a plurality of frequency channels, instead of calculating a difference value in the modulation parameter information between two frequency channels.

Block configurations of the base station apparatus 100 and terminal apparatus 200 according to this Embodiment are the same as the block configurations in FIGS. 35 and 36, respectively, and the processing in the notification information generating apparatus 400-3 as shown in FIG. 37 is different from that in Embodiment 12. More specifically, the calculating section 402-3 has the function of provisionally reconstructing a modulation parameter from the modulation parameter information and n pieces of differential information output from the reconstructing section 403-3. As the operation of determining a difference value of some channel by provisionally reconstructing the modulation parameter on three different channels, for example, the first, second and third channels, described as an example is the case of determining a difference value of the second channel using the first channel as a starting point. The calculating section 402-3 receives the channel quality information of the first, second and third channels. The calculating section 402-3 outputs the modulation parameter (channel quality information) of the first channel as the notification information to the reconstructing section 403-3 without modification. Based on the notification information of the first channel, the reconstructing section 403-3 generates the reconstructed modulation parameter (reconstructed channel quality information) of the first channel to output to the calculating section 402-3.

The calculating section 402-3 adds each of a plurality of candidate values to the reconstructed modulation parameter of the first channel input from the reconstructing section 403-3, generates a plurality of provisional channel quality information of the second channel, and calculates a second index value based on the difference between the input channel quality information of the second channel and each generated provisional channel quality information of the second channel. Further, the calculating section 402-3 adds each of a plurality of candidate values to the provisional channel quality information of the second channel, generates a plurality of provisional channel quality information of the third channel, and calculates a third index value based on the difference between the input channel quality information of the third channel and each generated provisional channel quality information of the third channel. The calculating section 402-3 selects a candidate value used in the provisional channel quality information of the second channel with the calculated sum of the second and third index values being small, and generates the notification information about the second channel using the selected candidate value. In addition, the second and third index values are different in the expression method of calculation procedures, but take the same value as that of the index value.

Described above is the case of three channels with the first channel used as a starting point, but the operation of the calculating section 402-3 is the same as in the case where the first channel is not a starting point, although the processing is different in the reconstructed modulation parameter in the reconstructing section 403-3. Described above is the case where the calculating section 402-3 receives the reconstructed channel quality information of the first channel, and the channel quality information of the first and second channels, and also when the calculating section 402-3 receives the channel quality information of three or more channels, the calculating section 402-3 adds candidate values in each of three or more channels, reconstructs provisional modulation parameters to calculate a difference value from the input modulation parameter, and is thus capable of performing the processing. The calculating section 402-3 repeats receiving the channel quality information of the predetermined number (for example, assuming x−1 from the second channel to the xth channel) of channels, and generating the provisional channel quality information on each of the predetermined number of channels, calculates a plurality of index values (second index value, third index value, . . . , xth index value), and selects a candidate value used in the provisional channel quality information of the second channel with a combination of a plurality of calculated index values (x−1 index values) being small. Specific operation of the notification information generating apparatus 400-3 will be described below.

FIG. 43 is a flowchart showing an example of the operation of the notification information generating apparatus of Embodiment 13. The same variables as in FIG. 38 are set for the same values in FIG. 43. A variable n indicates the number of frequency channels. According to FIG. 43, the feed back processing process in the notification information generating apparatus 400-3 will be described below specifically. FIG. 43 shows an example of generating the notification information using the sum of difference values of n frequency channels. Accordingly, n assumes a frequency channel n-channel spaced in the frequency direction apart from the frequency channel to calculate the difference value.

The calculating section 402-3 initializes k that is a variable indicating the frequency channel number (S201) and sets the notification information $\Delta Q^d_k$ of a first frequency channel as a starting point at the modulation parameter level $Q_1$ of the first frequency channel (S202, starting-point channel quality information generation processing). The calculating section 402-3 increments k by "1" (S203), and shifts to the next frequency channel (counting of the processing channel). The calculating section 402-3 initializes a variable $e_{min}$ indicating the provisional minimum square error (S204, initialization processing of variable $e_{min}$). Further, the calculating section initializes a variable ik (k=1~n) indicating the differential information number in the kth frequency channel (S205a~S205n, initialization processing of variable ik). More specifically, the calculating section 402-3 initializes the variable i1 indicating the differential information number in the first frequency channel (S205a), and similarly, initializes the variable i2, . . . , in indicating the k+1th, . . . , and k−1+nth differential information number (S205b~S205n).

The calculating section 402-3 receives the modulation parameter level reconstructed in the reconstructing section 403-3 to set on the k−1th reconstructed parameter level $Q^d_{k-1}$. The calculating section 402-3 calculates the total sum of square errors of reconstructed modulation parameter levels $Q^d_{k-1}, +d_{i1} \ldots +d_{in}$ in selecting modulation parameter levels $Q_k, \ldots, Q_{k-1+n}$ indicated by the modulation parameter information of the kth, . . . , and k−1+n frequency channels and the differential information indicating $d_{i1}, \ldots, d_{in}$ as the difference level (S206, square error calculation processing).

More specifically, the calculating section 402-3 selects a candidate value (meaning the ith candidate value among a plurality of candidate values) specified by din from the differential information, calculates the square error $e1=[Q_k-(Q^d_{k-1}+d_{i1})]^2$ between the modulation parameter level $Q_k$ of the kth frequency channel and the reconstructed modulation parameter level $Q^d_{k-1}$+ candidate value $d_i$, the square error $e2=[Q_{k+1}-(Q^d_{k-1}+d_{i1}+d_{i2})]^2$ between the modulation parameter level $Q_{k+1}$ of the k+1th frequency channel and the sum of the modulation parameter level $Q^d_{k-1}$ expected to be next reconstructed and the candidate values $d_{i1}$ and $d_{i2}, \ldots ,$ $en=[Q_k-(Q^d_{k-1}+d_{i1}+d_{i2} \ldots +d_{in}]^2$, thus calculates the square errors of from the kth frequency channel to k−1+nth frequency channel, calculates the sum of (e1+e1+ . . . en), and thereby calculates the total sum e of square errors of this Embodiment. e1 is the square error of the kth frequency channel, e2 is the square error between the modulation parameter level of the k+1th frequency channel reconstructed based on $Q^d_{k-1}$ and two candidate values, and the input modulation level $Q_k$, and en is the square error between the modulation parameter level of the k−1+nth frequency channel reconstructed based on $Q^d_{k-1}$ and n candidate values, and the input modulation level $Q_k$.

In addition, FIG. 43 does not show the case where k−1+n exceeds $k_{max}$ particularly, but in this case, the sum of square errors in the kth, . . . , and $k_{max}$ frequency channels is assumed to be the total sum e of square errors. The calculating section 402-3 compares the total sum e of square errors with the provisional minimum total sum $e_{min}$ of square errors (S207, square error determination processing), and when the total sum e of square errors is smaller than $e_{min}$ (Yes in S207), updates the provisional minimum square error $e_{min}$ to the total sum e of calculated square errors, while updating the provisional difference value (candidate value indicated by the differential information) $d_{min}$ to $d_{i1}$ (S208, different value update processing). When e is $e_{min}$ or more (No in S207) and the processing of step S208 is finished, the calculating section 402-3 increments in by "1" (S209) and shifts to a candidate value indicated by the differential information that is a next candidate. The calculating section 402-3 compares the differential information number in with the number $i_{max}$ of candidates of the differential information (S210$n$), and when i exceeds $i_{max}$ (Yes in S210$n$), shifts to step S209$n$–1. When i does not exceed $i_{max}$, the section 402-3 repeats the processing of steps S206 to S209$n$. Similarly, in steps S209$a$ to S205$n$, the section increments i1, . . . , in by 1 respectively, and in steps S210$a$, . . . , S210$n$, compares the differential information number i1, . . . , in with the number $i_{max}$ of candidates of the differential information respectively.

The calculating section 402-3 determines a candidate value selected from the differential information in the kth frequency channel as a difference value (S211). In other words, the calculating section 402-3 sets $d_{min}$ on the area of the notification information $\Delta Q^d_k$ to set the difference value, and outputs $\Delta Q^d_k$ to the reconstructing section 403-3. The reconstructing section 403-3 receives the notification information $\Delta Q^d_k$ of the kth frequency channel from the calculating section 402-3, and using the reconstructed modulation parameter information $Q^d_{k-1}$ of the k–1th frequency channel that is last reconstructed and the notification information $\Delta Q^d_k$, reconstructs the modulation parameter level of the kth frequency channel to set on the reconstructed modulation parameter information $Q^d_k$.

The calculating section 402-3 compares the variable k indicating the frequency channel number with the maximum number $k_{max}$ of frequency channels, and when the numbers agree with each other (Yes in S212), finishes the processing, while repeating the processing from step S203 when the numbers do not agree with each other (No in step S212). The calculating section 402-3 outputs thus calculated notification information [$\Delta Q^d_1$, $\Delta Q^d_2$, $\Delta^d_3$, . . . , $\Delta Q^d_{kmax}$] from the notification information generating apparatus 400-3.

Thus, by selecting the differential information that minimizes the total sum of square errors of a plurality of frequency channels as the notification information, the modulation parameter level indicated by the reconstructed modulation parameter information approaches the optimal modulation parameter level, and therefore, by using the differential information, it is possible to suppress deterioration in performance caused by the fact that the optimal modulation parameter level cannot be reconstructed.

EMBODIMENT 14

Embodiment 12 describes the case where for the first channel used as a starting point, the modulation parameter information selected in the modulation parameter selecting 206 is used as the notification information without modification. Embodiment 14 describes the case of selecting a modulation parameter level indicated by the notification information of a frequency channel as a starting point so that the square error is minimized.

Block configurations of the base station apparatus 100 and terminal apparatus 200 according to this Embodiment are the same as the block configurations as shown in FIGS. 35 and 36, respectively. The processing in the notification information generating apparatus 400-3 as shown in FIG. 37 is different from that in Embodiment 12. The calculating section 402-3 holds a plurality of predetermined quality information for the notification information of a channel as a starting point. The calculating section 402-3 receives the channel quality information of a plurality of channels including a starting-point channel, and whenever setting the notification information of the starting-point channel at each held predetermined channel quality, calculates an index value (a difference between the difference value and selected candidate value) on a plurality of input channels. The calculating section 402-3 adds a calculated index value of each of a plurality of channels for each predetermined quality information to set on the notification information of the starting-point channel, and selects the predetermined quality information that decreases the addition result to determine as the predetermined quality information to set on the starting-point channel. The operation in the notification information generating apparatus 400-3 will be described below.

Figure 44:
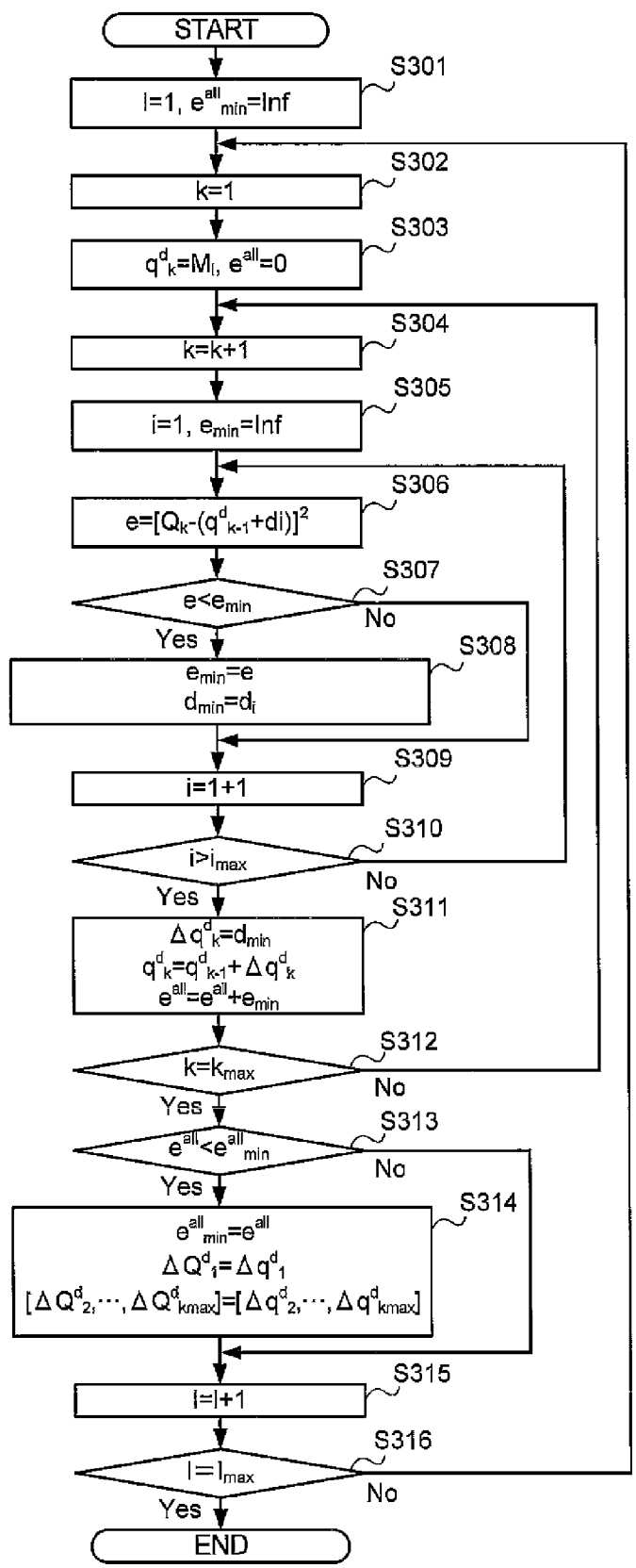
FIG. 44 is a flowchart showing an example of the operation of a notification information generating apparatus of Embodiment 14.

FIG. 44 is a flowchart showing an example of the operation of the notification information generating apparatus of Embodiment 14. The same variables as in FIG. 38 are set for the same values in FIG. 44. According to FIG. 44, the feedback processing process in the notification information generating apparatus 400-3 will be described below specifically. In FIG. 44, the predetermined number of candidate values is beforehand prepared for a modulation parameter of the starting-point frequency channel, the plurality of candidate values for the modulation parameter of the starting-point frequency channel is specified by using a variable 1 as the modulation parameter information number, and the candidate value for the modulation parameter of the starting-point frequency channel is indicated by $M_1$. $q^d_k$ is an area to set the provisional reconstructed modulation parameter information, different from $Q^d_k$, and set for a provisional reconstructed modulation parameter level. $\Delta q^d_k$ is an area to set the provisional notification information, different from $\Delta Q^d_k$, and set for a provisional difference value.

The calculating section 402-3 initializes the variable 1 indicating the modulation parameter information number that is a candidate of the starting-point channel and variable $e^{all}_{min}$ indicating the minimum value of the total sum of provisional minimum square errors (S301), and further initializes k that is a variable indicating the frequency channel number (S302) (initialization processing). The calculating section 402-3 sets the modulation parameter level $q^d_1$ indicated by the notification information of the starting-point frequency channel at the modulation parameter level $M_1$, and initializes the total sum $e^{all}$ of provisional minimum square errors (S303). The calculating section 402-3 increments k by "1" (S304), and shifts to the next frequency channel.

The calculating section 402-3 receives the modulation parameter level reconstructed in the reconstructing section 403-3 to set on the k–1th reconstructed parameter level $q^d_{k-1}$ The calculating section 402-3 selects a candidate value (meaning the ith candidate value among a plurality of candidate values) specified by $d_i$ from the differential information, and calculates the square error e between the modulation parameter level $q_k$ of the kth frequency channel and the reconstructed modulation parameter level $q^d_{k-1}$+candidate value $d_i$ (S306, square error calculation processing).

The calculating section 402-3 compares the square error e with the provisional minimum square error $e_{min}$ (S307) and when e is smaller than $e_{min}$ (Yes in S307), updates the provisional minimum square error $e_{min}$ to e, while updating the provisional difference value (candidate value indicated by the differential information) $d_{min}$ to d (S308, different value update processing). When e is $e_{min}$ or more (No in S307) and the processing of step S308 is finished, the calculating section 402-3 increments i by "1" (S308), and shifts to the differential information that is a next candidate. The calculating section 402-3 compares the differential information number i with the number $i_{max}$ of candidates of the differential information (S310), and when i exceeds $i_{max}$ (Yes in S310), shifts to step S311. When i does not exceed $i_{max}$ (No in S310), the section 402-3 returns to step S306, and repeats the processing of steps S306 to S310 until the differential information number i exceeds the number $i_{max}$ of candidates.

The calculating section 402-3 determines a candidate value selected from the differential information in the kth frequency channel as a provisional difference value (S311). In other words, the calculating section 402-3 sets the provisional difference value $d_{min}$ on the area of the notification information $\Delta q^d_k$ to notify the difference value, and outputs the provisional notification information $\Delta q^d_k$ to the reconstructing section 403-3. The reconstructing section 403-3 receives the provisional notification information $\Delta q^d_k$ of the kth frequency channel from the calculating section 402-3, and using the reconstructed modulation parameter information $q^d_{k-1}$ of the k−1th frequency channel that is last reconstructed and the notification information $\Delta q^d_k$, calculates and reconstructs the modulation parameter level $(q^d_{k-1}+\Delta q^d_k)$ of the kth frequency channel to set on the reconstructed modulation parameter information $q^d_k$. Further, the calculating section 402-3 adds $e_{min}$ to $e^{all}$.

The calculating section 402-3 compares the frequency channel number k with the number $k_{max}$ of frequency channels (S312), and when the numbers agree with each other (Yes in S312), shifts to S313, while repeating the processing of from step S304 to step S312 when the numbers do not agree with each other (No in S312). The calculating section 402-3 compares the total sum $e^{all}$ of minimum square errors with variable $e^{all}_{min}$ indicating the minimum value of the total sum of provisional minimum square errors (S313) and when $e^{all}$ is smaller than ell min (Yes in S313), updates $e^{all}_{min}$ to $e^{all}$, while setting areas of $[\Delta Q^d_1, \Delta Q^d_2, \Delta Q^d_3, \Delta Q^d_{kmax}]$ at $[\Delta q^d_1, \Delta q^d_2, \Delta q^d_3 \ldots, \Delta q^d_{kmax}]$ respectively (S314).

The calculating section 402-3 increments 1 by "1" (S315), compares the variable 1 indicating the modulation parameter information number that is a candidate of the first frequency channel with the number $l_{max}$ of modulation parameter information that are candidates of the starting-point channel, and when 1 exceeds $l_{max}$ (Yes in S316) finishes the processing, while repeating the processing of from step S302 to step S316 when 1 does not exceed $l_{max}$ (No in S316). The calculating section 402-3 outputs thus calculated notification information $[\Delta Q^d_1, \Delta Q^d_2, \Delta Q^d_3, \Delta Q^d_{kmax}]$ from the notification information generating apparatus 400-3.

Thus, by selecting the differential information so as to minimize the total sum of square errors while varying the modulation parameter of the first frequency channel, the reconstructed modulation parameter level approaches the optimal modulation parameter level, and therefore, by using the differential information, it is possible to suppress deterioration in performance caused by the fact that the optimal modulation parameter level cannot be reconstructed.

In addition, in this Embodiment, in selecting the provisional differential information of each frequency channel, the differential information is selected to minimize the square error of a single frequency channel, but as described in Embodiment 13, the differential information may be selected to minimize the total sum of square errors in a plurality of frequency channels.

EMBODIMENT 15

In Embodiment 15, a difference value is calculated to generate the notification information, in consideration of the quality of a signal reconstructed according to the notified information. Block configurations of the base station apparatus 100 and terminal apparatus 200 according to this Embodiment are the same as the block configurations in FIGS. 35 and 36, respectively.

Figure 45:
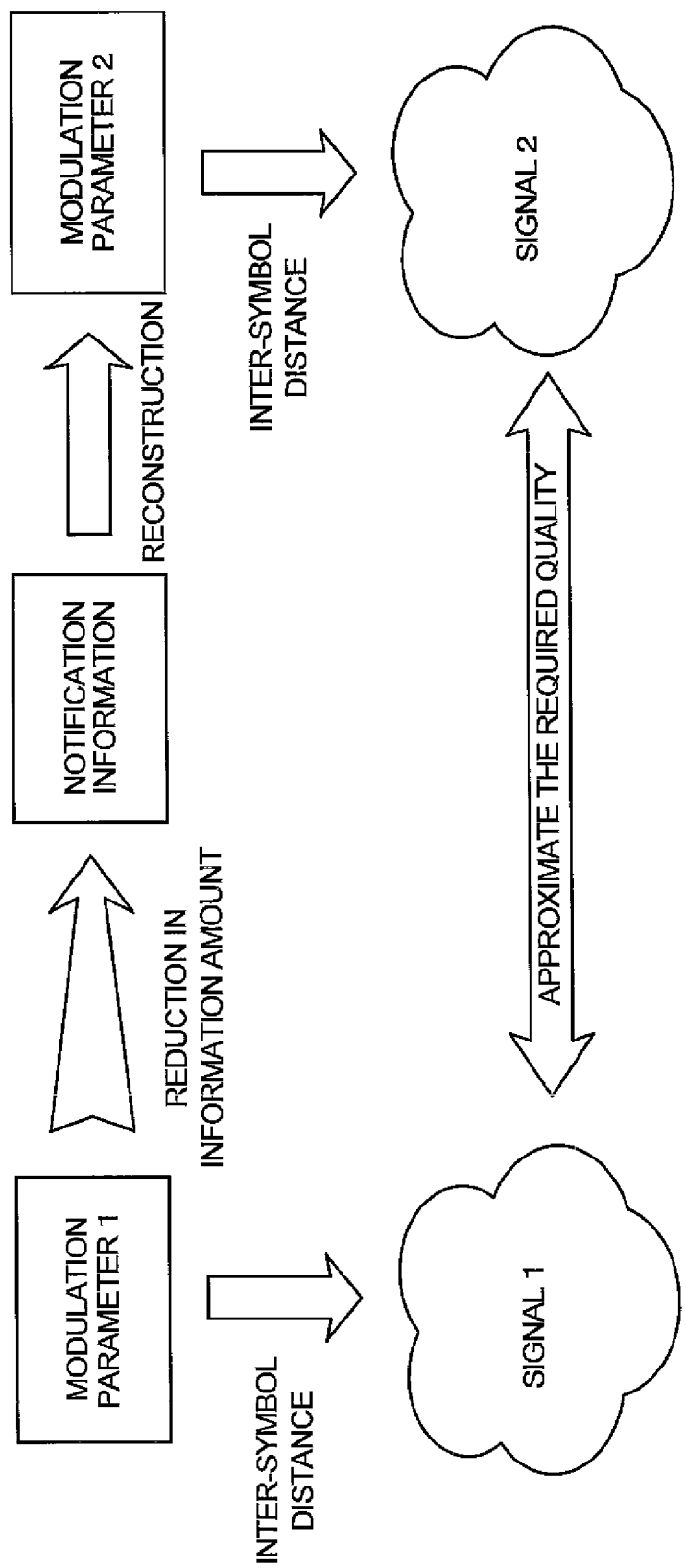
FIG. 45 is a diagram showing an example of the concept in Embodiment 15.

FIG. 45 is a diagram showing an example of the concept of this Embodiment. The communication terminal 200 notifies the notification information with the information amount of modulation parameter 1 reduced using the difference in the frequency domain, and the base station apparatus 100 performs modulation and coding using modulation parameter 2 from the notification information. At this point, since the terminal apparatus 200 reduces the information amount, there is the possibility that modulation parameter 1 is different from modulation parameter 2. Therefore, in this Embodiment, it is necessary to reduce the information amount so that the reception quality approaches each other in signal 1 modulated and coded using modulation parameter 1 and signal 2 modulated and coded using modulation parameter 2.

Figure 46:
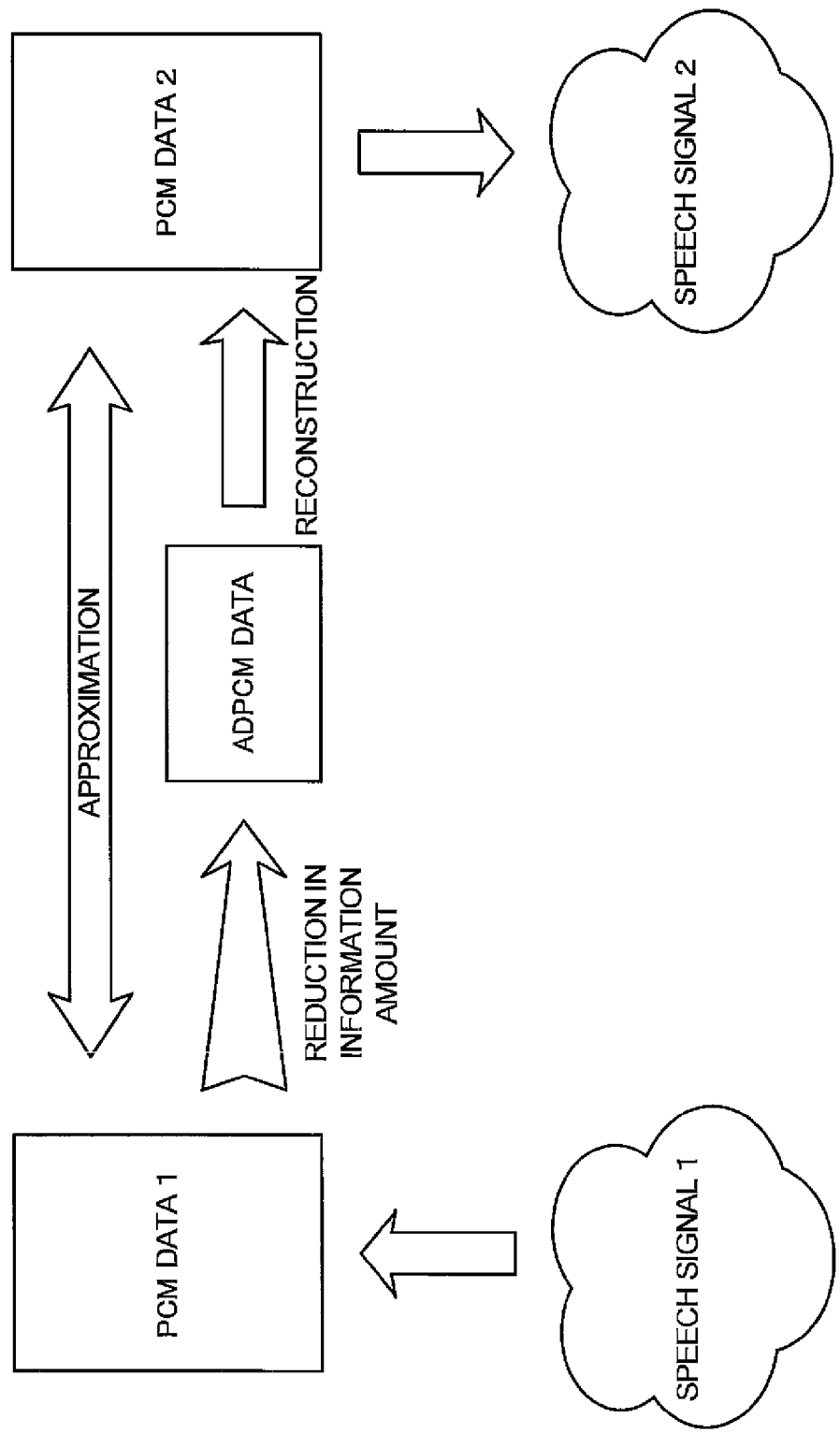
FIG. 46 is a conceptual diagram of ADPCM.

Compared herein is an example of ADPCM (Adaptive Differential Pulse Code Modulation) that is a data compression scheme using the difference in the time domain in speech signals. FIG. 46 is a conceptual diagram of ADPCM. The information amount is reduced by transforming PCM data (Pulse Code Modulation) data obtained by quantizing a speech signal into ADPCM data using the difference in the time domain. The ADPCM data is reconstructed to the PCM data and transformed into a speech signal. At this point, the ADPCM data is generated so as to approximate PCM data 1 obtained by quantizing speech data by PCM data 2. The ADPCM data is data based on the difference in a time series. In ADPCM, the information amount is reduced so that PCM data 1 and PCM data 2 approaches each other, and the ADPCM data is generated. In other words, there is the so-called irreversible relationship that speech signal 1 cannot be reproduced from speech signal 2 in a complete shape, but the information amount is reduced so as to approach speech signal 2 to speech signal 1.

In addition, ADPCM is disclosed in Non-patent Document, ITU-T, Recommendation G. 726, "403-32, 24, 16 kbit/s Adaptive Differential Pulse Code Modulation (ADPCM)", December, 1990.

Meanwhile, the modulation parameter is control information, and differs in property from transmission data such as a speech signal and the like. In other words, to reduce the information amount on the modulation parameter using the difference, it is preferable to consider an inter-symbol distance in modulating and coding a signal using the modulation parameter. At this point, signal 1 and signal 2 are completely the same data. Even when modulation parameter 1 and modulation parameter 2 are different from each other, it is enough that the quality of signal 1 is the same as the quality of signal 2 as a result of considering the inter-symbol distance. The inter-symbol distance affects error rate characteristics, throughput characteristics (transmission rate) and the like, and therefore, the notification information generating section 400-3 needs to generate the notification information with the information amount reduced in consideration of the inter-symbol distance.

In each of the above-mentioned Embodiments, the difference value (differential information) is determined using the "square error" as an index of the difference, and indexes other than the square error can be used as an index of the difference. For example, the effects are obtained using an index on the difference between the optimal modulation parameter level and the reconstructed modulation parameter level, such as a "weighted square error by an arbitrary value", "absolute value of the difference", "weighted absolute value of the difference by an arbitrary value" and the like.

Alternately, arbitrary values may be prepared as a table in association with respective modulation parameter levels, instead of the modulation parameter levels, to determine the differential information based on the square error of the values. As the values, for example, it is possible to use required reception quality (for example, required CNR) necessary for each modulation parameter to meet predetermined communication quality, and the like.

As an example, described is the case of using a difference of CNR value to meet the required quality in each modulation parameter (MCS) as a weighting value.

For example, the calculating section 402-3 in the notification information generating section 400-3 is capable of performing weighting on a modulation parameter level notified as the modulation parameter information. FIG. 47 is a diagram showing an example of a table showing weighting values for the modulation parameters. The calculating section 402-3 is beforehand set for CNR values in association with respective MCS as shown in FIG. 47, and when the optimal MCS level (modulation parameter level) output from the modulation parameter setting section 206 is MCS 3, and the MCS level of the reconstructed modulation parameter information output from the reconstructing section 403-3 is MCS 4, calculates the square error $(2.5-0.5)^2=4$ of the difference in the CNR value as the square error. The square error of a difference in the modulation parameter level is used in each of the above-mentioned Embodiments, and this Embodiment uses the square error of a difference in the CNR-value level corresponding to the modulation parameter level. Thus, the calculating section 402-3 compares the square error calculated in a candidate value of each differential information held in the differential information table 401-3 with each other, and outputs a difference value that minimizes the square error as the notification information.

By this means, even when variations fluctuate in error rate characteristics between modulation parameter levels, it is possible to reconstruct the modulation parameter closer to the required quality.

Further, as another example, as shown in FIG. 48, weights are set in association with the signs of candidate values of the differential information, and the weight is varied based on FIG. 48 using the sign of a difference of the modulation parameter level obtained based on the optimal modulation parameter level output from the modulation parameter setting section 206, and the modulation parameter level of the reconstructed modulation parameter information output from the reconstructing section 403-3.

For example, when the optimal modulation parameter level output from the modulation parameter setting section 206 is MCS 3, and the modulation parameter level of the reconstructed modulation parameter information output from the reconstructing section 403-3 is MCS 5, since (5−3) is positive, the equation of $(5-3)^2 \times 1=4$ is calculated as the square error. Inversely, when the optimal modulation parameter level output from the modulation parameter setting section 206 is MCS 5, and the modulation parameter level of the reconstructed modulation parameter information output from the reconstructing section 403-3 is MCS 3, since (3-5) is negative, the equation of $(3-5)^2 \times 2=8$ is calculated as the square error. Thus, the calculating section 402-3 compares the square error calculated in the candidate value of each differential information held in the differential information table 401-3 with each other, and outputs the different value that minimizes the square error as the notification information.

By this means, it is possible to select the differential information enabling a modulation parameter with a lower error rate to be reconstructed from among a plurality of difference-value candidates.

EMBODIMENT 16

Each of the above-mentioned Embodiments describes the case where the terminal apparatus 200 transmits the notification information related to the modulation parameter as the uplink notification information, and the invention is similarly applicable to the case of generating the notification information based on the information about an estimation result of propagation path conditions such as an quantized CNR value and the like, and reporting the generated notification information. In addition, described is an example of using CNR (Carrier to Noise power Ratio) as the estimation result of propagation path conditions, and other values can naturally be applied as the estimation result of propagation path conditions. For example, it is possible to use indicators related to the reception signal power and carrier signal power such as RSSI (Receive Signal Strength Indication), SNR (Signal to Noise power Ratio), SIR (Signal to Interference power Ratio) SINR (Signal to Interference plus Noise power Ration), CIR (Carrier to Interference power Ratio) and the like.

Described below is the case of using the quantized CNR as an estimation result of propagation path conditions and generating the notification information based on quantized CNR, with the difference from the process in Embodiment 12 focused.

Figure 49:
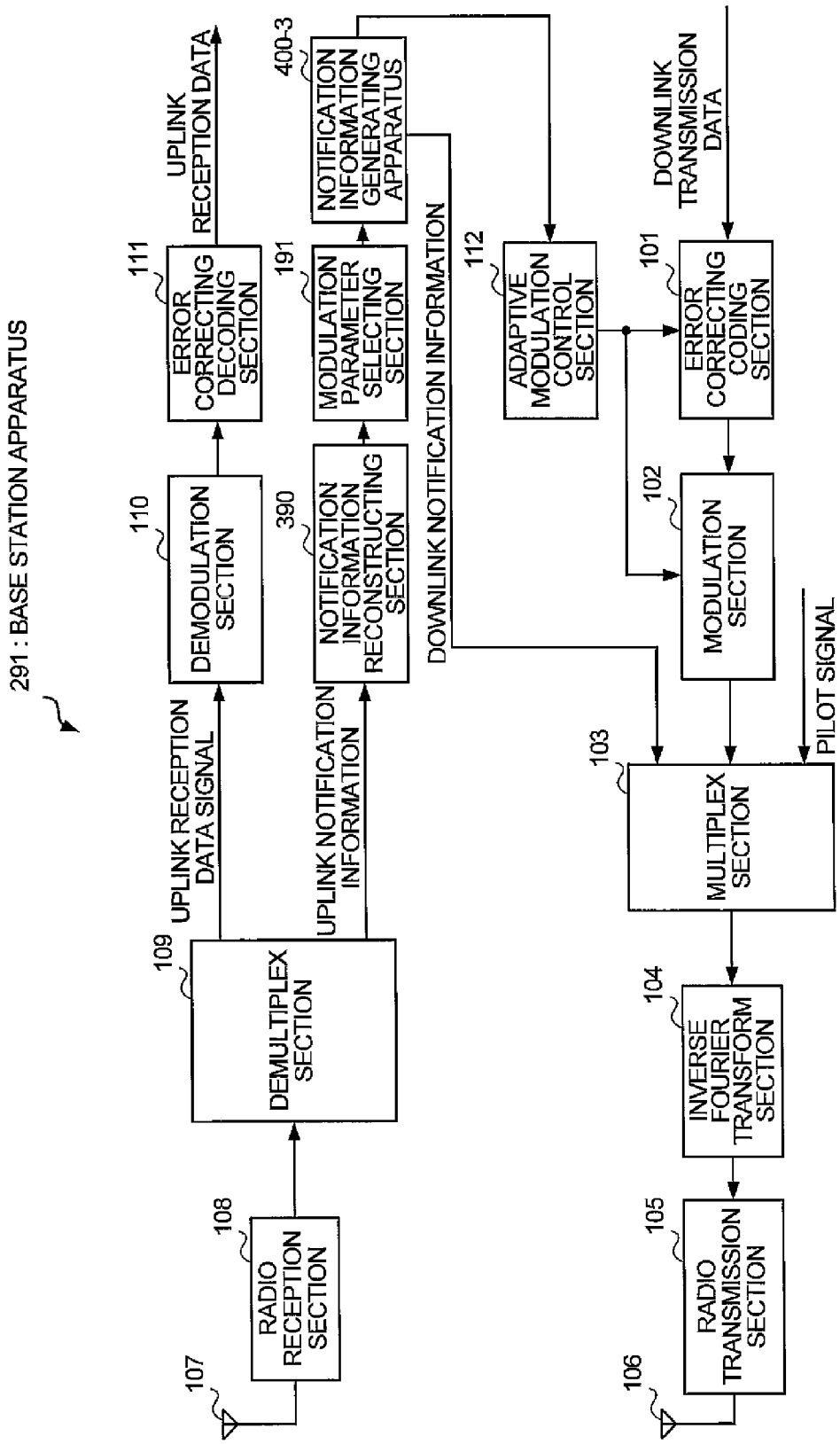
FIG. 49 is a block diagram showing a configuration example of a base station apparatus in Embodiment 16.

FIG. 49 is a block diagram showing a configuration example of a base station apparatus 291 of Embodiment 16. The base station apparatus 291 as shown in FIG. 49 has the same structural elements as in the base station apparatus 100 as shown in FIG. 35 except the respects that the base station apparatus 291 has a modulation parameter selecting section 191 between the notification information reconstructing section 390 and the notification information generating apparatus 400-3, and that the notification information reconstructing section 390 reconstructs the notification information related to the propagation path estimation result (quantized CNR) as the uplink notification information. The modulation parameter selecting section 191 is capable of being implemented by the same circuit configuration as that of the modulation parameter selecting section 206 in the terminal apparatus 200 as shown in FIG. 36. The notification information reconstructing section 390 is different from the notification information reconstructing section 300 as shown in FIG. 35 in the input and output information amounts, but is capable of being actualized by the circuit for performing the same processing. The notification information apparatus 400-3 has the same configuration as the configuration shown in FIG. 37.

Figure 50:
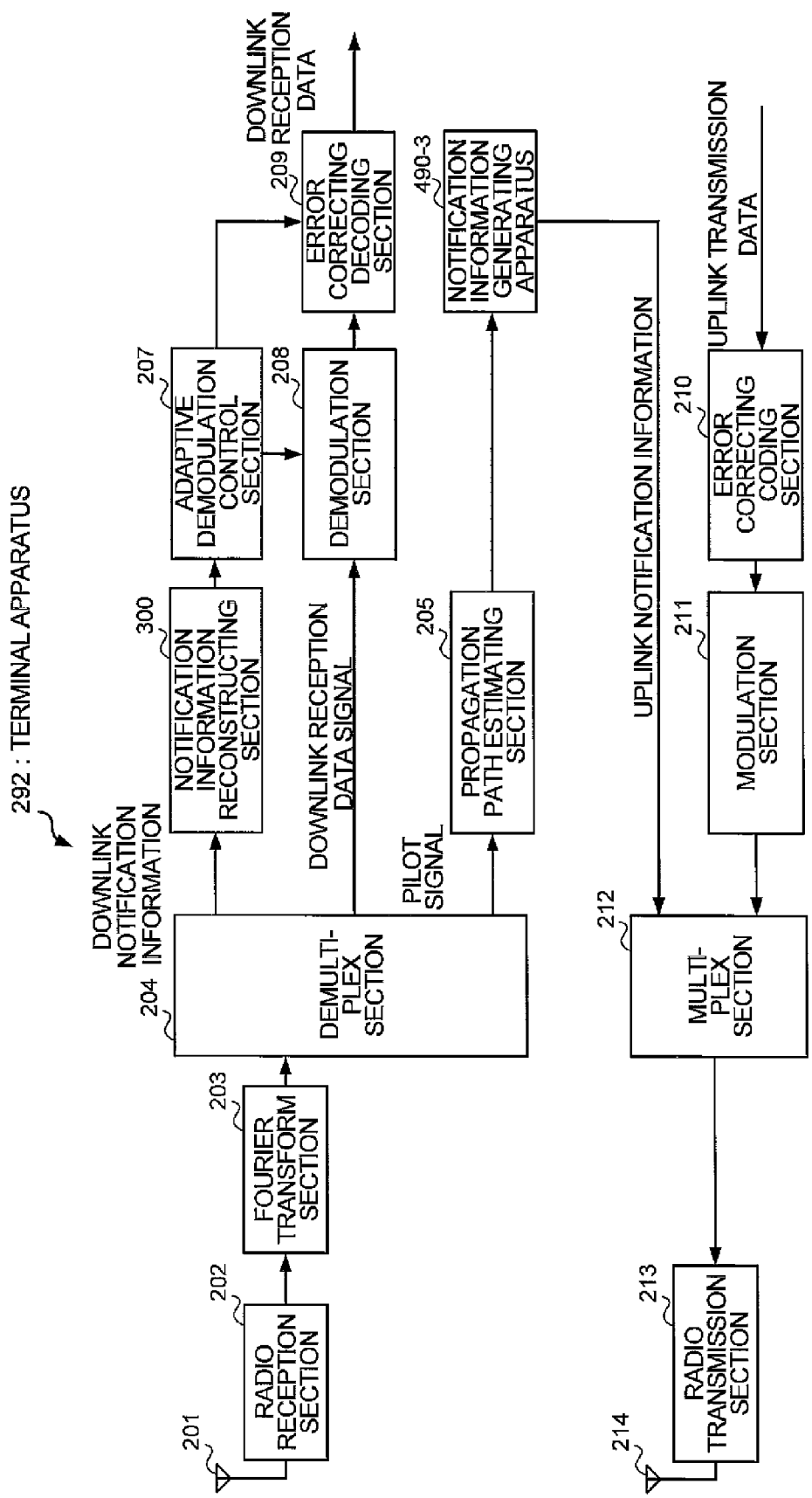
FIG. 50 is a block diagram showing a configuration example of a terminal apparatus in Embodiment 16.

FIG. 50 is a block diagram showing a configuration example of a terminal apparatus 292 in Embodiment 16. The terminal apparatus 292 as shown in FIG. 50 has the same configuration as that of the terminal apparatus 200 as shown in FIG. 36 except the respects that the terminal apparatus 292 does not need the modulation parameter selecting section between the propagation path estimating section 205 and the notification information generating section 490-3, and that the notification information generating section 490-3 receives as an input signal quantized CNR output from the propagation path estimating section 205, and generates the notification information related to the quantized CNR as the uplink notification information.

Figure 51:
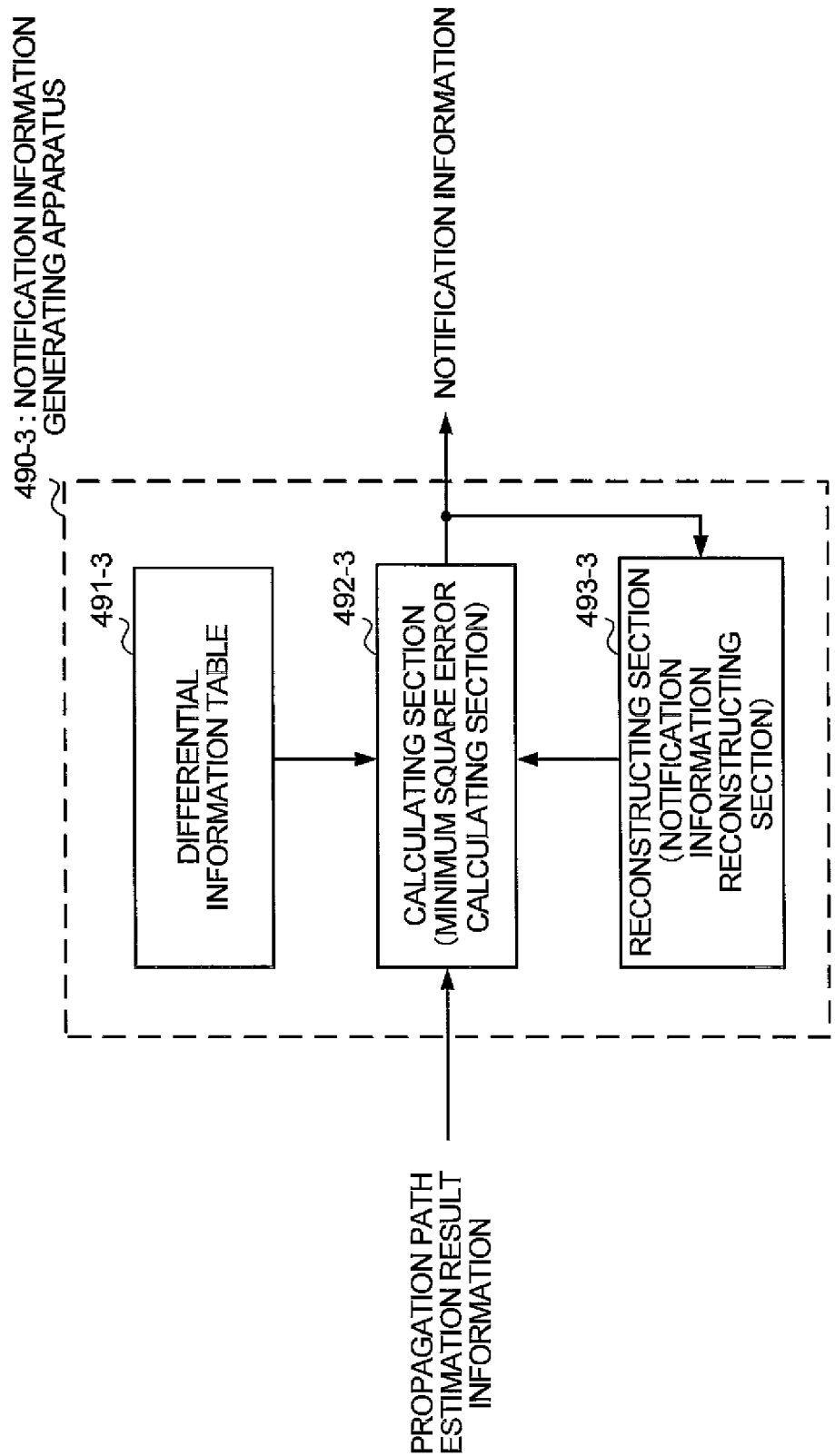
FIG. 51 is a diagram showing a configuration example of a notification information generating apparatus in Embodiment 16.

FIG. 51 is a block diagram showing a configuration example of the notification information generating apparatus

490-3 in this Embodiment. The notification information generating apparatus 490-3 has a differential information table 491-3, calculating section 492-3 and reconstructing section 493-3.

The differential information table 491-3 is a storage area for storing the differential information that is candidate values (difference levels) for the difference value calculated in the calculating section 492-3. The candidate values of this Embodiment are candidate values of the order of quantized CNR.

The calculating section 492-3 receives the propagation path estimation result information (quantized CNR information) as the channel quality information, calculates the square error (an example of the difference value) for the candidate of each differential information based on the differential information table 491-3 and the reconstructed modulation parameter information (an example of reconstructed channel quality information) output from the reconstructing section 493-3, and selects a candidate value that minimizes the square error from among the candidates of the differential information to output as the notification information. The specific operation is the same as in FIG. 38.

The reconstructing section 493-3 holds the notification information output (notified) from the calculating section 492-3, adds the held notification information (last notification information) that is last notified, the difference value (notification information) that is newly output from the calculating section 492-3, and a level indicated by the propagation path estimation result information reconstructed on the frequency channel immediately before the channel, thereby reconstructs the propagation path estimation result information, and outputs the reconstructed propagation path estimation result information to the calculating section 492-3.

In the notification information generating section 490-3 of this Embodiment, the notification information generating apparatus 490-3 receives the quantized CNR information as an example of the propagation path estimation result information, and is therefore different in circuit scale of each block from the notification information generating apparatus 400-3 as shown in FIG. 37, but is capable of being actualized by the circuits for performing the same processing.

Thus, according to this Embodiment, by sequentially selecting a difference value as the notification information so as to minimize the square error between the optimal propagation path estimation result information (quantized CNR information) and the reconstructed propagation path estimation result information, the reconstructed propagation path estimation result information approaches the optimal propagation path estimation result information. Therefore, by using the difference value as the notification information, it is possible to suppress deterioration in performance caused by the fact that the optimal propagation path estimation result information cannot be reconstructed.

In addition, the notification information generating apparatus in each of the above-mentioned Embodiments performs the processing sequentially on the channel quality information of adjacent channels in at least one of the frequency domain (frequency-axis direction) and the time domain (time-axis direction), and thereby, is capable of improving accuracy of the channel quality information reconstructed from the notification information. Further, the notification information generating apparatus in each of the above-mentioned Embodiments is applicable to communication apparatuses constituting a multicarrier communication system.

Moreover, the notification information generating apparatus of each of the above-mentioned Embodiments is capable of being actualized by hardware such as a circuit and the like or software. In the case of actualizing by software, the apparatus is implemented by a program (notification information generating program) on the operation of a computer. The notification information generating program is loaded on memory in a computing machine (in the communication apparatus) and executed under control of a central processing unit (CPU). The notification information generating program has the function of making the computing machine execute at least the following procedures.

The program has the procedures for (1) holding the notification information generated based on the channel quality information of a first channel as the last notification information, reconstructing the channel quality information based on the held last notification information, and outputting the reconstructed channel quality information as the reconstructed channel quality information of the first channel, (2) receiving the channel quality information of a second channel differing from the first channel, calculating a difference value between the input channel quality information of the second channel and the reconstructed channel quality information of the first channel, and generating the notification information based on the calculated difference value, and (3) receiving the generated notification information as the last notification information to store.

Further, the program may have the procedures for (4) storing a plurality of candidate values that are candidates for the difference value in the differential information table as the differential information, and (5) outputting the input channel quality information as the notification information for a channel used as a starting point. Furthermore, the program may have the procedures for (6) calculating an index value based on a difference between the difference value and the candidate value, and selecting a single candidate value from the differential information so as to decrease the calculated index value.

Moreover, the notification information generating apparatus explained in each of the above-mentioned Embodiments is capable of adopting a configuration as described below. Each of the above-mentioned Embodiments describes the case of repeating a feedback loop comprised of the selecting section and reconstructing section. Inside the selecting section of each of the above-mentioned Embodiments, the same processing as the reconstruction processing that is processing inside the reconstructing section is performed on each candidate value, and a single candidate value is selected based on the result. In other words, the selecting section has the function of reconstruction, and the function of comparing with the reconstruction result. Therefore, a common circuit can be shared as the circuit with the function of reconstruction inside the selecting section and the circuit with the function of reconstruction inside the reconstructing section.

Figure 52:
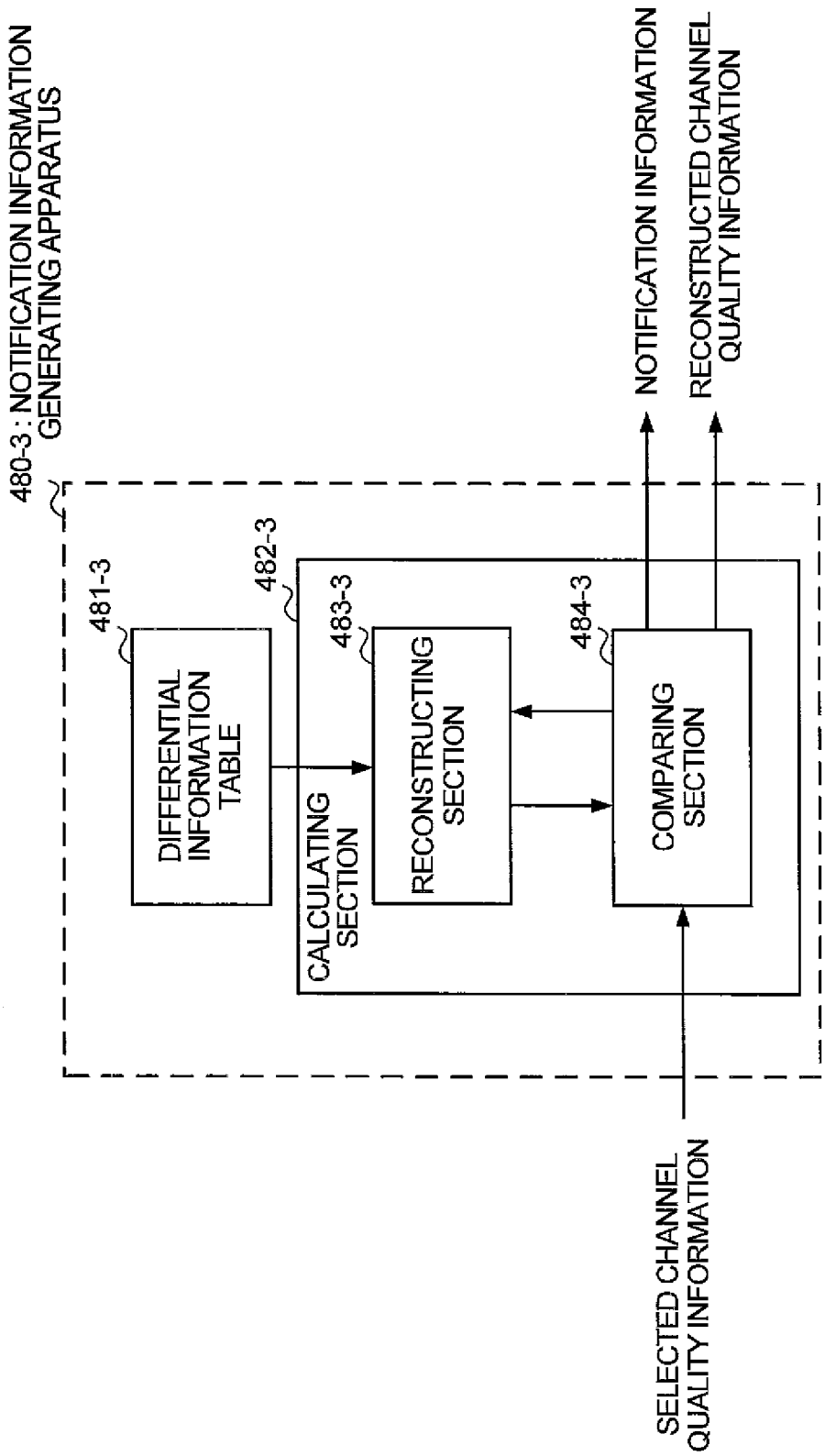
FIG. 52 is a diagram showing an example of a configuration block of a notification information generating apparatus with the function of reconstruction incorporated into the selecting section.
Figure 53:
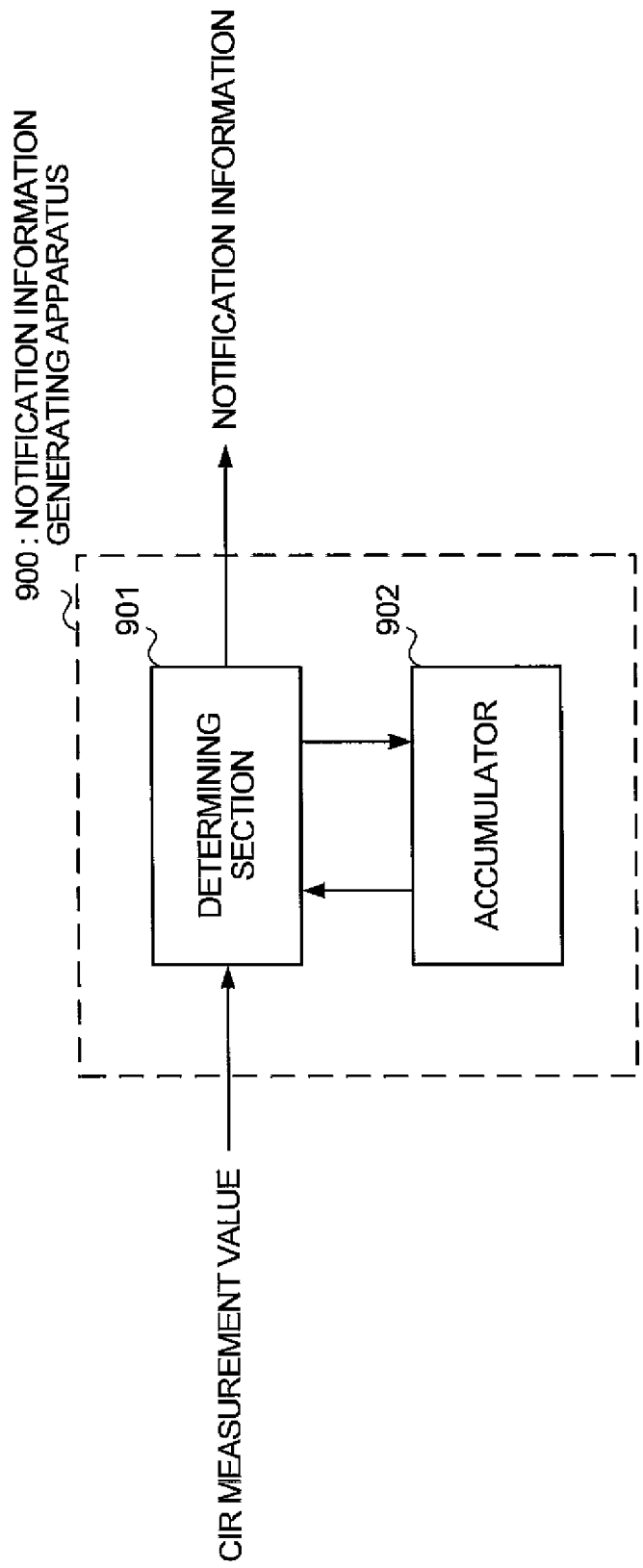
FIG. 53 is a block diagram showing an example of a configuration of a notification information generating apparatus that generates conventional notification information.

FIG. 52 is a block diagram showing an example of a configuration of a notification information generating apparatus that provides the selecting section with the reconstructing section. The notification information generating apparatus 480-3 has a differential information table 481-3, selecting section 482-3, reconstructing section 483-3, and comparing section 484-3. The differential information table 481-3 is the same as the differential information table 401-3 of FIG. 37. The block configuration of FIG. 52 adopts the configuration where the reconstructing section 483-3 is included inside the selecting section 482-3. The selected channel quality information is input to the comparing section 484-3 inside the selecting section 482-3.

The notification information candidate value is sequentially input to the reconstructing section 483-3 from the differential information table 481-3. Further, the reconstructing section 483-3 has the storage function, and stores a last reconstructed reconstruction value (channel quality information reconstructed in the processing of the last channel). The reconstructing section 483-3 calculates provisionally reconstructed channel quality information about a channel (subcarrier block) being processed from the last reconstructed reconstruction value and the notification information candidate value, and associates the provisionally reconstructed channel quality information with the notification information candidate value to temporarily store, while sequentially outputting the notification information candidate value and the provisionally reconstructed channel quality information to the comparing section 483-4.

The comparing section 484-3 calculates each index value based on the difference between the provisionally reconstructed channel quality information sequentially input from the reconstructing section 483-3 and the selected channel quality information, compares the index with one another, selects the provisionally reconstructed channel quality information nearest the selected channel quality information as a result of the comparison, and generates the notification information candidate value added to the selected provisionally reconstructed channel quality information as the notification information.

The calculation of index value and comparison performed in the comparing section 484-3 is the same as the processing in the calculating section in the configuration described previously. The comparing section 484-3 outputs the generated notification information and the reconstructed channel quality information (a value selected from among a plurality of provisionally reconstructed channel quality information) associated with the notification information, while outputting a signal indicative of the selected notification information to the reconstructing section 483-3.

The reconstructing section 483-3 stores the provisionally reconstructed channel quality information associated with the notification information candidate value indicated by the signal output from the comparing section 484-3 to use as the last reconstructed reconstruction value in the next processing.

The invention claimed is:

1. A notification information generating apparatus, comprising:
    a notification information generator that generates notification information which is notified to a base station apparatus from a terminal apparatus and which is based on channel quality information obtained from a reception state of each channel in the terminal apparatus in a communication scheme for performing communication using a plurality of channels,
    wherein, upon receiving a transmission frame including a first channel of the plurality of channels, the notification information generator generates notification information of the first channel based on the channel quality information of the first channel,
    a difference value is calculated between the channel quality information of the first channel and channel quality information of a second channel in the transmission frame;
    a single candidate value corresponding to the calculated difference value is selected from a plurality of previously-determined difference-value candidate values each indicating a difference between two indications of channel quality information, and
    the notification information generator generates notification information of the second channel based on the selected candidate value.

2. The notification information generating apparatus according to claim 1, wherein the first channel is a channel that is used as a starting point in notification information generation, and the second channel is a channel that is not used as a starting point in notification information generation.

3. A notification information generating apparatus that generates notification information which is notified to a base station apparatus from a terminal apparatus and which is based on channel quality information obtained from a reception state of each channel in the terminal apparatus in a communication scheme for performing communication using a plurality of channels, the apparatus comprising:
    a notification information generator that, upon receiving a transmission frame that includes a first channel, generates notification information of the first channel based on the channel quality information of the first channel,
    a notification information table that stores a plurality of previously-determined difference-value candidate values each indicating a difference value between two prospective indications of channel quality information, as candidate values for notification information for a second channel in the received transmission frame,
    a reconstructing section that generates a reconstruction value using the notification information of the first channel, and
    a selecting section which receives the channel quality information of the second channel, and selects a single candidate value from the notification table for the notification information of the second channel based on a difference value between the channel quality information of the second channel and the reconstruction value.

4. The notification information generating apparatus according to claim 3 wherein
    the notification information table additionally stores a plurality of non-difference value candidate values each indicating channel quality information, as candidate values for the notification information.

5. The notification information generating apparatus according to claim 3, wherein the selecting section selects the single candidate value based on a difference value between the channel quality information of the second channel and the reconstruction value, and the channel quality information of the second channel.

6. The notification information generating apparatus according to claim 1, further comprising:
    a notification information table that stores the plurality of previously-determined difference-value candidate values,
    a storing section that stores the channel quality information of the first channel generated as the notification information of the first channel for use in the difference value calculation, and
    a selecting section which receives the channel quality information of the second channel differing from channel quality information of the first channel, performs the selection of the single candidate value.

7. The notification information generating apparatus according to claim 6, wherein based on the received channel quality information, the selecting section changes one of the difference-value candidate values to update the notification information table.

8. The notification information generating apparatus according to claim 1, wherein the channel quality information is m-bit information, and
    the notification information is n-bit (n<m) information.

9. The notification information generating apparatus according to claim 1, wherein the channel quality information of the first or second channel is a modulation parameter selected based on information indicating propagation path conditions of the communication.

10. The notification information generating apparatus according to claim 9, wherein the modulation parameter is any one of a modulation scheme, a channel coding rate, and a combination of the modulation scheme and the channel coding rate.

11. A communication apparatus that performs communication using a plurality of channels, comprising:
the notification information generating apparatus according to claim 1; and
a transmitting section that transmits the notification information generated in the notification information generating apparatus to a communicating party.

12. The communication apparatus according to claim 11, wherein the communication apparatus concurrently transmits a plurality of pieces of notification information respectively generated on the first channel and the second channel to the communicating party.

13. A notification information generating method for generating notification information which is notified to a base station apparatus from a terminal apparatus based on channel quality information obtained from a reception state of each channel in the terminal apparatus in a communication scheme for performing communication using a plurality of channels, the method comprising:
generating notification information on a first channel based on the channel quality information of the first channel, and
with respect to channel quality of a second channel in a same transmission frame as that of the first channel, selecting a single candidate value, based on a calculated difference from the channel quality information of the first channel, from a plurality of previously-determined difference-value candidate values each indicating a difference between two indications of channel quality information, the selected candidate value corresponding to the calculated difference between the channel qualities of the first and second channels, and
generating the notification information of the second channel based on the selected candidate value.

14. A non-transitory computer-readable medium having computer-executable instructions stored thereon for generating notification information when executed, the instructions comprising:
generating notification information of a first channel based on channel quality information for the first channel obtained from a reception state of the first channel in a transmission frame having a plurality of channels in a terminal apparatus in a communication scheme for performing communication using a plurality of channels,
calculating a difference value between the channel quality information of the first channel and channel quality information of a second channel in the transmission frame;
selecting a single candidate value from a plurality of previously-determined difference-value candidate values each indicating a difference between two indications of channel quality information, the selected candidate value corresponding to the calculated difference value; and
generating notification information of the second channel based on the selected candidate value.

15. The notification information generating apparatus according to claim 1, further comprising:
a reconstructing section that generates a reconstruction value using the notification information generated based on the channel quality information of the first channel, and
a selecting section which receives the channel quality information of the second channel differing from the first channel, selects a single candidate value from the candidate values for the notification information based on a difference value between the channel quality information of the second channel and the reconstruction value, and generates the notification information based on the selected candidate value, and wherein
the notification information generating apparatus includes a notification information table that stores the plurality of predetermined difference-value candidate values and a plurality of non-difference value candidate values each indicating channel quality information, as candidate values for the notification information.

* * * * *